(12) United States Patent
Wright et al.

(10) Patent No.: US 10,664,904 B2
(45) Date of Patent: May 26, 2020

(54) SYSTEM, DEVICE AND METHOD FOR DETECTING AND MONITORING A BIOLOGICAL STRESS RESPONSE FOR FINANCIAL RULES BEHAVIOR

(71) Applicants: Daphne Wright, Sterling, VA (US); Kayla Wright-Freeman, Sterling, VA (US)

(72) Inventors: Daphne Wright, Sterling, VA (US); Kayla Wright-Freeman, Sterling, VA (US)

( * ) Notice: Subject to any disclaimer, the term of this patent is extended or adjusted under 35 U.S.C. 154(b) by 0 days.

(21) Appl. No.: 16/158,270

(22) Filed: Oct. 11, 2018

(65) Prior Publication Data

US 2019/0147529 A1    May 16, 2019

Related U.S. Application Data

(63) Continuation-in-part of application No. 14/159,312, filed on Jan. 20, 2014, now abandoned, which is a continuation of application No. 12/219,386, filed on Jul. 21, 2008, now Pat. No. 8,635,101.

(60) Provisional application No. 60/935,002, filed on Jul. 20, 2007.

(51) Int. Cl.
*G06Q 40/00* (2012.01)
*G06Q 40/06* (2012.01)

(52) U.S. Cl.
CPC ............ *G06Q 40/00* (2013.01); *G06Q 40/06* (2013.01)

(58) Field of Classification Search
None
See application file for complete search history.

(56) References Cited

U.S. PATENT DOCUMENTS

| | | | |
|---|---|---|---|
| 7,356,497 B1 | 4/2008 | Bursey et al. | |
| 7,904,362 B1 | 3/2011 | Smith | |
| 8,635,101 B2 | 1/2014 | Wright | |
| 9,911,290 B1 * | 3/2018 | Zalewski | G07G 1/0072 |
| 10,140,820 B1 * | 11/2018 | Zalewski | G07G 1/0072 |
| 2002/0156710 A1 | 10/2002 | Ryder | |
| 2004/0054610 A1 | 3/2004 | Amstutz et al. | |

(Continued)

OTHER PUBLICATIONS

The Bible, American Standard Version, Updated English language version, in html format. The Book of Luke . . . www.awitness.org/biblehtm/lu/lu16.htm, 1995.

*Primary Examiner* — Narayanswamy Subramanian
(74) *Attorney, Agent, or Firm* — Doster Greene, LLC

(57) ABSTRACT

A wearable biometric device according to various exemplary embodiments can be configured to define one or more geo-fences relative to one or more physical locations; detect a geo-fence crossing when the wearable biometric device crosses any of the geo-fences; activate a geo-fence application and a biometric application, in response to the detection of a geofence crossing; monitor financial transactions of the user while the wearable biometric device is located within the geo-fence; activate a biometric sensor to detect biometric conditions of the user and determine if the biometric conditions of the user exceeds a predetermined threshold; activate a stimuli generating unit to detect if the user experiences a biometric stressor while the wearable biometric device is located within the geo-fence and activate the stimuli generating unit to apply one or more stimuli to the user until the biometric stressor experienced by the user is below the predetermined threshold.

22 Claims, 59 Drawing Sheets

(56) References Cited

U.S. PATENT DOCUMENTS

| | | |
|---|---|---|
| 2004/0068429 A1 | 4/2004 | MacDonald |
| 2004/0254835 A1 | 12/2004 | Thomas |
| 2005/0267836 A1 | 12/2005 | Crosthwaite et al. |
| 2006/0218068 A1 | 9/2006 | Loeper |
| 2007/0244777 A1 | 10/2007 | Torre |
| 2008/0147567 A1 | 6/2008 | Perry |
| 2009/0106136 A1 | 4/2009 | Wright |
| 2014/0136383 A1 | 5/2014 | Wright |
| 2016/0022193 A1* | 1/2016 | Rau ................. A61B 5/165 600/301 |
| 2016/0381415 A1* | 12/2016 | Vijay ............ H04N 21/44218 725/12 |
| 2017/0035367 A1* | 2/2017 | Reich ................. A61B 5/1112 |
| 2017/0053304 A1* | 2/2017 | Eskilsson ........... G06Q 30/0242 |
| 2018/0117457 A1* | 5/2018 | Rom ................. A63F 13/211 |
| 2018/0176727 A1* | 6/2018 | Williams ........... A61B 5/6802 |
| 2018/0190376 A1* | 7/2018 | Hill ................. A61B 5/74 |
| 2018/0219994 A1* | 8/2018 | Frenz ............... H04M 1/72572 |
| 2019/0005215 A1* | 1/2019 | Faivre ............... G06F 21/31 |
| 2019/0104968 A1* | 4/2019 | Fedele ............... G06F 3/015 |
| 2019/0147529 A1* | 5/2019 | Wright ............... G06Q 40/00 |
| 2019/0147726 A1* | 5/2019 | Blum ............... G08B 21/182 340/587 |

\* cited by examiner

400
FIG. 4A

WEEKLY SPENDING REPORT

Monday, _____ 200__ through Sunday, _____ 200__

| | MON | TUES | WED | THURS | FRI | SAT | SUN | Weekly Total |
|---|---|---|---|---|---|---|---|---|
| Gas | | | | | | | | $ - |
| Eating Out | | | | | | | | $ - |
| Snacks and Drinks | | | | | | | | $ - |
| Gas | | | | | | | | $ - |
| Tolls/Public Transportation | | | | | | | | $ - |
| Barber/Beauty | | | | | | | | $ - |
| Kids Allowance | | | | | | | | $ - |
| Kids Activity Expenses | | | | | | | | $ - |
| Tips for Services | | | | | | | | $ - |
| Food Groceries | | | | | | | | $ - |
| Household Groceries | | | | | | | | $ - |
| Entertainment | | | | | | | | $ - |
| | | | | | | | | $ - |
| | | | | | | | | $ - |
| | | | | | | | | $ - |
| | | | | | | | | $ - |
| | | | | | | | | $ - |
| | | | | | | | | $ - |
| | | | | | | | | $ - |
| | | | | | | | | $ - |
| | | | | | | | | $ - |
| | | | | | | | | $ - |
| TOTAL | $ - | $ - | $ - | $ - | $ - | $ - | $ - | $ - |

400
FIG. 4B

Monthly Income and Expenditure Analysis

| My Incoming Provision | $ |
|---|---|
| Wages/Salary 1 | $ - |
| Wages/Salary 2 | |
| Part-Time Work | |
| Self-Employment | |
| Bonus/Overtime/Tips | |
| Child Support | |
| Pension | |
| Social Security | |
| Other ( ) | |
| Other ( ) | |
| Total Monthly Provision | $ - |

My Expenditures

| | $ |
|---|---|
| Mortgage/rent | $ - |
| Home Owner Association/Condo Fees | |

HOME & HOUSEHOLD MAINTENANCE

- Gas/Electric
- Electric
- Water/sewer
- Trash Collection
- Phone
- Cable/satellite
- Security Monitoring
- Pest Control
- Yard Services
- Housekeeper
- Repair and maintenance
- Decorating and furnishings
- Consumable Household Items (Non-Groceries)
- Other ( )

FOOD

- Groceries (Food Only)
- Dining Out
- Work Related Lunch
- Snacks
- Beverages/Coffee
- Kid's School Lunches
- Other ( )

CLOTHING

- Adult's Clothes/Shoes
- Kid's Clothes/Shoes
- Dry Cleaning/Laundry/Alterations
- Other ( )

AUTO/TRANSPORTATION

- Fuel
- Repairs/maintenance
- Bus/Subway/Cab
- Tolls
- Lease Payments
- Other ( )

GIFTS & DONATIONS

| | $ |
|---|---|
| Tithes | $ - |
| Church Offerings and Contributions | |
| Charities & Charitable Donations | |
| Birthdays/Holidays | |
| Other ( ) | |

LEISURE

- Music (CD's Computer Downloads, Satellite Radio etc.)
- Event Tickets (Movies/Plays/Concerts/Sporting Events)
- Computer games/video games/software
- Vacation/Travel
- Weekend/Day Trips
- Sports/Health Club (including equipment & apparel)
- Hobbies
- Socializing (Get-togethers, cookouts, dinner out, drinks)
- At-home leisure (books, subscriptions, movies, alcohol)
- Personal Enjoyment (Cigarettes, Beer, Wine, Liquor, Other)
- Other ( )

FAMILY/KIDS

- Child Support/Alimony
- Day Care/Camp
- Tuition
- Lessons
- Babysitters
- Sports
- Allowances
- Untrackable Cash for Kids
- Toys/Games/Gadgets
- Pet
- Other ( )
- Other ( )

COMMUNICATIONS/COMPUTER

- Cell Phones
- Internet Access
- PDA services
- Other Internet Service Fees
- Computer expenses
- Other ( )

DEBT OBLIGATIONS

- Auto Loans
- 2$^{nd}$ Mortgage/Home Equity
- Student Loans
- Secured/Unsecured Loans
- Credit Cards
- Other ( )

SAVINGS

500

FIG. 5A (PART 1)

| MEDICAL/DENTAL | |
|---|---|
| Doctors/Dentist | |
| Prescriptions | |
| Over the Counter Medicine/Vitamins | |
| Other ( ) | |
| INSURANCE | |
| Auto | |
| Life | |
| Health | |
| Home owners/Renters | |
| Disability | |
| Long-term care | |
| PERSONAL GROOMING/MAINTENANCE | |
| Hair | |
| Nails | |
| Spa Treatments/Pedicures/Massages | |
| Cosmetics | |
| Toiletries | |
| Other ( ) | |

| | |
|---|---|
| Emergency Fund | |
| 401(k), 403(b), 457 Plan Contribution | |
| IRA / Roth IRA Contributions | |
| Other Retirement | |
| Monthly Investment Deposits | |
| College Savings Deposits | |
| General Savings | |
| Short Term Financial Goals: ( ) | |
| Financial Goal ( ) | |
| Financial Goal ( ) | |
| Other ( ) | |
| OTHER (Don't leave anything out) | |
| | |
| | |
| | |
| | |
| Total expenditures | $ - |
| Total Monthly Provision | $ - |
| Less: Total Expenditures | $ - |

500

FIG. 5A (PART 2)

Weekly Expenditure Worksheet

| My Expenditures | Week 1 | Week 2 | Week 3 | Week 4 | Week 5 |
|---|---|---|---|---|---|
| HOUSING | | | | | |
| Mortgage/rent | $ | $ | $ | $ | $ |
| Home Owner Association/Condo Fees | | | | | |
| HOUSEHOLD MAINTENANCE | | | | | |
| Gas/Electric | | | | | |
| Electric | | | | | |
| Water/Sewer | | | | | |
| Trash Collection | | | | | |
| Phone | | | | | |
| Cable/satellite | | | | | |
| Security Monitoring | | | | | |
| Pest Control | | | | | |
| Yard Services | | | | | |
| Housekeeper | | | | | |
| Repair and maintenance | | | | | |
| Decorating and furnishings | | | | | |
| Consumable Household Items (Non-Groceries) | | | | | |
| Other ( ) | | | | | |
| FOOD | | | | | |
| Groceries (Food Only) | | | | | |
| Dining Out | | | | | |
| Work Related Lunch | | | | | |
| Snacks | | | | | |
| Beverages/Coffee | | | | | |
| Kid's School Lunches | | | | | |
| Other ( ) | | | | | |
| CLOTHING | | | | | |
| Adult's Clothes/Shoes | | | | | |
| Kid's Clothes/Shoes | | | | | |
| Dry Cleaning/Laundry/Alterations | | | | | |
| Other ( ) | | | | | |
| AUTO/TRANSPORTATION | | | | | |
| Fuel | | | | | |
| Repairs/maintenance | | | | | |
| Bus/Subway/Cab | | | | | |
| Tolls | | | | | |
| Lease Payments | | | | | |
| Other ( ) | | | | | |
| MEDICAL/DENTAL | | | | | |
| Doctors/Dentist | | | | | |
| Prescriptions | | | | | |
| Over the Counter Medicine/Vitamins | | | | | |
| Other ( ) | | | | | |
| INSURANCE | | | | | |
| Auto | | | | | |
| Life | | | | | |
| Health | | | | | |
| Home owners/Renters | | | | | |
| Disability | | | | | |
| Long-term care | | | | | |

510

FIG. 5B (PART 1)

| PERSONAL GROOMING/MAINTENANCE | | | | | |
|---|---|---|---|---|---|
| Hair | | | | | |
| Nails | | | | | |
| Spa Treatments/Pedicures/Massages | | | | | |
| Cosmetics | | | | | |
| Toiletries | | | | | |
| Other ( ) | | | | | |
| GIFTS & DONATIONS | | | | | |
| Tithes | | | | | |
| Church Offerings and Contributions | | | | | |
| Charities & Charitable Donations | | | | | |
| Birthdays/Holidays | | | | | |
| Other ( ) | | | | | |

Chap 2          Weekly Expenditure Worksheet

510

FIG. 5B (PART 2)

| LEISURE | | | | | |
|---|---|---|---|---|---|
| Music (CD's Computer Downloads, Satellite Radio etc.) | | | | | |
| Event Tickets (Movies/Plays/Concerts/Sporting Events) | | | | | |
| Computer games/video games/software | | | | | |
| Vacation/Travel | | | | | |
| Weekend/Day Trips | | | | | |
| Sports/Health Club (including equipment & apparel) | | | | | |
| Hobbies | | | | | |
| Socializing (Get-togethers, cookouts, dinner out, drinks) | | | | | |
| At-home leisure (books, subscriptions, movies, alcohol) | | | | | |
| Personal Enjoyment (Cigarettes, Beer, Wine, Liquor, Other) | | | | | |
| Other ( ) | | | | | |
| FAMILY/KIDS | | | | | |
| Child Support/Alimony | | | | | |
| Day Care/Camp | | | | | |
| Tuition | | | | | |
| Lessons | | | | | |
| Babysitters | | | | | |
| Sports | | | | | |
| Allowances | | | | | |
| Untrackable Cash for Kids | | | | | |
| Toys/Games/Gadgets | | | | | |
| Pet | | | | | |
| Other ( ) | | | | | |
| Other ( ) | | | | | |
| COMMUNICATIONS/COMPUTER | | | | | |
| Cell Phones | | | | | |
| Internet Access | | | | | |
| PDA services | | | | | |
| Other Internet Service Fees | | | | | |
| Computer expenses | | | | | |
| Other ( ) | | | | | |
| DEBT OBLIGATIONS | | | | | |
| Auto Loans | | | | | |
| 2$^{nd}$ Mortgage/Home Equity | | | | | |
| Student Loans | | | | | |
| Secured/Unsecured Loans | | | | | |
| Credit Cards | | | | | |
| Other ( ) | | | | | |
| SAVINGS | | | | | |
| Emergency Fund | | | | | |
| 401(k), 403(b), 457 Plan Contribution | | | | | |
| IRA / Roth IRA Contributions | | | | | |
| Other Retirement | | | | | |
| Monthly Investment Deposits | | | | | |
| College Savings Deposits | | | | | |
| General Savings | | | | | |
| Short Term Financial Goals: ( ) | | | | | |
| Financial Goal ( ) | | | | | |
| Financial Goal ( ) | | | | | |
| Other ( ) | | | | | |
| OTHER (Don't leave anything out) | | | | | |
| Total Expenditures | $ - | $ - | $ - | $ - | $ - |

Chap 2      Weekly Expenditure Worksheet

600

VALUES AND VISION REFLECTIONS

The following questions may aid you in <u>Developing Vision toward ...... Purposed Plans.</u> Ephesians 1:11 indicates that you were predestined according to God's plans and his will. You were created with characteristics and attributes which predispose you towards plans that fit who you are and what you have been equipped to accomplish.

Consider the following as you begin to recognize those deposits that have uniquely shaped your personality, passion, perspective and purpose.

1) What are my core values?

2) What are the principles that I base my life on? What is my moral constitution?

3) What should I be doing? What areas of achievement should I be striving towards? What seeds should I be sowing or what contributions should I be making?

4) What am I passionate about or what do I treasure?

5) What kind of person is it important for me to be? (my character)

6) Who's lives should I be influencing?

Personal Vision Statement

Who are you? How do you see yourself? Envision the person who you're striving to be or who you know you should be working toward becoming? To help you develop the image in your mind, you may want to jot down some answers to the questions on the accompanying page.

_____  _____
_____  _____
_____  _____
_____  _____
_____  _____
_____  _____

Now create a Statement that incorporates elements from your list. Your written statement should allow you to see what is important and what matters most to you, who you really are and what you really want.

Debt Ledger

Creditors Owed as of _____

| Creditor | APR | Current Balance | Minimum Payment | Due Date | Notes |
|---|---|---|---|---|---|
| | % | $ | $ | | |
| | | | | | |
| | | | | | |
| | | | | | |
| | | | | | |
| | | | | | |
| | | | | | |
| | | | | | |
| | | | | | |
| | | | | | |
| | | | | | |
| | | | | | |
| | | | | | |
| | | | | | |
| TOTAL | | $ | $ | | |

Loan Transaction Ledger

Date:

| Month | Creditor | | | Creditor | | | Creditor | | |
|---|---|---|---|---|---|---|---|---|---|
| | Beginning Balance | Payments Toward Principle | Ending Balance | Beginning Balance | Payments Toward Principle | Ending Balance | Beginning Balance | Payments Toward Principle | Ending Balance |
| | | | | | | | | | |
| | | | | | | | | | |
| | | | | | | | | | |
| | | | | | | | | | |
| | | | | | | | | | |
| | | | | | | | | | |
| | | | | | | | | | |
| | | | | | | | | | |
| | | | | | | | | | |
| TOTALS | | $ - | | | $ - | | | $ - | |

1000
FIG. 10

BALANCED GOALS WORKSHEET

| GOAL | SPIRITUAL | HOME ENVIRONMENT | WORK/CAREER | RELATIONSHIPS |
|---|---|---|---|---|
| 0-1 Year<br>SHORT TERM | | | | |
| 1-5 Years<br>MID TERM | | | | |
| > 5 years<br>LONG TERM | | | | |

1100
FIG. 11A

GOAL ASSESSMENT CONT'D

| GOAL | FINANCE | PERSONAL DEVELOPMENT | HEALTH | FUN, RECREATION & LEISURE |
|---|---|---|---|---|
| 0-1 Year<br>SHORT TERM | | | | |
| 1-5 Years<br>MID TERM | | | | |
| > 5 years<br>LONG TERM | | | | |

1100
FIG. 11B

BALANCED PRIORITIES WORKSHEET

| SPIRITUAL | HOME ENVIRONMENT | WORK/CAREER | RELATIONSHIPS |
|---|---|---|---|
|  |  |  |  |

| FINANCE | PERSONAL DEVELOPMENT | HEALTH | FUN, RECREATION & LEISURE |
|---|---|---|---|
|  |  |  |  |

1200
FIG. 12

Financial Planning Personal Goals and Priorities Worksheet

Financial Life Personal Priorities:
List and rank your five most important financial priorities goals:

*These are areas of spending, saving or giving where you are strongly committed to allocating your finances because of personal values and priorities. (You may or may not currently be allocating your finances in these areas but have a committed intent.)*

1.) _____
2.) _____
3.) _____
4.) _____
5.) _____

Financial Life Personal Goals:
List and rank your five most important financial goals:

*These are those things that you must set aside or accumulate financial resources to either acquire, accomplish or achieve. (Some may be the same as your financial priorities.)*

Short-term (Less than 1 year)

1.) _____
2.) _____
3.) _____
4.) _____
5.) _____

Intermediate- and Long-term (1-3 years)

6.) _____
7.) _____
8.) _____
9.) _____
10.) _____

Long-term (3 years or more)

Statement of Financial Position

From: January 1, 20____ through _____, 20____

ASSETS

Cash/Cash Equivalents

| | |
|---|---|
| Checking Account | $ - |
| Savings Account | |
| Money Market | |
| Life Insurance Cash Value | |
| CD's | |
| Total Liquid Assets | $ - |

Invested Assets

| | |
|---|---|
| Stock Portfolio | $ - |
| Mutual Funds | |
| 401(k)'s | |
| Traditional IRA's | |
| Roth IRA's | |
| Annuities | |
| Bonds | |
| CD's | |
| Real Estate Investments | |
| Vested portion of pension plans | |
| Other | |
| Other | |
| Total Cash/Cash Equivalents | $ - |

Use Assets

| | |
|---|---|
| Residence | $ - |
| Automobiles | |
| Other Vehicles | |
| Personal Property | |
| Total Use Assets | $ - |

TOTAL ASSETS $ -

LIABILITIES AND NET WORTH

Liabilities

| | |
|---|---|
| Credit card balance | $ - |
| Auto loans | |
| Personal Loans | |
| Mortgage balance | |
| Unpaid Bills | |
| Income Tax Owed | |
| Other Debt (Student Loan) | |
| Business Loan | |
| Investment Loan | |
| 401K Loan | |
| Life Insurance Loan | |
| Other Investment Loans | |
| Total Liabilities | $ - |

Net Worth $ -
(assets minus liabilities)

TOTAL LIABILITIES AND NET WORTH $ -

1400
FIG. 14

Annual Cash Flow Statement (TOTAL INFLOW MUST EQUAL TOTAL OUTFLOWS)

From: January 1, 20___ through _____, 20___

INFLOWS

Gross Salary $ _____
Part-Time Work _____
Self-Employment _____
Bonus/Overtime/Tips _____
Child Support _____
Pension _____
Social Security _____
Interest/Dividends _____
Other ( ) _____
Tax Refunds _____
Savings Withdrawls[1] _____
Investment Redemptions[2] _____

$ _____
*Must = gross annul income*

CASH OUTFLOWS

SAVINGS AND INVESTMENTS
Savings
   Emergency Fund $ _____
   Savings (General) _____
   Trip & Vacation Fund _____
   Short Term Goals: ( ) _____
   Long Term Goals: ( ) _____
   College Saving's Plan _____
Investment
   Retirement _____
   Other Investment _____

Total Savings and Investments $ _____

FIXED OUTFLOWS
Debt Obligations
   Mortgage[3] _____
   $2^{nd}$ Mortgage/Home Equity _____
   Auto loans _____
   Student loans _____
   Secured/Unsecured Loans _____
Insurance Premiums
   Auto $ _____
   Life _____
   Health _____
   Home owners/Renters _____
   Disability _____

1500
FIG. 15A

Family and Education
　Child Support/Alimony　　　　　　　　　　_____
　Alimony　　　　　　　　　　　　　　　　　_____
　Day Care/Camp　　　　　　　　　　　　　　_____
　School Tuition　　　　　　　　　　　　　　_____
　Lessons　　　　　　　　　　　　　　　　　_____
　Sports　　　　　　　　　　　　　　　　　　_____
　Other (　　　　　　　　　　)　　　　　　　_____

Housing and Utilities
　Rent　　　　　　　　　　　　　　　　　　　_____
　HOA Fees (includes trash collection)　　　_____
　House Security System　　　　　　　　　　_____
　Cable/satellite　　　　　　　　　　　　　　_____
　Internet　　　　　　　　　　　　　　　　　_____
　Trash Collection/Pest Control　　　　　　_____
　House cleaning　　　　　　　　　　　　　　_____
　Other (　　　　　　　　　　)　　　　　　　_____
　Other (　　　　　　　　　　)　　　　　　　_____

Contributions
　Tithes and Offerings　　　　　　　　　　　_____

Miscellaneous
　Other (　　　　　　　　　　)　　　　　　　_____
　Other (　　　　　　　　　　)　　　　　　　_____
　Other (　　　　　　　　　　)　　　　　　　_____
　Other (　　　　　　　　　　)　　　　　　　_____
　Other (　　　　　　　　　　)　　　　　　　_____
　Other (　　　　　　　　　　)　　　　　　　_____
　Other (　　　　　　　　　　)　　　　　　　_____

Total Fixed Outflows　　　　　　　　　$ _____

VARIABLE OUTFLOWS

Taxes
　Federal Withholding　　　　　　　　　　　_____
　State Withholding　　　　　　　　　　　　_____
　Real Estate (if paid separate from mortgage)　_____
　Property – Other　　　　　　　　　　　　　_____

Housing and Utilities
　Gas　　　　　　　　　　　　　　　　　　　_____
　Electric　　　　　　　　　　　　　　　　　_____
　Water/sewer　　　　　　　　　　　　　　　_____
　Phone (includes internet)　　　　　　　　_____
　Internet　　　　　　　　　　　　　　　　　_____
　Home repairs/maint.　　　　　　　　　　　_____

Transportation
　Gasoline　　　　　　　　　　　　　　　　　_____
　Parking　　　　　　　　　　　　　　　　　_____
　License tags　　　　　　　　　　　　　　　_____
　Repairs/maint.　　　　　　　　　　　　　　_____
　Bus/Subway/Cab　　　　　　　　　　　　　　_____
　Tolls/Carpool　　　　　　　　　　　　　　_____

Food
　Groceries　　　　　　　　　　　　　　　　_____
　Lunches/Snacks/Sodas　　　　　　　　　　　_____
　School lunches　　　　　　　　　　　　　　_____
　Dining Out　　　　　　　　　　　　　　　　_____

Clothing
   Parents
   Children
   Dry Cleaning/Laundry

Leisure and Recreation
   Videos/Compact Discs
   Movies/Plays/Concerts/Sporting Events
   Vacation Trips
   Sport/Hobby/Health Club
   Newspaper/Books/Magazines
   Other Entertainment

Contributions and Gifts
   Religious Contributions
   Charities
   Birthdays/Holidays
   Other: (

Medical/Dental
   Doctors/Dentist
   Prescriptions
   Vitamins

Allowances
   Parents
   Children

Personal
   Hair/Nails
   Toiletries
   Tobacco/Alcohol

DEBT OBLIGATIONS
   Credit Card 1 (      )
   Credit Card 2 (      )
   Credit Card 3 (      )
   Credit Card 4 (      )

OTHER (Don't leave anything out)
   Other (      )
   Other (      )
   Other (      )
   Other (      )
   Other (      )
   Other (      )
   Other (      )
   Other (      )
   Other (      )

Total Variable Outflows     $   -

Total Outflows     $   -

*Must = total inflows*

[1] Withdrawals from Savings
[2] Withdrawals and Redemptions from Retirement Accts, Mutual Funds, Stocks, Bonds & CD's
[3] Includes principal, interest, and property taxes

1500
FIG. 15C

Budget Ratio Analysis

| Category | Amount | % of Income | Spending Guidelines |
|---|---|---|---|
| Total Net Income | $ 2,000 | | |
| Charitable Giving / Tithes | $  - | 0% | 10% |
| Housing | $  - | 0% | 32-35% |
| Transportation | $  - | 0% | 9-20% |
| Food | $  - | 0% | 8-15% |
| Family Care | $  - | 0% | 8-19% |
| Total Living Expense | $  - | 0% | 27-35% |
| Debt Obligations | $  - | 0% | 18-28 |
| Leisure | $  - | 0% | 4-6% |
| Savings | $  - | 0% | 2-10% |
| Clothing | $  - | 0% | 6-8% |
| Health Care | $  - | 0% | 4-6% |
| Insurance | $  - | 0% | 7-9% |
| Debt to Income Ratio | | 0% | ≤36% |

Summary of Financial Findings

Based on the information presented in each lesson and your analytical review of the forms and reports completed in lessons 1-7, provide a summary of your initial impressions about what you've come to recognize or what has been confirm about your finances and/or financial life.

Finance and Financial Values Evaluation Questionnaire
(Abbreviated Sample)

I     Evaluating our Earthly Economics

A.    Savings
         1   Does saving for retirement have a lower priority than other savings goals.
         2   Do you know the maximum amount of discretionary income that you can splurge with each month and stay within you allotted limit?
         3   Do you have at least three to six months of living expenses put away in savings in for unforeseen events and emergencies.
         4   Do you contribute a set percentage of your income going regularly into a long-term retirement account each pay period?
         5

B.    Debt
         1   Is more than 15 percent of your income going to pay debts?
         2   Are you unable to save because any income left after bills are paid must go toward debt repayments
         3   Do you check your credit report at least annually and know that there are no discrepancies or issues that need to be addressed or corrected?
         4

C.    Wants vs. Needs

If your income was reduced by 10% are there things that you consider as needs that could be adjusted in your spending and you would still be content?

II     Reflecting our True Values and Priorities

A.    Uncovering Your True Values

1   Does your areas of spending or spending patterns contradict the areas of focus that reflect what you described in your Vision Statement?
         2   Are there areas requiring your money that that you believe strongly that God desires you to focus on but because of your hobbies and discretionary spending you lack the funds to move forward on?

B.    Committing to Priorities
         1   Do you often shop on impulse using money that was intended for something else?
         2   In looking at your Statement of Cash Flow and Statement of Financial Position, does the allocation of your money reflect what you listed as priorities and your desired goals?
         3   Does your areas of spending or spending patterns contradict the areas of focus that reflect what you described in your Vision Statement?

C. Focusing on Goals

1. Have you set defined target for things that you desire to accomplish and achieve in your life?
2. For goals that you must accumulate funds for, have you calculated exactly how much and when you should have so that the funds are fully available to secure your goal?
3. Do you have the potential to increase your income to get some of your most pressing financial issues but are unwilling to make the extra or sacrifice your free time?

D. Obedience to Faith Principles
1. Based on Scriptural teachings related to areas that comprise your financial life rate yourself on how well you are stewarding your finances in following areas?

- Spending     1   2   3   4   5
- Saving     1   2   3   4   5
- Giving     1   2   3   4   5
- Tithing     1   2   3   4   5
- Borrowing     1   2   3   4   5
- Lending     1   2   3   4   5
- Debt     1   2   3   4   5
- Work     1   2   3   4   5
- Family Responsibility     1   2   3   4   5
- Wealth     1   2   3   4   5
- Investing     1   2   3   4   5
- Counsel     1   2   3   4   5

III Disciplining our Habits and Tendencies

A. Resisting Temptation
1. Are there areas that you continue to splurge more than $50 a week while being frustrated about not having enough money for important things in your life?

2. Do you have a hard time going to the store and refraining from making unplanned purchase?
3. Do you often make choices that are financially motivated that oppose your values?

B. Lack of Discipline and Developing Discipline

1. Do you know that if you kept better records of your spending you would manage your finances better?
2. Do you on a regular basis, set goals so that you are not bouncing around form one thing to another?
3. Are you often distracted from activities and often don't complete what you set out to do?
4. Do you make sufficient income to meet your needs but often have bounced checks?
5. Does using a charge card cause you to incur more expenses than if you were using cash, checks or a debit card?

IV Examination of your attitudes and motives
    A. Wrong Motives as an Obstacle to God's Blessings
1. Do you often give expensive gifts that are more than you can afford to impress others?
2. Do you give out of expecting something back?
3. Do you tithe because you are looking for God to reward you with something?

B. Impatience and Developing Patience
1. When you want something, instead of saving for it, do you go out and get it on credit?
2. If you see something you want, do you first consult your budget and to determine whether it is affordable at the present time?
3. When you enter a long-term financial commitment do you rush into them without understanding all the terms?
4. When you make big-ticket purchases, such as a car, do you consider the long-term cost commitments and the associated costs, or just get what you want because you can afford to pay the monthly note?

C. Greed and Combating Greed
1. Do you always have to have the best of everything?
2. Do you often spend money so that you can keep up with the Joneses
3. Do spend a lot of money replacing things because you want the newest and updated versions while never having money to achieve more purposeful goals?
4. Do you tend to only make "investment" in what looks like a get-rich-quick endeavors but fail to take the required steps to develop a long-term financial plans?

Scriptural Database Content
(Abbreviated Sample)

I     Evaluating our Earthly Economics

A.     Savings

*Ants are creatures of little strength, yet they store up their food in the summer;*
                                                              Proverbs 30:25

*[6] Go to the ant, you sluggard; consider its ways and be wise! [7] It has no commander, no overseer or ruler, [8] yet it stores its provisions in summer and gathers its food at harvest.*            Proverb 6:6-9 NIV

*A good man leaveth an inheritance of his children's children: and the wealth of the sinner is laid up for the just.*        Proverbs 13:22

B.     Debt

*The wicked borrows and does not pay back, but the righteous is gracious and gives.*                                                    Psalm 37:21

*The rich ruleth over the poor, and the borrower is servant to the lender.*
                                                    Proverbs 22:7 NIV

*[27] Withhold not good from them to whom it is due, when it is in the power of thine hand to do it. [28] Say not unto they neighbour, Go, and come again, and tomorrow I will give; when thou hast it by thee.*      Proverbs 22:7 NIV

C.     Spending – Wants vs. Needs

*There is treasure to be desired and oil in the dwelling of the wise, but a foolish man spendeth it up.*                                   Proverbs 21:20

*He that loveth pleasure shall be a poor man he that loveth wine and oil shall not be rich.*                                                      Proverbs 21:17

II     Reflecting our True Values and Priorities

A.     Uncovering Your True Values

*[19] As a face is reflected in water, so the heart reflects the real person.*
                                                     Proverbs 27:19-20 (NLT)

B.     Committing to Priorities

*Therefore, since we are surrounded by such a great cloud of witnesses, let us throw off everything that hinders and the sin that so easily entangles, and let us run with perseverance the race marked out for us.*       Hebrews 12:1-3

*Turn my eyes away from worthless things; preserve my life according to your word.*
                                                       Psalm 119:37 NIV

1900
FIG. 19A

C. Focusing on Goals

*²⁴Do you not know that in a race all the runners run, but only one gets the prize? Run in such a way as to get the prize. ²⁵Everyone who competes in the games goes into strict training. They do it to get a crown that will last; but we do it to get a crown that will last forever. ²⁶Therefore I do not run like a man running aimlessly; I do not fight like a man beating the air.* 1 Corinthians 9:24-27 (NIV)

D. Obedience to Faith Principles

*But the one who hears my words and does not put them into practice is like a man who built a house on the ground without a foundation. The moment the torrent struck that house, it collapsed and its destruction was complete."* Luke 6:49 NIV

*Whatever you have learned or received or heard from me, or seen in me-put it into practice. An the God of peace will be with you.* Philippians 4:9 (NIV)

*"And a servant who knows what the master wants, but isn't prepared and doesn't carry out those instructions, will be severely punished.* Matthew 12:47 (NLT)

III Disciplining our Habits and Tendencies

A. Resisting Temptation

*¹³And remember, when you are being tempted, do not say, "God is tempting me." God is never tempted to do wrong, ¹ᵃ¹ and he never tempts anyone else. ¹⁴Temptation comes from our own desires, which entice us and drag us away. 15 These desires give birth so sinful actions. And when sin is allowed to grow, it gives birth to death.* James 1:13-15 (NLT)

B. Lack of Discipline and Developing Discipline

*Poverty and shame will come to him who neglects discipline, but he who regards reproof will be honored.* Proverbs 13:18

*The plans of diligent lead surely advantage, but every one who is hasty comes surely to poverty.* Proverbs 21:5

*He becometh poor that dealeth with a slack hand: but the hand of the diligent maketh rich.* Proverbs 10:3

*²Grace and peace be multiplied unto you through the knowledge of God, and of Jesus our Lord. ³According as his divine power hath given unto us all things that pertain unto life and godliness, through the knowledge of him that hath called us to glory and virtue: ⁴Whereby are given unto us exceeding great and precious promises: that by these ye might be partakers of the divine nature, having escaped the corruption that is in the world through lust. ⁵And beside this, giving all diligence, add to your faith virtue; and to virtue knowledge; ⁶And to knowledge temperance; and to temperance patience; and to patience godliness; ⁷And to godliness brotherly kindness; and to brotherly kindness charity. ⁸For if these things be in you, and abound, they make you that ye shall neither be barren nor unfruitful in the knowledge of our Lord Jesus Christ. ⁹But he that lacketh these things is blind, and cannot see afar off, and hath forgotten that he was purged from his old sins. ¹⁰Wherefore the rather, brethren, give diligence to make your calling and*

*election sure: for if ye do these things, ye shall never fall:*
2 Peter 1:2-10

IV  Confronting our Attitudes and Motives

A.    Wrong Motives as an Obstacle to God's Blessings

*All a man's ways seem innocent to him, but motives are weighed by the LORD*
Proverbs 16:3 NIV

*The LORD's light penetrates the human spirit, exposing every hidden motive.*
Proverbs 20:27 NLT

*When you ask, you do not receive, because you ask with wrong motives, that you may spend what you get on your pleasures.*     James 4:3

B.    Impatience and Developing Patience

*$^{35}$Cast not away therefore your confidence, which hath great recompence of reward. $^{36}$For ye have need of patience, that, after ye have done the will of God, ye might receive the promise.*     Hebrews 10:35-36

*And let us not be weary in well doing: for in due season we shall reap, if we faint not.*
Galatians 6:9

*Wait on the LORD: be of good courage, and he shall strengthen thine heart: wait, I say, on the LORD.*     Psalm 27:14

*$^{2}$Grace and peace be multiplied unto you through the knowledge of God, and of Jesus our Lord. $^{3}$According as his divine power hath given unto us all things that pertain unto life and godliness, through the knowledge of him that hath called us to glory and virtue: $^{4}$Whereby are given unto us exceeding great and precious promises: that by these ye might be partakers of the divine nature, having escaped the corruption that is in the world through lust. $^{5}$And beside this, giving all diligence, add to your faith virtue; and to virtue knowledge; $^{6}$And to knowledge temperance; <u>and to temperance patience</u>; and to patience godliness; $^{7}$And to godliness brotherly kindness; and to brotherly kindness charity. $^{8}$For if these things be in you, and abound, they make you that ye shall neither be barren nor unfruitful in the knowledge of our Lord Jesus Christ. $^{9}$But he that lacketh these things is blind, and cannot see afar off, and hath forgotten that he was purged from his old sins. $^{10}$Wherefore the rather, brethren, give diligence to make your calling and election sure: for if ye do these things, ye shall never fall:*
2 Peter 1:2-10

C.    Greed and Combating Greed

*$^{10}$Those who love money will never have enough. How absurd to think that wealth brings true happiness! $^{11}$The more you have, the more people come to help you spend it. So what is the advantage of wealth – except perhaps to watch it and run through your fingers!*
Ecclesiastes 5:10-11 NLT

*For the love of money is a root of all kinds of evil, for which some have strayed from the faith in their greediness, and pierced themselves through, with many sorrows.*
1 Timothy 6:10

*Have you found honey? Eat only what you need, lest you have it in excess and vomit it.*
Proverbs 25:16

*A faithful man shall abound with blessings: but he that maketh haste to be rich shall not be innocent.*
Proverbs 28:20

*$^{12}$I know how to get along with humble means, and I also know how to live in prosperity; in any and every circumstance I have <u>learned</u> the secret of being filled and going hungry, both of having abundance and suffering need. $^{13}$ can do all things through Him who strengthens me.*
Philippians 4:12-13

*$^6$But godliness with contentment is great gain. $^7$For we brought nothing into this world, and it is certain we can carry nothing out. $^8$And having food and raiment let us be therewith content.*
1 Timothy 6:6-8

D.     Developing Godly Motives

*$^{18}$ But when you are directed by the Holy Spirit, you are no longer subject to the law. $^{19}$When you follow the desires of your sinful nature, your lives will produce these evil results: sexual immorality, impure thoughts, eagerness for lustful pleasure, $^{20}$idolatry, participation in demonic activities, hostility, quarreling, jealousy, outbursts of anger, selfish ambition, divisions, the feeling that everyone is wrong except those in your own little group, $^{21}$envy, drunkenness, wild parties, and other kind of sin. Let me tell you again, as I have before, that anyone living that sort of life will not inherit the Kingdom of God. $^{22}$But when the Holy Spirit controls our lives, he will produce this kind of fruit in us: love, joy, peace, patience, kindness, goodness, faithfulness, $^{23}$gentleness, and self-control..........*
Galatians 5:18-22

Commitment Strategy Worksheet

| Actions and Attitudes I want to Change | Replace it with What? | What is Required to make this change happen? | Relevant Scriptures that will help my stewardship in this area. |
|---|---|---|---|
|  |  |  |  |
|  |  |  |  |
|  |  |  |  |
|  |  |  |  |
|  |  |  |  |
|  |  |  |  |
|  |  |  |  |
|  |  |  |  |
|  |  |  |  |
|  |  |  |  |
|  |  |  |  |
|  |  |  |  |

2000
FIG. 20

Income Allocation Adjustment Worksheet

MONTHLY NET INCOME:

| | Current Income | Necessary Changes | Preliminary Planned Income |
|---|---|---|---|
| | $ 3,000 | $ 400 | $ 2,600 |

| MONTHLY EXPENDITURES | Current Allocation $ | Necessary Changes + or (-) | Preliminary Planned Spending $ | Priority Level (Check one) | |
|---|---|---|---|---|---|
| | | | | Necessity | Nicety |
| HOUSING | | | | | |
| Mortgage/rent | $ - | | $ - | | |
| Home Owner Association/ Condo Fees | | | - | | |
| HOUSEHOLD MAINTENANCE | | | | | |
| Gas /Electric | | | - | | |
| Electric | | | - | | |
| Water/sewer | | | - | | |
| Trash Collection | | | - | | |
| Phone | | | - | | |
| Cable/satellite | | | - | | |
| Security Monitoring | | | - | | |
| Pest Control | | | - | | |
| Yard Services | | | - | | |
| Housekeeper | | | - | | |
| Repair and maintenance | | | - | | |
| Decorating and furnishings | | | - | | |
| Consumable Household Items (Non-Groceries) | | | - | | |
| Other ( ) | | | - | | |
| FOOD | | | | | |
| Groceries (Food Only) | | | - | | |
| Dining Out | | | - | | |
| Work Related Lunch | | | - | | |
| Snacks | | | - | | |
| Beverages/Coffee | | | - | | |
| Kid's School Lunches | | | - | | |
| Other ( ) | | | - | | |
| CLOTHING | | | | | |
| Adult's Clothes/Shoes | | | - | | |
| Kid's Clothes/Shoes | | | - | | |
| Dry Cleaning/Laundry/Alterations | | | - | | |
| Other ( ) | | | - | | |
| AUTO/TRANSPORTATION | | | | | |
| Fuel | | | - | | |
| Repairs/maintenance | | | - | | |
| Bus/Subway/Cab | | | - | | |
| Tolls | | | - | | |
| Lease Payments | | | - | | |
| Other ( ) | | | - | | |
| MEDICAL/DENTAL | | | | | |
| Doctors/Dentist | | | - | | |
| Prescriptions | | | - | | |
| Over the Counter Medicine/Vitamins | | | - | | |

2100
FIG. 21

Financial Priorities and Goal Setting Planner

Financial Life Personal Priorities:

1.) _____
2.) _____
3.) _____
4.) _____
5.) _____

Financial Life Personal Goals:

| | Priority Rank | Estimated Cost | Amount Already accumulated or available | Full funding target date | Target start date | Amount to save per monthh |
|---|---|---|---|---|---|---|

Short-term (Less than 1 year)

| | | | | | | |
|---|---|---|---|---|---|---|
| 1.) | | | | | | |
| 2.) | | | | | | |
| 3.) | | | | | | |
| 4.) | | | | | | |
| 5.) | | | | | | |

Intermediate-term (1 - 5 years)

| | | | | | | |
|---|---|---|---|---|---|---|
| 6.) | | | | | | |
| 7.) | | | | | | |
| 8.) | | | | | | |
| 9.) | | | | | | |
| 10.) | | | | | | |

Long-term (5 years or more)

| | | | | | | |
|---|---|---|---|---|---|---|
| 11.) | | | | | | |
| 12.) | | | | | | |
| 13.) | | | | | | |
| 14.) | | | | | | |
| 15.) | | | | | | |

Monthly Cost of Making Your Goals a Reality

GOAL #1

INPUT
- Goal Amount: $ 12,000
- APR Rate: 4.00% Annually
- Number of Years: 7.00 Years Monthly Savings to Reach your Goal: $ 123.61

Goal: _____

GOAL #2

INPUT
- Goal Amount: $ 13,000
- APR Rate: 8.00% Annually
- Number of Years: 5.00 Years Monthly Savings to Reach your Goal: $ 175.75

Goal: _____

GOAL #3

INPUT
- Goal Amount: $ 45,000
- APR Rate: 5.25% Annually
- Number of Years: 20.00 Years Monthly Savings to Reach your Goal: $ 105.89

Goal: _____

2300
FIG. 23

Monthly Cost of Reaching Your Accumulation Goal

INPUT
Number of Years to Reach Goal: 7.00 Years

| Accumulation Goal | Average Annual Return | | | | | | | | | | | |
|---|---|---|---|---|---|---|---|---|---|---|---|---|
| | 1% | 2% | 3% | 4% | 5% | 6% | 7% | 8% | 9% | 10% | 11% | 12% |
| $ 500 | 6 | 6 | 5 | 5 | 5 | 5 | 5 | 4 | 4 | 4 | 4 | 4 |
| $ 1,000 | 11 | 11 | 11 | 10 | 10 | 10 | 9 | 9 | 9 | 8 | 8 | 8 |
| $ 1,500 | 17 | 17 | 16 | 15 | 15 | 14 | 14 | 13 | 13 | 12 | 12 | 11 |
| $ 2,000 | 23 | 22 | 21 | 21 | 20 | 19 | 18 | 18 | 17 | 16 | 16 | 15 |
| $ 2,500 | 29 | 28 | 27 | 26 | 25 | 24 | 23 | 22 | 21 | 20 | 20 | 19 |
| $ 3,000 | 34 | 33 | 32 | 31 | 30 | 29 | 28 | 27 | 26 | 25 | 24 | 23 |
| $ 3,500 | 40 | 39 | 37 | 36 | 35 | 33 | 32 | 31 | 30 | 29 | 28 | 27 |
| $ 4,000 | 46 | 44 | 43 | 41 | 40 | 38 | 37 | 35 | 34 | 33 | 32 | 30 |
| $ 4,500 | 52 | 50 | 48 | 46 | 45 | 43 | 41 | 40 | 38 | 37 | 35 | 34 |
| $ 5,000 | 57 | 55 | 53 | 52 | 50 | 48 | 46 | 44 | 43 | 41 | 39 | 38 |
| $ 5,500 | 63 | 61 | 59 | 57 | 55 | 53 | 51 | 49 | 47 | 45 | 43 | 42 |
| $ 6,000 | 69 | 66 | 64 | 62 | 60 | 57 | 55 | 53 | 51 | 49 | 47 | 45 |
| $ 6,500 | 75 | 72 | 69 | 67 | 65 | 62 | 60 | 58 | 55 | 53 | 51 | 49 |
| $ 7,000 | 80 | 78 | 75 | 72 | 69 | 67 | 64 | 62 | 60 | 57 | 55 | 53 |
| $ 7,500 | 86 | 83 | 80 | 77 | 74 | 72 | 69 | 66 | 64 | 61 | 59 | 57 |
| $ 8,000 | 92 | 89 | 85 | 82 | 79 | 76 | 74 | 71 | 68 | 66 | 63 | 61 |
| $ 8,500 | 98 | 94 | 91 | 88 | 84 | 81 | 78 | 75 | 72 | 70 | 67 | 64 |
| $ 9,000 | 103 | 100 | 96 | 93 | 89 | 86 | 83 | 80 | 77 | 74 | 71 | 68 |
| $ 9,500 | 109 | 105 | 102 | 98 | 94 | 91 | 87 | 84 | 81 | 78 | 75 | 72 |
| $ 10,000 | 115 | 111 | 107 | 103 | 99 | 96 | 92 | 89 | 85 | 82 | 79 | 76 |
| $ 10,500 | 121 | 116 | 112 | 108 | 104 | 100 | 97 | 93 | 90 | 86 | 83 | 80 |
| $ 11,000 | 126 | 122 | 118 | 113 | 109 | 105 | 101 | 97 | 94 | 90 | 87 | 83 |
| $ 11,500 | 132 | 127 | 123 | 118 | 114 | 110 | 106 | 102 | 98 | 94 | 91 | 87 |
| $ 12,000 | 138 | 133 | 128 | 124 | 119 | 115 | 110 | 106 | 102 | 98 | 95 | 91 |
| $ 12,500 | 144 | 139 | 134 | 129 | 124 | 120 | 115 | 111 | 107 | 102 | 99 | 95 |
| $ 13,000 | 149 | 144 | 139 | 134 | 129 | 124 | 120 | 115 | 111 | 107 | 102 | 99 |
| $ 13,500 | 155 | 150 | 144 | 139 | 134 | 129 | 124 | 120 | 115 | 111 | 106 | 102 |

2400
FIG. 24A

Number of Years to Reach Goal: 7.00 Years

| Accumulation Goal | 1% | 2% | 3% | 4% | 5% | 6% | 7% | 8% | 9% | 10% | 11% | 12% |
|---|---|---|---|---|---|---|---|---|---|---|---|---|
| $ 14,000 | 161 | 155 | 150 | 144 | 139 | 134 | 129 | 124 | 119 | 115 | 110 | 106 |
| $ 14,500 | 167 | 161 | 155 | 149 | 144 | 139 | 133 | 128 | 124 | 119 | 114 | 110 |
| $ 15,000 | 172 | 166 | 160 | 155 | 149 | 143 | 138 | 133 | 128 | 123 | 118 | 114 |
| $ 15,500 | 178 | 172 | 166 | 160 | 154 | 148 | 143 | 137 | 132 | 127 | 122 | 117 |
| $ 16,000 | 184 | 177 | 171 | 165 | 159 | 153 | 147 | 142 | 136 | 131 | 126 | 121 |
| $ 16,500 | 190 | 183 | 176 | 170 | 164 | 158 | 152 | 146 | 141 | 135 | 130 | 125 |
| $ 17,000 | 195 | 188 | 182 | 175 | 169 | 163 | 156 | 151 | 145 | 139 | 134 | 129 |
| $ 17,500 | 201 | 194 | 187 | 180 | 174 | 167 | 161 | 155 | 149 | 143 | 138 | 133 |
| $ 18,000 | 207 | 199 | 192 | 185 | 179 | 172 | 166 | 159 | 153 | 148 | 142 | 136 |
| $ 18,500 | 213 | 205 | 198 | 191 | 184 | 177 | 170 | 164 | 158 | 152 | 146 | 140 |
| $ 19,000 | 218 | 211 | 203 | 196 | 189 | 182 | 175 | 168 | 162 | 156 | 150 | 144 |
| $ 19,500 | 224 | 216 | 208 | 201 | 194 | 186 | 180 | 173 | 166 | 160 | 154 | 148 |
| $ 20,000 | 230 | 222 | 214 | 206 | 199 | 191 | 184 | 177 | 171 | 164 | 158 | 152 |
| $ 20,500 | 236 | 227 | 219 | 211 | 203 | 196 | 189 | 182 | 175 | 168 | 162 | 155 |
| $ 21,000 | 241 | 233 | 224 | 216 | 208 | 201 | 193 | 186 | 179 | 172 | 166 | 159 |
| $ 21,500 | 247 | 238 | 230 | 221 | 213 | 206 | 198 | 191 | 183 | 176 | 169 | 163 |
| $ 22,000 | 253 | 244 | 235 | 227 | 218 | 210 | 203 | 195 | 188 | 180 | 173 | 167 |
| $ 22,500 | 258 | 249 | 240 | 232 | 223 | 215 | 207 | 199 | 192 | 184 | 177 | 170 |
| $ 23,000 | 264 | 255 | 246 | 237 | 228 | 220 | 212 | 204 | 196 | 189 | 181 | 174 |
| $ 23,500 | 270 | 260 | 251 | 242 | 233 | 225 | 216 | 208 | 200 | 193 | 185 | 178 |
| $ 24,000 | 276 | 266 | 256 | 247 | 238 | 229 | 221 | 213 | 205 | 197 | 189 | 182 |
| $ 24,500 | 281 | 272 | 262 | 252 | 243 | 234 | 226 | 217 | 209 | 201 | 193 | 186 |
| $ 25,000 | 287 | 277 | 267 | 258 | 248 | 239 | 230 | 222 | 213 | 205 | 197 | 189 |
| $ 26,000 | 299 | 288 | 278 | 268 | 258 | 249 | 239 | 230 | 222 | 213 | 205 | 197 |
| $ 27,000 | 310 | 299 | 289 | 278 | 268 | 258 | 249 | 239 | 230 | 221 | 213 | 205 |
| $ 28,000 | 322 | 310 | 299 | 288 | 278 | 268 | 258 | 248 | 239 | 230 | 221 | 212 |
| $ 29,000 | 333 | 321 | 310 | 299 | 288 | 277 | 267 | 257 | 247 | 238 | 229 | 220 |
| $ 30,000 | 345 | 332 | 321 | 309 | 298 | 287 | 275 | 266 | 256 | 246 | 237 | 227 |
| $ 31,000 | 356 | 344 | 331 | 319 | 308 | 296 | 285 | 275 | 264 | 254 | 244 | 235 |
| $ 32,000 | 368 | 355 | 342 | 330 | 318 | 306 | 295 | 284 | 273 | 262 | 252 | 242 |
| $ 33,000 | 379 | 366 | 353 | 340 | 328 | 316 | 304 | 292 | 281 | 271 | 260 | 250 |

Avergage Annual Return

2400
FIG. 24B

Number of Years to Reach Goal: 7.00 Years

| Accumulation Goal | \multicolumn{12}{c|}{Average Annual Return} |
| --- | --- | --- | --- | --- | --- | --- | --- | --- | --- | --- | --- | --- |
| | 1% | 2% | 3% | 4% | 5% | 6% | 7% | 8% | 9% | 10% | 11% | 12% |
| $ 34,000 | 391 | 377 | 363 | 350 | 337 | 325 | 313 | 301 | 290 | 279 | 268 | 258 |
| $ 35,000 | 402 | 388 | 374 | 361 | 347 | 335 | 322 | 310 | 298 | 287 | 276 | 265 |
| $ 36,000 | 414 | 399 | 385 | 371 | 357 | 344 | 331 | 319 | 307 | 295 | 284 | 273 |
| $ 37,000 | 425 | 410 | 395 | 381 | 367 | 354 | 341 | 328 | 315 | 303 | 292 | 280 |
| $ 38,000 | 437 | 421 | 406 | 391 | 377 | 363 | 350 | 337 | 324 | 312 | 300 | 288 |
| $ 39,000 | 448 | 432 | 417 | 402 | 387 | 373 | 359 | 346 | 332 | 320 | 307 | 296 |
| $ 40,000 | 460 | 443 | 427 | 412 | 397 | 382 | 368 | 354 | 341 | 328 | 315 | 303 |
| $ 50,000 | 574 | 554 | 534 | 515 | 496 | 478 | 460 | 443 | 426 | 410 | 394 | 379 |
| $ 60,000 | 689 | 665 | 641 | 618 | 596 | 574 | 552 | 532 | 512 | 492 | 473 | 455 |
| $ 70,000 | 804 | 776 | 748 | 721 | 695 | 669 | 644 | 620 | 597 | 574 | 552 | 530 |
| $ 80,000 | 919 | 887 | 855 | 824 | 794 | 765 | 736 | 709 | 682 | 656 | 631 | 606 |
| $ 90,000 | 1,034 | 997 | 962 | 927 | 893 | 860 | 829 | 797 | 767 | 738 | 710 | 682 |
| $ 100,000 | 1,149 | 1,108 | 1,069 | 1,030 | 993 | 956 | 921 | 886 | 853 | 820 | 788 | 758 |
| $ 150,000 | 1,723 | 1,662 | 1,603 | 1,545 | 1,489 | 1,434 | 1,381 | 1,329 | 1,279 | 1,230 | 1,183 | 1,137 |
| $ 200,000 | 2,298 | 2,216 | 2,137 | 2,060 | 1,985 | 1,912 | 1,841 | 1,772 | 1,705 | 1,640 | 1,577 | 1,515 |
| $ 250,000 | 2,872 | 2,771 | 2,672 | 2,575 | 2,481 | 2,390 | 2,301 | 2,215 | 2,131 | 2,050 | 1,971 | 1,894 |
| $ 300,000 | 3,447 | 3,325 | 3,206 | 3,090 | 2,978 | 2,868 | 2,762 | 2,658 | 2,558 | 2,460 | 2,365 | 2,273 |
| $ 350,000 | 4,021 | 3,879 | 3,740 | 3,605 | 3,474 | 3,346 | 3,222 | 3,101 | 2,984 | 2,870 | 2,759 | 2,652 |
| $ 400,000 | 4,595 | 4,433 | 4,275 | 4,120 | 3,970 | 3,824 | 3,682 | 3,544 | 3,410 | 3,280 | 3,153 | 3,031 |
| $ 450,000 | 5,170 | 4,987 | 4,809 | 4,636 | 4,467 | 4,302 | 4,143 | 3,987 | 3,836 | 3,690 | 3,548 | 3,410 |
| $ 500,000 | 5,744 | 5,541 | 5,343 | 5,151 | 4,963 | 4,780 | 4,603 | 4,430 | 4,263 | 4,100 | 3,942 | 3,788 |
| $ 550,000 | 6,319 | 6,095 | 5,878 | 5,666 | 5,459 | 5,258 | 5,063 | 4,873 | 4,689 | 4,510 | 4,336 | 4,167 |
| $ 600,000 | 6,893 | 6,649 | 6,412 | 6,181 | 5,956 | 5,736 | 5,523 | 5,316 | 5,115 | 4,920 | 4,730 | 4,546 |
| $ 650,000 | 7,467 | 7,203 | 6,946 | 6,696 | 6,452 | 6,214 | 5,984 | 5,759 | 5,541 | 5,330 | 5,124 | 4,925 |
| $ 700,000 | 8,042 | 7,758 | 7,481 | 7,211 | 6,948 | 6,693 | 6,444 | 6,202 | 5,968 | 5,740 | 5,518 | 5,304 |
| $ 750,000 | 8,616 | 8,312 | 8,015 | 7,726 | 7,444 | 7,171 | 6,904 | 6,645 | 6,394 | 6,150 | 5,913 | 5,683 |
| $ 800,000 | 9,191 | 8,866 | 8,549 | 8,241 | 7,941 | 7,649 | 7,365 | 7,088 | 6,820 | 6,560 | 6,307 | 6,062 |
| $ 850,000 | 9,765 | 9,420 | 9,084 | 8,756 | 8,437 | 8,127 | 7,825 | 7,531 | 7,246 | 6,970 | 6,701 | 6,440 |
| $ 900,000 | 10,340 | 9,974 | 9,618 | 9,271 | 8,933 | 8,605 | 8,285 | 7,974 | 7,673 | 7,380 | 7,095 | 6,819 |
| $ 950,000 | 10,914 | 10,528 | 10,152 | 9,786 | 9,430 | 9,083 | 8,745 | 8,417 | 8,099 | 7,790 | 7,489 | 7,198 |
| $ 1,000,000 | 11,488 | 11,082 | 10,687 | 10,301 | 9,926 | 9,561 | 9,206 | 8,860 | 8,525 | 8,200 | 7,884 | 7,577 |

2400
FIG. 24C

Number of Years to Reach Goal: 7.00 Years

| Accumulation Goal | \multicolumn{12}{c|}{Average Annual Return} |
| --- | --- | --- | --- | --- | --- | --- | --- | --- | --- | --- | --- | --- |
| | 1% | 2% | 3% | 4% | 5% | 6% | 7% | 8% | 9% | 10% | 11% | 12% |
| $1,050,000 | 12,063 | 11,636 | 11,221 | 10,816 | 10,422 | 10,039 | 9,666 | 9,304 | 8,951 | 8,609 | 8,278 | 7,956 |
| $1,100,000 | 12,637 | 12,191 | 11,755 | 11,331 | 10,918 | 10,517 | 10,126 | 9,747 | 9,378 | 9,019 | 8,672 | 8,335 |
| $1,150,000 | 13,212 | 12,745 | 12,290 | 11,846 | 11,415 | 10,995 | 10,586 | 10,190 | 9,804 | 9,429 | 9,066 | 8,714 |
| $1,200,000 | 13,786 | 13,299 | 12,824 | 12,361 | 11,911 | 11,473 | 11,047 | 10,633 | 10,230 | 9,839 | 9,460 | 9,092 |
| $1,250,000 | 14,360 | 13,853 | 13,358 | 12,876 | 12,407 | 11,951 | 11,507 | 11,076 | 10,656 | 10,249 | 9,854 | 9,471 |
| $1,300,000 | 14,935 | 14,407 | 13,893 | 13,391 | 12,904 | 12,429 | 11,967 | 11,519 | 11,083 | 10,659 | 10,249 | 9,850 |
| $1,350,000 | 15,509 | 14,961 | 14,427 | 13,907 | 13,400 | 12,907 | 12,428 | 11,962 | 11,509 | 11,069 | 10,643 | 10,229 |
| $1,400,000 | 16,084 | 15,515 | 14,961 | 14,422 | 13,896 | 13,385 | 12,888 | 12,405 | 11,935 | 11,479 | 11,037 | 10,608 |
| $1,450,000 | 16,658 | 16,069 | 15,496 | 14,937 | 14,393 | 13,863 | 13,348 | 12,848 | 12,361 | 11,889 | 11,431 | 10,987 |
| $1,500,000 | 17,233 | 16,623 | 16,030 | 15,452 | 14,889 | 14,341 | 13,808 | 13,291 | 12,788 | 12,299 | 11,825 | 11,365 |
| $1,550,000 | 17,807 | 17,178 | 16,564 | 15,967 | 15,385 | 14,819 | 14,269 | 13,734 | 13,214 | 12,709 | 12,219 | 11,744 |
| $1,600,000 | 18,381 | 17,732 | 17,099 | 16,482 | 15,881 | 15,297 | 14,729 | 14,177 | 13,640 | 13,119 | 12,614 | 12,123 |
| $1,650,000 | 18,956 | 18,286 | 17,633 | 16,997 | 16,378 | 15,775 | 15,189 | 14,620 | 14,066 | 13,529 | 13,008 | 12,502 |
| $1,700,000 | 19,530 | 18,840 | 18,167 | 17,512 | 16,874 | 16,253 | 15,650 | 15,063 | 14,493 | 13,939 | 13,402 | 12,881 |
| $1,750,000 | 20,105 | 19,394 | 18,702 | 18,027 | 17,370 | 16,731 | 16,110 | 15,506 | 14,919 | 14,349 | 13,796 | 13,260 |
| $1,800,000 | 20,679 | 19,948 | 19,236 | 18,542 | 17,867 | 17,209 | 16,570 | 15,949 | 15,345 | 14,759 | 14,190 | 13,639 |
| $1,850,000 | 21,253 | 20,502 | 19,770 | 19,057 | 18,363 | 17,687 | 17,030 | 16,392 | 15,772 | 15,169 | 14,584 | 14,017 |
| $1,900,000 | 21,828 | 21,056 | 20,305 | 19,572 | 18,859 | 18,165 | 17,491 | 16,835 | 16,198 | 15,578 | 14,979 | 14,396 |
| $1,950,000 | 22,402 | 21,610 | 20,839 | 20,087 | 19,355 | 18,643 | 17,951 | 17,278 | 16,624 | 15,989 | 15,373 | 14,775 |
| $2,000,000 | 22,977 | 22,165 | 21,373 | 20,602 | 19,852 | 19,122 | 18,411 | 17,721 | 17,050 | 16,399 | 15,767 | 15,154 |
| $2,500,000 | 28,721 | 27,706 | 26,716 | 25,753 | 24,815 | 23,902 | 23,014 | 22,151 | 21,313 | 20,499 | 19,709 | 18,942 |
| $3,000,000 | 34,465 | 33,247 | 32,060 | 30,903 | 29,778 | 28,682 | 27,617 | 26,581 | 25,575 | 24,599 | 23,651 | 22,731 |
| $3,500,000 | 40,209 | 38,788 | 37,403 | 36,054 | 34,741 | 33,463 | 32,220 | 31,012 | 29,838 | 28,698 | 27,592 | 26,519 |
| $4,000,000 | 45,953 | 44,329 | 42,746 | 41,205 | 39,704 | 38,243 | 36,823 | 35,442 | 34,101 | 32,798 | 31,534 | 30,308 |
| $4,500,000 | 51,698 | 49,870 | 48,090 | 46,355 | 44,666 | 43,023 | 41,425 | 39,872 | 38,363 | 36,898 | 35,476 | 34,096 |
| $5,000,000 | 57,442 | 55,411 | 53,433 | 51,506 | 49,629 | 47,804 | 46,028 | 44,302 | 42,626 | 40,998 | 39,418 | 37,885 |

2400
FIG. 24D

Determining your Retirement Savings Goals

1) What is your goal?
   To have a monthly or annual income flow that covers your expenses or even better, supports your desired lifestyle.
2) What is required to achieve this goal. What is the financial and non-financial cost?

Planning requirements:
   Estimate your income needs in Retirement.
   Estimate income requirement that must be provided through Retirement Savings.
   Estimate the total accumulated Retirement Savings needed to provide for your desired income flow.
   Estimate your monthly cost to accumulate required Retirement Funds to achieve your Goal.

☐ PLANNING STEP 1: ESTIMATE INCOME NEEDED IN RETIREMENT

Estimate the amount of your monthly expenses in retirement based on today's dollars to determine your retirement income requirements? Can you afford a pay cut?

| | |
|---|---|
| Projected Monthly Expenses | $ 6,000 |
| Projected Estimated Annual Expenses | $ 72,000 (in today's dollars) |
| Number of years until retirement | 25 |
| Projected annual inflation rate | 2.5% (the annual increase in prices) |
| Monthly inflation-adjusted, retirement income needed | $ 11,124 |

☐ PLANNING STEP 2: ESTIMATE INCOME THAT WILL BE REQUIRED FROM RETIREMENT SAVINGS

| | |
|---|---|
| Total Monthly Income Required | $ 11,124 |

Less: Income Received from:

| | |
|---|---|
| Pensions | $ - |
| Social Security | $ - |
| Part-time Employment | $ - |
| Total income from Sources other than Savings | $ - |
| Monthly income Shortfall Required from Savings = | $ 11,124 |

☐ PLANNING STEP 3: FIGURING HOW MUCH YOU NEED TO ACCUMULATE

How much is needed in savings to provide  $ 11,124  monthly
                                or  $133,484  annually?
Depends on:

| | |
|---|---|
| Number of Years Money Must Last | 25 |
| Average Rate of Return during retirement | 7% |
| Accumulated Retirement Assets Required = | $ 1,155,567 |

☐ STEP 4: HOW MUCH MUST YOU SAVE MONTHLY TO ACCUMULATE
What amount must you save monthly to accumulate    $ 1,155,567?

Depends on:

| | |
|---|---|
| Amount currently invested | $500,000 |
| Avg. Rate of Return during accumulation period | 8% annually |
| Number of years you will be saving | 25 |
| Annual amount you should be saving to reach your goal = | $ 11,910 |
| Monthly amount you should be saving to reach your goal = | $ (2,130) |

---

Determining your Retirement Savings Goals

1) What is your goal?
   To have a monthly or annual income flow that covers your expenses or even better, supports your desired lifestyle.
2) What is required to achieve this goal. What is the financial and non-financial cost?

Planning requirements:
   Estimate your income needs in Retirement.
   Estimate income requirement that must be provided through Retirement Savings.
   Estimate the total accumulated Retirement Savings needed to provide for your desired income flow.
   Estimate your monthly cost to accumulate required Retirement Funds to achieve your Goal.

☐ PLANNING STEP 1: ESTIMATE INCOME NEEDED IN RETIREMENT

Estimate the amount of your monthly expenses in retirement based on today's dollars to determine your retirement income requirements? Can you afford a pay cut?

| | |
|---|---|
| Projected Monthly Expenses | $ 6,000 |
| Projected Estimated Annual Expenses | $ 72,000 (in today's dollars) |
| Number of years until retirement | 25 |
| Projected annual inflation rate | 2.5% (the annual increase in prices) |
| Annual inflation-adjusted, retirement income needed | $ 11,124 |

☐ PLANNING STEP 2: ESTIMATE INCOME THAT WILL BE REQUIRED FROM RETIREMENT SAVINGS

| | |
|---|---|
| Total Monthly Income Required | $ 5,000 |

Less: Income Received from:

| | |
|---|---|
| Pensions | $ - |
| Social Security | $ - |
| Part-time Employment | $ - |
| Total income from Sources other than Savings | $ - |
| Monthly income Shortfall Required from Savings = | $ 5,000 |

☐ PLANNING STEP 3: FIGURING HOW MUCH YOU NEED TO ACCUMULATE

How much is needed in savings to provide  $ 10,077  monthly
                                or  $120,924  annually?
Depends on:

| | |
|---|---|
| Number of Years Money Must Last | 25 |
| Average Rate of Return during retirement | 7% |
| Accumulated Retirement Assets Required = | $ 1,408,198 |

☐ STEP 4: HOW MUCH MUST YOU SAVE MONTHLY TO ACCUMULATE
What amount must you save monthly to accumulate    $ 1,409,282?

Depends on:

| | |
|---|---|
| Amount currently invested | $500,000 |
| Avg. Rate of Return during accumulation period | 8% annually |
| Number of years you will be saving | 21 |
| Annual amount you should be saving to reach your goal = | $ 17,968 |
| Monthly amount you should be saving to reach your goal = | $ (1,831) |

2500
FIG. 25

Income Allocation Adjustment Worksheet

MONTHLY NET INCOME:

| | Current Income | Necessary Changes | Preliminary Planned Income |
|---|---|---|---|
| | $ 3,000 | $ 400 | $ 2,600 |

| MONTHLY EXPENDITURES | Current Allocation $ | Necessary Changes + or (-) | Preliminary Planned Spending $ | Priority Level - Necessity | Priority Level - Nicety |
|---|---|---|---|---|---|
| HOUSING | | | | | |
| Mortgage/rent | $ | - | $ | - | |
| Home Owner Association/ Condo Fees | | | | - | |
| HOUSEHOLD MAINTENANCE | | | | | |
| Gas /Electric | | | | - | |
| Electric | | | | - | |
| Water/sewer | | | | - | |
| Trash Collection | | | | - | |
| Phone | | | | - | |
| Cable/satellite | | | | - | |
| Security Monitoring | | | | - | |
| Pest Control | | | | - | |
| Yard Services | | | | - | |
| Housekeeper | | | | - | |
| Repair and maintenance | | | | - | |
| Decorating and furnishings | | | | - | |
| Consumable Household Items (Non-Groceries) | | | | - | |
| Other ( ) | | | | - | |
| FOOD | | | | | |
| Groceries (Food Only) | | | | - | |
| Dining Out | | | | - | |
| Work Related Lunch | | | | - | |
| Snacks | | | | - | |
| Beverages/Coffee | | | | - | |
| Kid's School Lunches | | | | - | |
| Other ( ) | | | | - | |
| CLOTHING | | | | | |
| Adult's Clothes/Shoes | | | | - | |
| Kid's Clothes/Shoes | | | | - | |
| Dry Cleaning/Laundry/Alterations | | | | - | |
| Other ( ) | | | | - | |
| AUTO/TRANSPORTATION | | | | | |
| Fuel | | | | - | |
| Repairs/maintenance | | | | - | |
| Bus/Subway/Cab | | | | - | |
| Tolls | | | | - | |
| Lease Payments | | | | - | |
| Other ( ) | | | | - | |
| MEDICAL/DENTAL | | | | | |
| Doctors/Dentist | | | | - | |
| Prescriptions | | | | - | |
| Over the Counter Medicine/Vitamins | | | | - | |

2600
FIG. 26A

| MONTHLY EXPENDITURES | Current Allocation $ | Necessary Changes + or ( - ) | Preliminary Planned Spending $ | Priority Level Check one | |
|---|---|---|---|---|---|
| | | | | Necessity | Nicety |
| Other ( ) | | | - | | |
| INSURANCE | | | | | |
| Auto | | | - | | |
| Life | | | - | | |
| Health | | | - | | |
| Home owners/Renters | | | - | | |
| Disability | | | - | | |
| Long-term care | | | - | | |
| PERSONAL GROOMING / MAINTENANCE | | | | | |
| Hair | | | - | | |
| Nails | | | - | | |
| Spa Treatments/Pedicures/Massages | | | - | | |
| Cosmetics | | | - | | |
| Toiletries | | | - | | |
| Other ( ) | | | - | | |
| GIFTS & DONATIONS | | | | | |
| Tithes | | | - | | |
| Church Offerings and Contributions | | | - | | |
| Charities & Charitable Donations | | | - | | |
| Birthdays/Holidays | | | - | | |
| Other ( ) | | | - | | |
| LEISURE | | | | | |
| Music (CD's, Computer Downloads, Satellite Radio, etc.) | | | - | | |
| Event Tickets (Movies/Plays/Concerts/Sporting Events) | | | - | | |
| Computer games/video games/software | | | - | | |
| Vacation / Travel | | | - | | |
| Weekend/Day Trips | | | - | | |
| Sports/Health Club (Including equipment & apparel) | | | - | | |
| Hobbies | | | - | | |
| Socializing (Get-togethers, cookouts, dinner out, drinks) | | | - | | |
| At-home leisure (books, subscriptions, movies, alcohol) | | | - | | |
| Personal Enjoyment (Cigarettes, Beer, Wine, Liquor, Other) | | | - | | |
| Other ( ) | | | | | |
| FAMILY/KIDS | | | | | |
| Child Support/Alimony | | | - | | |
| Day Care/Camp | | | - | | |
| Tuition | | | - | | |
| Lessons | | | - | | |
| Babysitters | | | - | | |
| Sports | | | - | | |
| Allowances | | | - | | |
| Untrackable Cash for Kids | | | - | | |
| Toys/Games/Gadgets | | | - | | |
| Pet | | | - | | |
| Other ( ) | | | - | | |
| Other ( ) | | | - | | |
| COMMUNICATIONS/COMPUTER | | | | | |
| Cell Phones | | | - | | |
| Internet Access | | | - | | |
| PDA services | | | - | | |
| Other Internet Service Fees | | | | | |
| Computer expenses | | | | | |

Spending and Savings Plan
(TOTAL INFLOW MUST EQUAL TOTAL OUTFLOWS)

INFLOWS

Gross Salary                              $ _____
    Part-Time Work                          _____
    Self-Employment                        _____
    Bonus/Overtime/Tips                  _____
    Child Support                             _____
    Pension                                       _____
    Social Security                             _____
    Interest/Dividends                      _____
    Other (                    )                _____
    Savings Withdrawals *
    Investment Redemptions*            $ _____

TOTAL INFLOWS

CASH OUTFLOWS

SAVINGS AND INVESTMENTS
Savings
    Emergency Fund                      $ _____
    Savings (General)
    Trip & Vacation Fund
    Short Term Goals: (          )
    Long Term Goals: (          )
    College Saving's Plan
Investment
    Retirement
    Other Investment

Total Savings and Investments     $ _____

FIXED OUTFLOWS
Debt Obligations
    Mortgage*
    2nd Mortgage/Home Equity
    Auto loans
    Student Loans
    Secured/Unsecured Loans
Insurance Premiums
    Auto                                       $ _____
    Life
    Health
    Home owners/Renters
    Disability
    Long-term care
Payroll Taxes
    FICA
    Medicare
Family and Education
    Child Support/Alimony
    Alimony
    Day Care/Camp

2700
FIG. 27A

School Tuition
Lessons
Sports
Other (            )
Housing and Utilities
  Rent
  HOA Fees (includes trash collection)
  House Security System
  Cable/satellite
  Internet
  Trash Collection/Pest Control
  House cleaning
  Other (            )
  Other (            )
Contributions
  Tithes and Offerings
Miscellaneous
  Other (            )
  Other (            )
  Other (            )
  Other (            )
  Other (            )
  Other (            )
  Other (            )

Total Fixed Outflows    $   -

VARIABLE OUTFLOWS

Taxes
  Federal Withholding
  State Withholding
  Real Estate (if paid separate from mortgage)
  Property - Other
Housing and Utilities
  Gas
  Electric
  Water/sewer
  Phone (includes Internet)
  Internet
  Home repairs/maint.
Transportation
  Gasoline
  Parking
  License tags
  Repairs/maint.
  Bus/Subway/Cab
  Tolls/Carpool
Food
  Groceries
  Lunches/Snacks/Sodas
  School lunches
  Dining Out
Clothing
  Parents
  Children
  Dry Cleaning/Laundry
Leisure and Recreation
  Videos/Compact Discs
  Movies/Plays/Concerts/Sporting Events
  Vacation Trips

2700
FIG. 27B

Sport/Hobby/Health Club
Newspaper/Books/Magazines
Other Entertainment
Contributions and Gifts
   Religious Contributions
   Charities
   Birthdays/Holidays
   Other: (            )
Medical/Dental
   Doctors/Dentist
   Prescriptions
   Vitamins
Allowances
   Parents
   Children
Personal
   Hair/Nails
   Toiletries
   Tobacco/Alcohol
DEBT OBLIGATIONS
   Credit Card 1 (            )
   Credit Card 2 (            )
   Credit Card 3 (            )
   Credit Card 4 (            )
OTHER (Don't leave anything out)
   Other (            )
   Other (            )
   Other (            )
   Other (            )
   Other (            )
   Other (            )
   Other (            )
   Other (            )
   Other (            )

Total Variable Outflows        $ -

TOTAL OUTFLOWS        $0.00
                                  *Must = total inflows*

[1] Withdrawals from Savings

[2] Withdrawals and Redemptions from Retirement Accts, Mutual Funds, Stocks, Bonds & CD's

[3] Includes principal, interest, and property taxes

2800

SYSTEM, DEVICE AND METHOD FOR DETECTING AND MONITORING A BIOLOGICAL STRESS RESPONSE FOR FINANCIAL RULES BEHAVIOR

CROSS-REFERENCE TO RELATED APPLICATION

This application is a continuation-in-part of U.S. patent application Ser. No. 14/159,312, filed Jan. 20, 2014, now pending, which is a continuation of U.S. patent application Ser. No. 12/219,386, filed Jul. 21, 2008, now U.S. Pat. No. 8,635,101, issued on Jan. 21, 2014, which claims benefit of U.S. Provisional Patent Application No. 60/935,002, filed on Jul. 20, 2007. The subject matter of the earlier filed application is hereby incorporated by reference.

FIELD OF THE INVENTION

The present teachings relate to devices and methods for monitoring and capturing biological data as a user makes a financial decision. For example, biological data can be captured while a user conducts a financial transaction (i.e. shopping). In another example, biological data can be captured during a financial review (i.e. a financial planning or financial coaching session). The devices and methods perform an analysis to determine whether behavior, reflected by the user's financial outcomes and experiences are adverse to the user's financial priorities. If financial behaviors or decisions are adverse, the devices and methods provide a stimulatory effect to the user to bring awareness or mitigate the adverse behaviors decision patterns based on the user's specific financial priorities.

BACKGROUND OF THE INVENTION

The scientific and finance fields of behavioral economics and neuroeconomics provide evidence of how our normal cognitive and neural mental processes cause us to make choices that often work against us economically. In large part, the cause is the subconscious functions of the brain delegating choices, for which we're not aware. Our biological and neurological designs influence choices, preferences, and behavior.

On the other hand, consumers commonly subconsciously succumb to temptations and make regrettable financial decisions even though their intuitions or "inner voices" alert them to the potential pitfalls of the judgments used to make their decisions. Despite the warnings of their intuitions, by participating in any of these adverse behaviors, the user consumer has engaged in "undisciplined economic behavior".

Either way, undisciplined financial behavior, puts a strain on resources and can easily derail a consumer's economic goals and life outcomes. The behavioral influences of undisciplined financial behavior, such as instant gratification,— emotional spending, or keeping up with the Jones', can keep a consumer from making choices based on other more important life values, such as, for example, family, spiritual relationship, creative pursuits, or a secure and comfortable retirement lifestyle. Economic improvement is a challenge for many people because behavioral change is difficult. Because of the way our brains are designed, there exist a competing inverse relationship between our deliberate, intentional decisions and our brain's penchant toward reactive, habitual and emotionally-driven behaviors. The emotional and subconscious functions of our brain both dominate and influence its reflective logical functions. Behavior patterns that impact our economic outcomes are highly susceptible to this brain phenomenon. The dominance of emotional functions is responsible for the disconnect experienced when a person's financial behaviors remain out of alignment with their goals and the limitations of their resources. The disconnect causes cognitive dissonance. Although, we're mostly not conscious of this emotional dominance, eventually we experience cognitive dissonance when our financial decisions violate our truest intentions, and measurable stress results in our bodies. According to the cognitive dissonance theory, a person seeks to keep their life expectations and their reality aligned. In order to alleviate the resulting discomfort, one is driven to change either their cognition or their behavior. More often than not, it is cognition that is temporarily modified to support the behavior. As a result, consumers persist in their default mode toward habitual and short-term reward seeking patterns of behavior that fail to fulfill to satisfy inherently motivated desires.

It may be desirable to provide a program and method that, when implemented by the user or assisting financial planner or coach, serves to help improve economic decisions and behaviors that ultimately bring the user's financial behaviors into alignment with their values, vision goals, priorities, and planned intentions.

It may further be desirable to provide an apparatus and method that instantaneously and dynamically, during or following a financial transaction or a financial decision, detects a consumer's propensity to engage in emotion driven financial behavior based on the user's biological data. It may also be desirable to provide an apparatus and method that performs a comparative analysis that ensures that the consumer is using his or her resources in a manner that is consistent with the user's true values, goals, priorities, and intentions.

It may further be desirable to provide an apparatus and method that enables a user to develop economic objectives financial goals and economic objectives that combine a traditional system of economic guidance with a values-focused system of economic guidance to facilitate a modification in financial behaviors and economic decision making. It may also be desirable to provide an apparatus and method that performs a computational analysis to determine whether the user's financial decision or financial transaction is adverse to the user's financial planning goals. If the financial decision or financial transaction is adverse, the devices and methods provide a stimulatory effect to the user to mitigate the adverse financial decision or facilitate a future modification in financial behaviors and decisions based on the user's specific financial priorities.

SUMMARY OF THE INVENTION

The present invention may satisfy one or more of the above-mentioned desirable features. Other features and/or aspects may become apparent from the description which follows.

A wearable biometric device according to various exemplary embodiments can include a user interface, a location unit, a biometric sensor, a stimuli generating unit, a transceiver and a processor. The user interface having a display receives information from a user. The location unit detects location information of the wearable biometric device and communicates the location information to a location service and from the location service to the wearable biometric device. A memory is configured to store instructions executable by the processor. The processor is operatively coupled to the user interface, the location unit, the biometric sensor, the stimuli generating unit, the transceiver and the memory. The processor configured to: define one or more geo-fences having a virtual boundary relative to one or more respective physical locations; detect a geo-fence crossing when the wearable biometric device crosses any of the one or more geo-fences; activate a geo-fence application and a biometric application, in response to the detection of a geofence crossing; define, based on the physical location, at least one of a type of geo-fence event, a type of geo-fence transition, and a type of predefined geofence trigger event; receive financial data of the user based on the at least one of the type of geo-fence event, the type of geo-fence transition, and the type of predefined geofence trigger event; monitor financial transactions of the user while the wearable biometric device is located within the geo-fence; activate the biometric sensor to detect one or more biometric conditions of the user and determine if the one or more biometric conditions of the user exceeds a predetermined threshold while the wearable biometric device is located within the geo-fence; activate the stimuli generating unit to detect if the user experiences a biometric stressor due to the one or more biometric conditions of the user exceeding the predetermined threshold while the wearable biometric device is located within the geo-fence and activate the stimuli generating unit to apply one or more stimuli to the user until the biometric stressor experienced by the user is below the predetermined threshold; and deactivate the one or more geo-fences relative to the one or more physical locations when the wearable biometric device exits the one or more geo-fences.

A method performed by a wearable biometric device that is a mobile device comprising a processor and a non-transitory computer-readable storage medium storing instructions that, when executed, cause the mobile device to perform the method according to various exemplary embodiments can include defining one or more geo-fences having a virtual boundary relative to one or more respective physical locations; detecting a geo-fence crossing when the wearable biometric device crosses any of the one or more geo-fences; activating a geo-fence application and a biometric application, in response to the detection of a geofence crossing; defining, based on the physical location, at least one of a type of geo-fence event, a type of geo-fence transition, and a type of predefined geofence trigger event; receiving financial data of a user based on the at least one of the type of geo-fence event, the type of geo-fence transition, and the type of predefined geofence trigger event; monitoring financial transactions of the user while the wearable biometric device is located within the geo-fence; activating a biometric sensor included within the wearable biometric device to detect one or more biometric conditions of the user and determine if the one or more biometric conditions of the user exceeds a predetermined threshold while the wearable biometric device is located within the geo-fence; activating the stimuli generating unit included within the wearable biometric device to detect if the user experiences a biometric stressor due to the one or more biometric conditions of the user exceeding the predetermined threshold while the wearable biometric device is located within the geo-fence and activating the stimuli generating unit to apply one or more stimuli to the user until the biometric stressor experienced by the user is below the predetermined threshold; and deactivating the one or more geo-fences relative to the one or more physical locations when the wearable biometric device exits the one or more geo-fences.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate one (several) embodiment(s) of the invention and together with the description, serve to explain the principles of the invention.

BRIEF DESCRIPTION OF THE DRAWINGS

FIG. 4A shows an example of an expense record log that can be employed in accordance with the financial behavior rules database and faith-based rules database of the present teaching;

FIG. 4B shows an example of a weekly spending report that can be employed in accordance with the financial behavior rules database and faith-based rules database of the present teaching;

FIG. 5A shows an example of a monthly income and expense analysis worksheet which can be employed in accordance with the financial behavior rules database and faith-based rules database of the present teachings;

FIGS. 5B and 5C show an example of a weekly expenditure worksheet which can be employed in accordance with the financial behavior rules database and faith-based rules database of the present teachings;

FIG. 6 shows an example of a values and vision statement evaluation tool which can be employed in accordance with the financial behavior rules database and faith-based rules database of the present teachings;

FIG. 7 shows an example of a personal visional statement tool which can be employed in accordance with the financial behavior rules database and faith-based rules database of the present teachings;

FIG. 8 shows an example of a debt ledger which can be employed in accordance with the financial behavior rules database and faith-based rules database of the present teachings;

FIG. 9 shows an example of a debt tracker which can be employed in accordance with the financial behavior rules database and faith-based rules database of the present teachings;

FIG. 10 shows an example of a loan transaction ledger which can be employed in accordance with the financial behavior rules database and faith-based rules database of the present teachings;

FIGS. 11A and 11B show an example of a balanced goals worksheet which can be employed in accordance with the financial behavior rules database and faith-based rules database of the present teachings; and FIG. 12 shows an example of a balanced priorities worksheet which can be employed in accordance with the financial behavior rules database and faith-based rules database of the present teachings;

FIG. 13 shows an example of a financial planning personal goals and priorities worksheet which can be employed in accordance with the financial behavior rules database and faith-based rules database of the present teachings;

FIG. 14 shows an example of a statement of financial position worksheet which can be employed in accordance with the financial behavior rules database and faith-based rules database of the present teachings;

FIGS. 15A-15C show a cash flow statement worksheet which can be employed in accordance with the financial behavior rules database and faith-based rules database of the present teachings;

FIG. 16 shows an example of a budget ratio analysis which can be employed in accordance with the financial behavior rules database and faith-based rules database of the present teachings;

FIG. 17 shows an example of a summary of financial findings which can be employed in accordance with the financial behavior rules database and faith-based rules database of the present teachings;

FIGS. 18A-18C show a finance and financial values evaluation questionnaire which can be employed in accordance with the financial behavior rules database and faith-based rules database of the present teachings;

FIGS. 19A-19D illustrate an exemplary embodiment of the content of a Scripture database which can be employed in accordance with the financial behavior rules database and faith-based rules database of the present teachings;

FIG. 20 shows an example of a commitment strategy worksheet which can be employed in accordance with the financial behavior rules database and faith-based rules database of the present teachings;

FIG. 21 shows an example of an income allocation adjustment worksheet which can be employed in accordance with the financial behavior rules database and faith-based rules database of the present teachings;

FIG. 22 shows an example of a financial priorities and goal setting planner which can be employed in accordance with the financial behavior rules database and faith-based rules database of the present teachings;

FIG. 23 shows an example of a goal funding planner which can be employed in accordance with the financial behavior rules database and faith-based rules database of the present teachings;

FIGS. 24A-24D show an example of a target accumulation planner which can be employed in accordance with the financial behavior rules database and faith-based rules database of the present teachings;

FIG. 25 shows an example of a retirement savings goal calculator which can be employed in accordance with the financial behavior rules database and faith-based rules database of the present teachings;

FIGS. 26A-26B show an example of an income allocation adjustment worksheet which can be employed in accordance with the financial behavior rules database and faith-based rules database of the present teachings;

FIGS. 27A-27C show an example of a spending and savings plan which can be employed in accordance with the financial behavior rules database and faith-based rules database of the present teachings;

DESCRIPTION OF THE EMBODIMENTS

Figure 1:
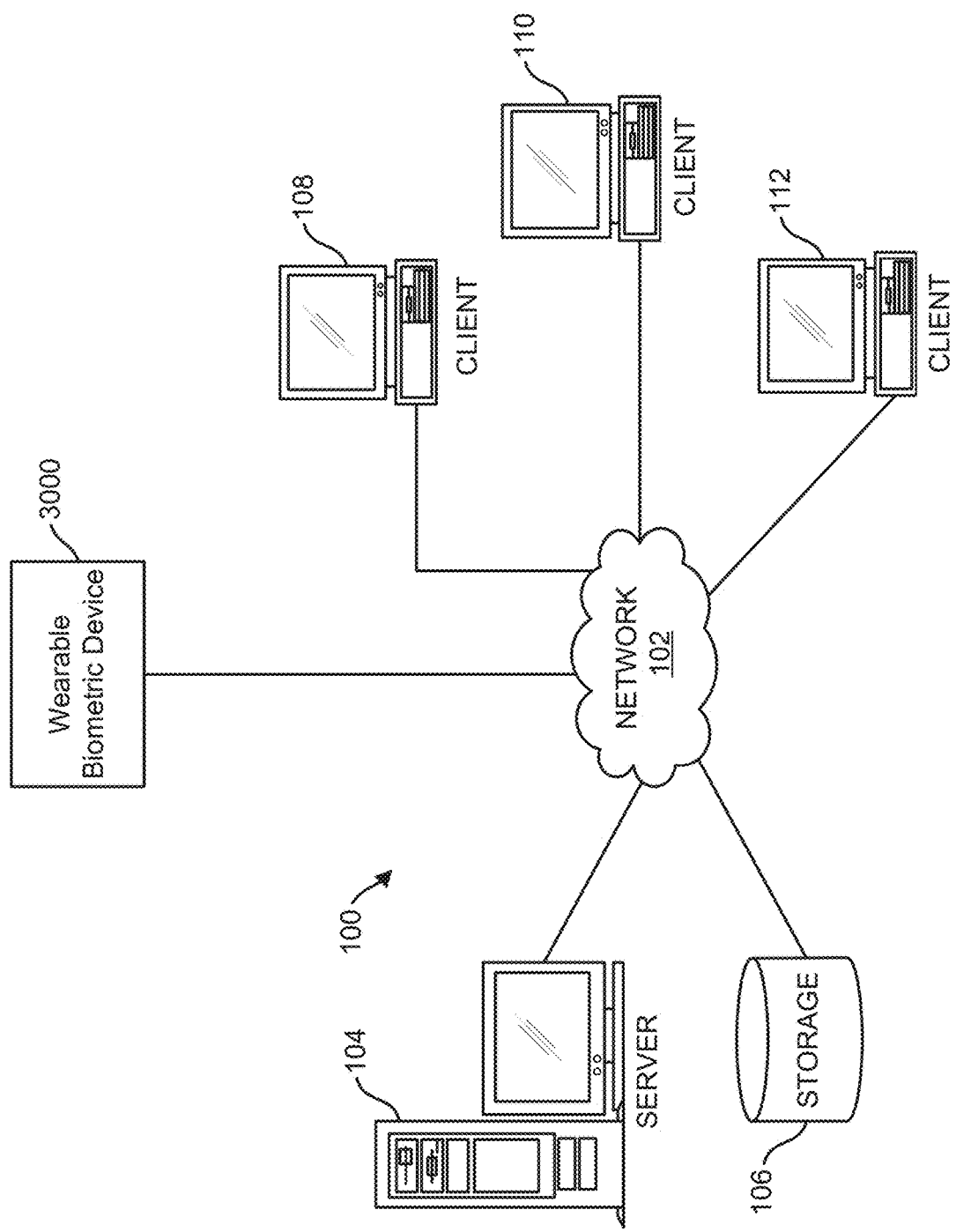
FIG. 1 depicts a representation of a network of data processing systems which employs a financial behavior rules database and faith-based rules database in accordance with the present teachings.

Reference will now be made to various embodiments, examples of which are illustrated in the accompanying drawings. However, these various exemplary embodiments are not intended to limit the disclosure. On the contrary, the disclosure is intended to cover alternatives, modifications, and equivalents.

Throughout the application, description of various embodiments may use "comprising" language, however, it will be understood by one of skill in the art, that in some specific instances, an embodiment can alternatively be described using the language "consisting essentially of" or "consisting of."

For purposes of better understanding the present teachings and in no way limiting the scope of the teachings, it will be clear to one of skill in the art that the use of the singular includes the plural unless specifically stated otherwise. Therefore, the terms "a", "an", and "at least one" are used interchangeably in this application.

Various embodiments provide an apparatus and method that instantaneously and dynamically during a financial transaction or a financial decision detects a consumer's propensity to engage in emotion driven financial behavior based on the user's biological data. Various embodiments provide an apparatus and method that performs a comparative analysis that ensures that the consumer is spending his or her money in a manner that is consistent with the user's values, vision, goals, priorities, goals and planned intentions.

A financial behavior rules database and faith-based rules database can be incorporated into one or more components or devices of the system to enable the user to conduct a self-guided financial coaching session or a professional financial coach to guide the user through a session. In various embodiments, an apparatus and method are provided that enables a user to identify their dominant life values, priorities and goals to facilitate values-based financial planning and financial coaching. Studies show that in order to avoid cognitive dissonance and regrettable actions, a user's most satisfying decisions should be values-centered. Various embodiments provide an apparatus and method that performs a computational analysis to determine whether a user's financial decision or financial transaction is adverse to the user's life values. If the financial decision or financial transaction is adverse, the devices and methods provide a stimulatory effect to the user to mitigate the adverse financial decision or facilitate a future modification in financial behaviors and decisions based on the user's specific life priorities.

One example of a mechanism that may be employed in the financial behavior rules database and faith-based rules database to gather and compile preliminary information is a values assessment. The values assessment can aid the user in clarifying their primary life concerns and core values. Such a model can then be used to generate a life values profile that serves to guide their major life decisions and determines the appropriate allocation of resources. This model will serve to facilitate comparative analysis between the user's behaviors and defined values to determine whether they are in alignment.

In various embodiments, an apparatus and method are provided that enables a user to develop financial goals that combines a traditional economic system with a user-specific economic system to facilitate financial planning. Various embodiments provide an apparatus and method that performs a computational analysis to determine whether the user's financial decision or financial transaction is adverse to the user's financial planning goals. If the financial decision or financial transaction is adverse, the devices and methods provide a stimulatory effect to the user to mitigate the adverse financial decision based on the user's specific financial priorities.

Various embodiment of the method and apparatus described herein provide a monitoring device to provide stimuli to the user. Many types of stimuli may be used and are contemplated herein. For example, the stimuli may be auditory, tactile (touch), vibratory, pressure, temperature (warm, cold, neutral), visual stimuli including images and video, or any combination thereof.

For example, some of such types of stimuli are described in further detail below. A speech stimulus may include certain words, sentences, content or affect, presented using sound or visually. A tactile stimulus may include pressure level for a constant stimulus, frequency for a vibratory stimulus, temperature. Visual stimuli may be based on color, pattern, image content, video content, motion content, direction, orientation, size or other features. The preferred embodiment is directed towards a tactile stimulus that is applied directly to the user's skin.

In various embodiments, different stimuli may be selected, the intensity adjusted, and applied to user. These stimuli may be combined or applied individually according to a predetermined order. In some embodiments, the stimuli may be applied to a plurality of different body parts of the user.

A variety of types of devices may be used, individually or in combination, for applying, presenting, and monitoring stimuli. For example, stimuli may be applied or presented to the user using a wearable device, watch, computer, telephone, cell phone, smart phone, headphones, ear buds, tablet computer, PDA, Internet browser, Web application, mobile application, social network, virtual reality googles, thermal probe, pneumatic pressure probe, mechanical pressure probe and smart clothing that includes biometric sensors. Future models may incorporate implantable sensors that are inserted under the user's skin. The data representing such stimuli may be stored either directly on the delivery/presentation device(s) itself (e.g., in non-transitory computer-readable media incident to, collocated or otherwise incident to the delivery/presentation device). In some embodiments, the data representing the stimuli is stored or represented remotely from the delivery/presentation device(s), e.g., in a data store of a computing resource provider. In such embodiments, devices may connect to (and retrieve the stimuli and associated data from) the entity storing the stimuli and associated data via any appropriate direct or programmatic interface. Examples include APIs, Wi-Fi, Bluetooth, cellular protocols (such as LTE, HSPA, GSM, CDMA, WiMAX and the like), Web services (including those using representation state transfer (REST) and/or Simple Object Access Protocol (SOAP)), Web interfaces (programmatic and otherwise), network protocols such as TCP/IP, and the like, stimuli may be stored in any appropriate format, including audio file formats such as MP3, MP4, AAC, video file formats such as MPEG, and others.

During a financial transaction, for example, at a retail store, the device can be configured to instantaneously and dynamically detect the emotional response based on the user's biological data and, in comparison to the user's financial priorities. If the device determines that the financial decision or financial transaction is adverse to the user's financial plans, the device is configured to provide a stimulatory effect to the user to mitigate the adverse financial decision based on the user's specific financial priorities.

In one example of a financial transaction, the device can be configured to detect the emotional distress experienced by a user to the financial decision and financial transaction by monitoring various body conditions of the user. The device may include a biometric sensor that is capable of measuring one or more body conditions, such as heart rate, perspiration level, and body temperature. In one embodiment, the device is a wrist band worn around the wrist of the user. In another embodiment, the device is a piece of smart clothing having one or more biometric sensors embedded therein. The biometric sensor can measure breathing, heart rate, and muscle tension to determine a number of health metrics, like stress level, anxiety, etc. When the user is stressed out, his breathing becomes shallow, his heart rate increases, and his body tenses up. The device can recognize all these physical changes in the user's body and alert the user of these conditions. The emotional distress of the user can be estimated from the perspiration level, body temperature, heart rate, and a combination thereof. If the device determines that the level of emotional distress exceeds a predetermined level, the stimulus generator unit of the device generates and applies a stimulus to the user. The stimulus generator is configured to generate a stimulus under the control of a controller.

In various embodiments, the device may include a locating device that is capable of providing a signal that indicates the device's location. The locating device may include a Global Positioning System (GPS) device configured to generate a location signal indicative of a location of the device or any other known locating device that receives or determines positional information associated with the device. In addition to the GPS device, the device may include a motion sensor that is configured to detect one or more changes in position, velocity, acceleration, or orientation of the device. A controller may be provided in communication with the GPS device and the motion sensor. For example, the GPS device, the motion sensor, or a combination thereof can be used to track the location of the device. Based on the location signal received from the GPS device and/or the motion sensor, the controller can determine when the user enters a retail store while wearing the device. The controller determines that the user while wearing the device enters a retail store, the controller activates a biometric sensor to begin obtaining biometric data from the user. When the biometric data exceeds a predetermined level, the controller instructs the stimuli device to apply a stimulus to the user for a predetermined amount of time or until the biometric data falls below the predetermined level.

In various embodiments, the device can be used to detect stress while the users initially make financial decisions to develop their financial goals and priorities during a financial planning session. If the device detects that the user's stress level exceeds a predetermined level, the device can apply one or more stimuli to the user to alert the user and reduce the user's stress level.

In addition, the device can be employed, during a financial analysis review, as users review their spending patterns to determine whether their past financial decisions have been made in alignment with the user's financial goals and plans. The device can be worn at the time the users review their actual spending patterns to detect, for example, heart rate as well as the presence of perspiration. Because these two exemplary biological parameters are natural responses to the stress the users may experience when reviewing their bank balances, progress toward a specific goal, or spending choices. The device will detect distress in the users and determine whether or not they are satisfied with the economic consequences of their decisions or behavioral patterns based on the goals they have established according to their financial planning.

In various embodiments, the device's computational analysis may reveal problematic habits or nonoptimal financial behaviors that are preventing the user from achieving his or her personal financial goals. For example, the assessment may detect recurring patterns to reveal that the user has a habit of eating out, incurring late charges or putting off and procrastinating on retirement planning. By identifying the recurring patterns that contribute to the user's unfavorable economic outcomes, strategy plans can be devised to take corrective actions to make changes to behaviors that compromise values, are misaligned with priorities and that divert limited resources that are required for future economic wellbeing. In other embodiments, the device can be programmed to monitor one or more biological parameters of a user to detect recurring patterns indicative of distress related to one or more undesirable habits, such as smoking, overeating, gambling, and drinking. Then, the device can be used to devise a plan to mitigate such undesirable habits.

In various embodiments, the monitoring device may include a built-in scanner for performing a preauthorization, for example, during a financial transaction at the retail store, before the user is permitted to finalize a financial transaction at a point-of-sale. The built-in scanner is capable of remotely linking to a network capable of authorizing a transaction with one more credit cards. The user cannot use the credit card to make a purchase or conduct a transaction for a particular product if the product is not initially scanned for preauthorization by the scanner prior to the purchase. When the transaction exceeds a predetermined amount or is unauthorized, it sends an alert to another person, such as a spouse or an accountability partner who has the authority to authorize the purchase. This enables the supporting partner to dynamically control, for example, a spouse's purchase. This may also be used as in the accountability relationship with a client who has engaged a financial coach.

Various embodiments of the method and apparatus described herein provide a software program that combines a traditional economic system with a faith-based economic system, such as, for example, based upon Biblical scriptures and teachings. Various embodiments of the method and apparatus include an electronic searchable database containing faith-based financial management rules, in addition to traditional financial management rules. For example, a Biblical rules database may be automatically searchable by a user to identify a Biblical concept which is applicable to a particular financial situation.

In various embodiments, the method and apparatus may automatically apply rules within a financial behavior rules database and faith-based rules database to an individual user's financial data and altruist pursuits to generate a user specific plan. In various embodiments, the financial behavior rules database and faith-based rules database enables a user to initially establish a vision statement that may include both financial and altruist pursuits. In various embodiments, the financial behavior rules database and faith-based rules database enables a user to input both financial and altruist pursuits to determine whether either one or both are consistent with the user's vision statement and whether the pursuits are financially attainable in view of the user's financial circumstances. Various embodiments of the financial behavior rules database and faith-based rules database provide the user with an iterative process to continuously monitor, update and revise a user's financial plan and altruist pursuits based upon the user's vision statement.

Various embodiments of the financial behavior rules database and faith-based rules database may provide a computerized instructional guide to assist a user with learning financial concepts and strategies. Various embodiments of the financial behavior rules database and faith-based rules database described herein provide a user with interactive course material lesson plans the user may operate and study at the user's convenience. In various embodiments, the lesson delivery system displays a menu of selectable lessons to a user and retrieves the selected lesson for display to the user. Various embodiments of the financial behavior rules database and faith-based rules database enables an interactive application that provides a lesson delivery system that the user can use independently to develop a financial plan and to learn financial principles based upon a particular text and traditional financial planning techniques.

In various embodiments, the financial behavior rules database and faith-based rules database may be used as a presentation aid to facilitate training. In various embodiments, the financial behavior rules database and faith-based rules database can be administered by a financial advisor or financial coach who interviews a subject to gather the subject's financial information. Various embodiments provide an iterative application that can be operated by the subject as a mechanism to collect, compile and/or generate preliminary financial data, which is then delivered to the financial advisor or financial coach for further analysis, for example, to generate a financial plan, financial review report, or tax reporting information.

In various embodiments, the financial behavior rules database and faith-based rules database may include a plurality of different selectable faith-based text, such as, for example, the Bible, and the Koran. Thus, a user may search the financial behavior rules database and faith-based rules database to determine how a particular financial situation may be addressed according to several different faith-based texts. Such an embodiment may be beneficial to households where multiple faiths are practiced.

With reference now to the figures, FIG. 1 depicts a pictorial representation of a network of data processing systems 100 in which the financial behavior rules database and faith-based rules database of the present teachings may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, a server 104 is connected to network 102 along with storage unit 106. In addition, a wearable biometric sensor device 3000 (FIG. 29) and clients 108, 110, and 112 also are connected to network 102. These clients 108, 110, and 112 may be, for example, personal computers, network computers or a wireless device. In the depicted example, server 104 provides data, such as boot files, operating system images, and applications to clients 108-112. Clients 108, 110, and 112 are clients to server 104.

Figure 29:
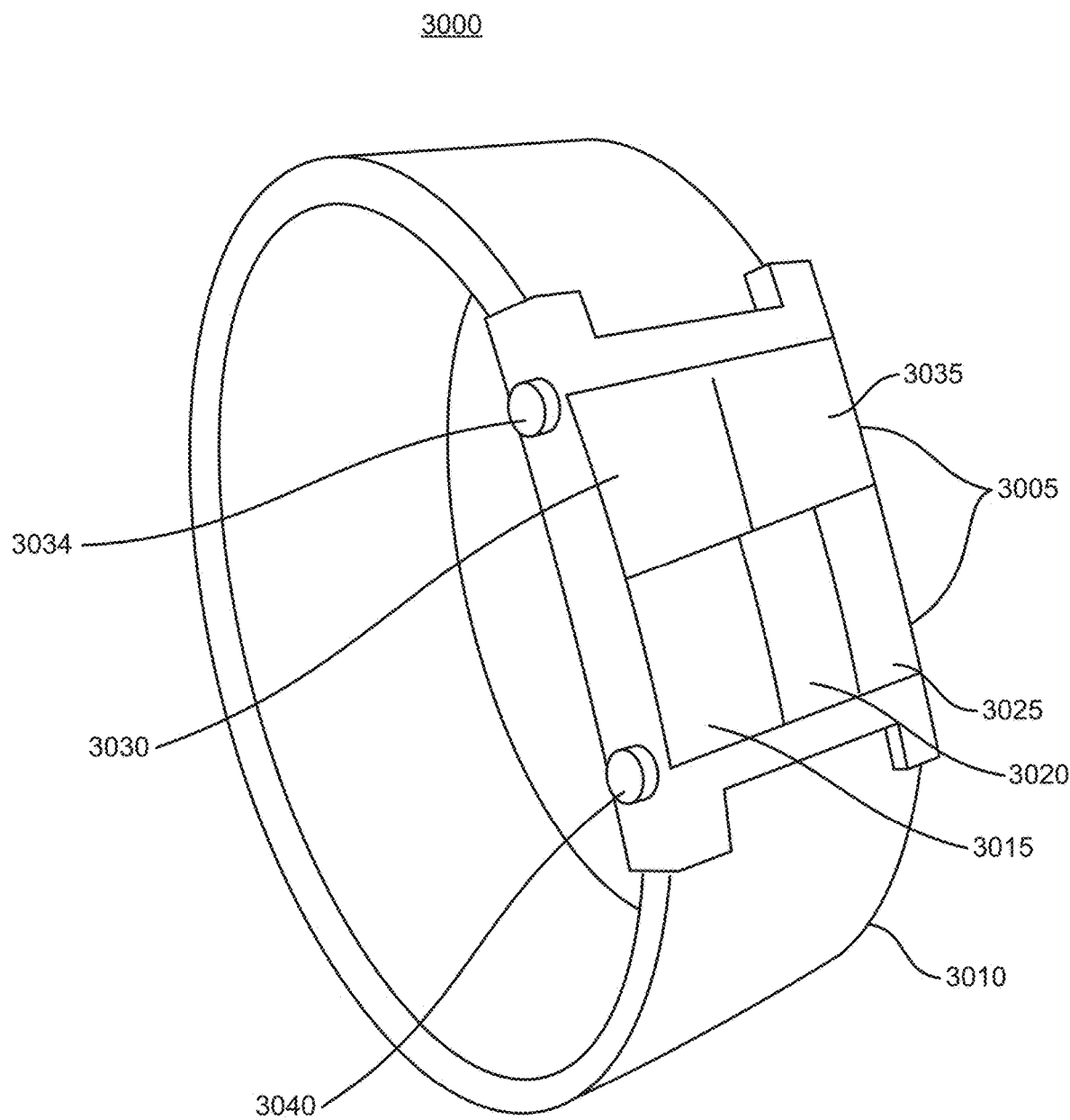
FIG. 29 is a component diagram of a biometric sensor device suitable for use with various embodiments of the present teachings.

One or more wearable biometric sensor device 3000, as shown in FIG. 29, are also connected to the network 102. Wearable biometric sensor device 3000 can be used for monitoring and capturing biological data as a user makes a financial decision. For example, biological data can be captured while a user conducts a financial transaction (i.e. shopping). In another example, biological data can be captured during a financial review (i.e. a financial planning session). The devices and methods of the system perform an analysis to determine whether the financial decision is adverse to the user's financial priorities. If the financial decision is adverse, the devices and methods provide a stimulatory effect to the user to mitigate the adverse financial decision based on the user's specific financial priorities. Wearable biometric sensor device 3000 will be described in further detail below.

In FIG. 1, network data processing system 100 may include additional servers, clients, and other devices not shown. In the depicted example, network data processing system 100 is the Internet with network 102 representing a worldwide collection of networks and gateways that use the TCP/IP suite of protocols to communicate with one another. In various embodiments, network data processing system 100 also may be implemented as a number of different types of networks, such as for example, an intranet, a local area network (LAN), or a wide area network (WAN). FIG. 1 is intended as an example, and not as an architectural limitation for the present invention.

Specifically, a data processing system according to the present teachings may be implemented as a server, such as server 104. The data processing system may include electronic and/or program product and instruction means and data for performing financial management and planning processing. In various embodiments, the data processing system may be described as a personal computer, such as a desktop or portable computer. However, as utilized herein, the terms "data processing system," "computer," and tool can be used interchangeably, and are intended to mean essentially any type of computing device or machine that is capable of running a software product, including communication devices (e.g., pagers, telephones, electronic books, etc.) and other computer-based networked devices (e.g., handheld computers, Web-enabled televisions, home automation systems, multimedia viewing systems, etc.). Those skilled in the art will appreciate that the system and method may be practiced with other computer system configurations, including, for example, hand-held devices, multiprocessor systems, microprocessor-based or programmable consumer electronics, minicomputers, and mainframe computers.

A user may enter commands and/or information, as discussed below, into the network data processing system 100 through input devices such as a mouse and keyboard connected to the network data processing system. Other input devices may include a microphone (or other sensors), joystick, game pad, scanner, or the like.

Various embodiments of the system and method of the financial behavior rules database and faith-based rules database provide an iterative application that can be operated by the user as a mechanism to collect, compile and/or generate preliminary financial data, which may then deliver to the financial advisor or financial coach for further analysis, for example, to generate a financial plan, financial review update, or tax reporting information. In lieu of or in addition to delivering the collected information to a financial professional, the user may personally assess, analyze and/or use the compiled information.

The user may use the wearable biometric sensor device 3000, as depicted in FIG. 29, while preparing his financial plan to monitor the user's biological data and detect the user's stress level in response to the user's financial decisions. The user may don wearable biometric sensor device 3000 at the beginning or during the financial planning session. Biometric sensor device 3000 can be any device that can be worn by the user and is capable of obtaining biometric signal. Biometric sensor device 3000 can be any device that can be worn by the user and is capable of obtaining a biometric signal. Non-limiting examples of suitable wearable biometric devices are a wristband, wristwatch, bracelet, atm band, ankle band, chest band, necklace, ring, belt, glasses, clothing, hat, headband, earring(s) or visor, or any other wearable item that is capable of obtaining a biometric signal. The biometric sensor device 3000 can also be incorporated into clothing, as smart clothing. In another embodiment, the biometric sensor device 3000 may comprise more than one biometric sensor. Biometric sensor device 3000 may be arranged to communicate with one or more of client computer 108, 110, 112 over a network, such as wireless network 102. Further, biometric sensor device 3000 may be arranged to communicate with server, and/or a cloud computing environment over a network.

FIG. 29 illustrates an embodiment where the biometric device is a wristband wireless biometric sensor device 3000.

The exemplary biometric sensor device 3000 may include a display, a band body, a user interface, processor, biometric sensor(s), stimuli unit, memory, and/or wireless transceiver which may communicate with a client and/or server. A touch screen display 3005 serves as a user interface and is located on the outer side of the band body 3010. The biometric sensor device 3000 may also include one or more buttons 3034, 3040 as an interface for the user to interact with the biometric sensor device to receive user inputs. The processor 3030 may be coupled to an internal memory 3035, which are both internal components built and installed within the device 3000. The processor 3030 may also be coupled to the touch screen display 3005. The biometric sensor device 3000 may include a transceiver (e.g., a Bluetooth, Zigbee. or Peanut radio) for sending and receiving wireless transmissions.

The biometric sensor device 3000 may also include a stimuli unit 3015 for applying a stimulus to a user wearing the biometric device. The stimuli unit 3015 can be located on the inner side of the band body 3010 to apply one or more stimuli directly to the user's skin. In other embodiments, the stimuli unit 3015 may not be in direct contact with the user's body. The biometric device may include a battery.

The biometric sensor device 3000 may also include one or more biometric sensors 3020, such as, for example, a perspiration sensor, a body temperature sensor, a pH sensor, a blood pressure sensor, a blood sugar level, a pulse rate sensor, a blood oxygen level sensor, and an accelerometer coupled to the processor. The above list of exemplary sensors is not an exclusive one.

The biometric sensor device 3000 may collect one or more types of biometric, physiological, and/or environmental data from embedded sensors and/or external devices and communicate or relay such information to other devices, client(s) and/or server over the Internet. Additionally, the terms "detecting," "sensing," "monitoring," "tracking," "recording" and "storing" may be used interchangeably herein where appropriate, unless otherwise indicated. In the illustrated embodiment, sensor 3020 is located on the inner side of the band body 3010. The sensor 3020 is configured to measure various conditions of the user such as perspiration level, skin/surface temperature, heart rate, etc. In one embodiment, at least one temperature and perspiration sensor are in physical contact with the user for measurement. In other embodiments, one or more of the sensors may be an infrared sensor that is capable of measuring a body condition, such as external body temperature, of the user from a distance.

According to one example, while the user is wearing the biometric sensor device 3000, the biometric device may monitor the user's perspiration level and store the user's perspiration level using one or more sensors (for example, the perspiration sensor). In some embodiments, the perspiration sensor may monitor the content of the user's sweat. Perspiration consists of water, minerals, lactate and urea. On average, the mineral composition is: sodium (0.9 gram/liter), potassium (0.2 g/l), calcium (0.015 g/l), and magnesium (0.0013 g/l). Trace metals that the body excretes in sweat include: zinc (0.4 milligrams/liter), copper (0.3-0.8 mg/l), iron (1 mg/l), chromium (0.1 mg/l), nickel (0.05 mg/l), and lead (0.05 mg/l). In some embodiments, the perspiration sensor(s) may measure a single sweat component. In other embodiments, the perspiration sensor(s) may simultaneously and selectively measure multiple sweat components.

The biometric sensor device 3000 may then transmit the biometric data representative of the user's sweat level, physiological data, and/or the environmental data to a network system 100, client 108, 110, 112, computer, or server 104 where the data may be stored, processed and displayed. The biometric sensor device 3000 may measure or calculate a plurality of metrics in addition to the perspiration level and perspiration content. These include, but are not limited to, heart rate, location and/or motion through a GPS or similar locating device, blood pressure, blood glucose, skin and/or body temperature, brain activity as measured by electroencephalography, pH levels, and hydration levels. The biometric device may also measure or calculate metrics related to the environment around the user. Furthermore, the device or system may calculate the user's stress through a combination of collected data.

In various embodiments, the device can be used to detect stress while the user initially has a conversation about issues in their finances or to consider required actions, resources, and relevant to developing their economic goals and priorities during a financial planning or financial coaching session. If the device detects that the user's stress level exceeds a predetermined level, it provides an alert that the user is experiencing an elevated stress response that is indicative of an emotionally-charged issue or potential financial trouble spot that the user, financial coach, or planner may need to probe into further or evaluate.

Various embodiments provide an apparatus and method that instantaneously and dynamically during a financial transaction or a financial decision detects a consumer's propensity to engage in emotionally impulsive financial behavior based on the user's biological data. Such embodiments will be described in further detail below. Various embodiments provide an apparatus and method that performs a comparative analysis that ensures that the consumer is using his or her resources in a manner that is consistent with the user's values, vision, life goals, priorities, and planned intentions as developed according to the user's financial plans or coaching objectives.

In addition, the device can be employed, during a financial analysis review, as users review their spending patterns to determine whether financial outcomes as a result of their past financial behaviors have been in alignment with the user's financial goals and plans. The device can be worn at the time the user reviews the data reflecting how well their retirement account is funded, amounts spent on disposable items vs. goals, or their actual spending patterns to detect, for example, heart rate as well as the presence of perspiration. Because these two exemplary biological parameters are natural responses to the stress the users may experience when reviewing their finances and spending choices. The device will detect distress in the users and determine whether or not they are satisfied with the way they are spending their money based on the goals they have established according to their financial planning or coaching objectives.

In various embodiments, during a financial review, the system's computational analysis may reveal the consequences of specific habitual behaviors or persistent choices that are either directly or indirectly influencing the user's ability to achieve his or her personal objectives or financial goals. For example, the assessment may detect, based on the user's financial information, recurring patterns to reveal that the user exhibits a habit of overspending. By identifying the recurring behavior patterns that contribute to the user's subpar economic outcomes, recommended strategies can be devised by the system and displayed or transmitted to the user to direct the user towards corrective actions to produce more favorable outcomes and to better prioritize the use of their resources. In other embodiments, the device can be programmed to monitor one or more biological parameters of a user to detect recurring patterns indicative of distress related to one or more undesirable habits, such as smoking, overeating, gambling, and drinking. Then, the system and device can be used to devise a plan to mitigate such undesirable habits.

In various embodiments, an apparatus and method are provided that enables a user to develop financial goal that combines a traditional economic system with a user-specific economic system to facilitate financial planning. Various embodiments provide an apparatus and method that performs a computational analysis to determine whether the user's financial decision or financial transaction is adverse to the user's financial planning goals. If the financial decision or financial transaction is adverse, the devices and methods provide a stimulatory effect to the user to mitigate the adverse financial decision based on the user's specific financial priorities.

Various embodiment of the method and apparatus described herein provide a monitoring device to provide stimuli to the user. Many types of stimuli may be used and are contemplated herein. For example, the stimuli may be auditory, tactile (touch), vibratory, pressure, temperature (warm, cold, neutral), visual stimuli including images and video, or any combination thereof.

For example, some of such types of stimuli are described in further detail below. A speech stimulus may include certain words, sentences, content or affect, presented using sound or visually. A tactile stimulus may include pressure level for a constant stimulus, frequency for a vibratory stimulus, temperature. Visual stimuli may be based on color, pattern, image content, video content, motion content, direction, orientation, size or other features. The preferred embodiment is directed towards a tactile stimulus that is applied directly to the user's skin.

In various embodiments, different stimuli may be selected, the intensity adjusted, and applied to user. These stimuli may be combined or applied individually according to a predetermined order. In some embodiments, the stimuli may be applied to a plurality of different body parts of the user.

A variety of types of devices may be used, individually or in combination, for application, mobile application, social network, virtual reality googles, thermal probe, pneumatic pressure probe, mechanical pressure probe and smart clothing that includes biometric sensors. Future models may incorporate implantable sensors that are inserted under the user's skin. The data representing such stimuli may be stored either directly on the delivery/presentation device(s) itself (e.g., in non-transitory computer-readable media incident to, collocated or otherwise incident to the delivery/presentation device). In some embodiments, the data representing the stimuli is stored or represented remotely from the delivery/presentation device(s), e.g., in a data store of a computing resource provider. In such embodiments, devices may connect to (and retrieve the stimuli and associated data from) the entity storing the stimuli and associated data via any appropriate direct or programmatic interface. Examples include APIs, Wi-Fi, Bluetooth, cellular protocols (such as LTE, HSPA, GSM, CDMA, WiMAX and the like), Web services (including those using representation state transfer (REST) and/or Simple Object Access Protocol (SOAP)), Web interfaces (programmatic and otherwise), network protocols such as TCP/IP, and the like stimuli may be stored in any appropriate format, including audio file formats such as MP3, MN, AAC, video file formats such as MPEG, and others.

As discussed above, according to one example, the device 3000 can use sensor 3020 (i.e. a perspiration sensor) to detect stress by monitoring the user's perspiration level while the users initially make financial decisions to develop their financial goals and priorities during a financial planning session. If the device detects that the user's perspiration level exceeds a predetermined level, or one or more sweat components exceed a predetermined level, the device instructs the stimuli unit 3015 to apply one or more stimuli to the user to alert the user and reduce the user's stress level. For example, if one or more of the sweat components exceed the average listed above on a per liter basis by at least 5%, then the stimuli unit 3015 applies a pressure, similar to an acupuncture pressure, for example 2-5 minutes.

A financial behavior rules database and faith-based rules database can be incorporated into one or more components or devices of the system to enable the user to engage in a financial planning or financial coaching session. The financial behavior rules database and faith-based rules database, in various embodiments, is a system and method that determines how the user views the role of money in the user's life and what the user's attitudes are about money and personal finances. Money has different functions and importance to all users based on the user's individual priorities, experiences, and attitudes about money. Most people use some form of currency as a medium of exchange. Thus, each user assigns a value to different tangibles, such as purchasing a home or commodities, and intangibles, such as funding a college education, which in return should guide the choices as to how the user is willing to use his or her money. However, choices in actuality are not always made based on this premise. Because of propensity for other factors to influence money decisions, people commonly become easily distracted from making choices that support acquiring, accomplishing and attaining things they most want.

The financial behavior rules database and faith-based rules database assists users with building a clear financial assessment. The process can be performed electronically during a single session or conducted over several sessions at the user's convenience to complete one or more evaluation tools. For instance, the user may initially determine the information needed for a particular evaluation tool, take a few days or weeks to collect the needed information and then conduct a follow-up session to enter the information. Using the financial behavior rules database and faith-based rules database, users can record in and assess through the use of several evaluation tools many aspects of their financial situations. The financial behavior rules database and faith-based rules database may be used to collect and record information in worksheets, reports, tests, assignments, quizzes, ledgers, questionnaires, and financial statements, such as the following examples:

| | Financial Planning Personal Goals and Priorities Worksheet |
|---|---|
| Expense Record Log | Statement of Financial Position |
| Weekly Spending Report | Cash Flow Statements |
| Monthly Income and | Values and Vison Statement |

| | |
|---|---|
| Expenditure Analysis Worksheet | Reflection Questionnaire |
| Weekly Expenditure Worksheet | Budget Ratio Analysis |
| Assessment Tests | Summary of Financial Findings |
| 1. Personal Values Assessment | |
| 2. Money Attitudes Assessment | |
| 3. Spending Behavior Assessment | |
| 4. Money Behavior Motivation Assessment | |
| 5. Money Management Assessment | |
| Personal Vision Statement | |
| Debt Ledger | Statement of Financial Findings |
| Debt Tracker | Finance and Financial Values Questionnaire |
| Savings Record | Commitment Strategy Worksheet |
| Loan Transaction Ledger | Income Allocation Adjustment Worksheet |
| Balanced Goal Worksheet | Interactive Goal Planning Calculator Applications |
| | 1. Goal Funding Planner |
| | 2. Target Accumulation Planner |
| | 3. Retirement Savings Goal Calculator |
| Balanced Priorities Worksheet | Spending and Savings Plan |

The above list is not exhaustive. Those having skill in the art would understand that other assignments or tasks may be employed in conjunction with the present teachings.

The evaluation tool may present questions to the user according to various approaches including: (i) multiple choice questions; (ii) true/false questions; (iii) short answer or "fill-in-the-blank" questions; (iv) essay or "free-form" answer questions; (v) practical problem solving; or (vi) personal interview. Accordingly, the user's responses to the questions may be analyzed, scored, and graded electronically or manually using any known grading, modeling, analytic resolving, character recognition and scoring systems and methods.

The evaluation tool may collect user information relevant to economic factors, as well as non-economic factors that influence a user's financial behaviors and decisions. Often, users focus too heavily on purely financial factors such as budgeting, savings levels, credit scores, etc. in improving their finances. Changes required to improve finances, however, include examining thoughts and behaviors and how they impact the user's economic circumstances. The embodiment includes various evaluative assessments to identify key issues associated with problematic financial decision making. The influences may be categorized, for example, into four key areas that will help the user isolate specific categorical factors that he/she may need to focus primary attention to in order to alter behaviors that can increase their potential to achieve values-based goals and priorities. Awareness of specific hindrances in these areas can enable the user to receive and apply targeted guidance that helps them work toward adjusting and realign economic behaviors that support their true goals and values-based life plans.

These exemplary categories, as shown in FIGS. 2A-3E, may include for example:
1. Personal Values
2. Money Attitudes
3. Financial Behaviors
4. Economic Resources As shown for example in FIGS. 2A-2B, one example of a mechanism that may be employed in the financial behavior rules database and faith-based rules database is to gather and compile preliminary information is a Life Values assessment. The life values assessment can aid the user to determine the primary human values that relate to their life concerns. On a general level, the present teachings can include collecting information and building a model based on the information. Such a model can then be used to generate a user-specific decision framework that serves as reference point to guide the user's personal choices, life plans and financial decisions. This model will serve to make comparisons of the user's financial behaviors and supposed values to determine whether they are in alignment. The comparison evaluation will serve to highlight values-decision conflicts in assessing specific economic decision factors under the personal value key insight category.

Figure 2A:
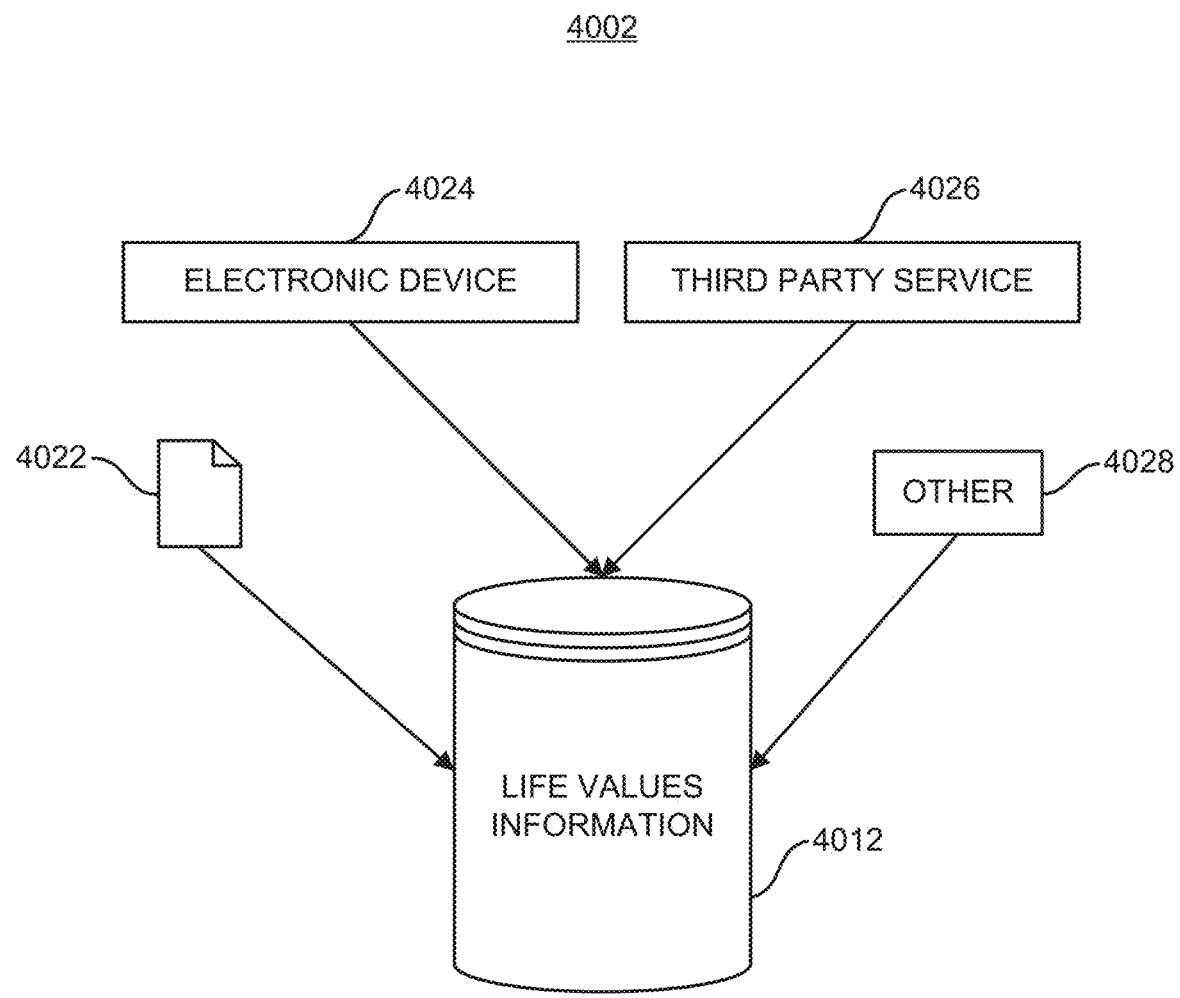
FIG. 2A illustrates a variety of sources for collecting Life values information in accordance with the financial behavior rules database and faith-based rules database of the present teaching.

The life values information can include any information, such as, for example, spiritual and psychological priorities, relationship and community priorities, health and environmental priorities, and saving and investing priorities collected about an individual. FIG. 2A shows a variety of sources 4002 for collecting life values information 4012. The life values information 4012 can be stored in electronic (e.g., digital) form in a computer-readable medium (e.g., RAM, ROM, magnetic disk, CD-ROM, CD-R, DVD-ROM, and the like). Possible sources for collecting the life values information 4012 include a paper-based source 4022 an electronic device 4024, a third-party service 4026, or some other source 4028. The life values information can include, for example, a user's answers to an on-line life values quiz. As shown, for example in the method 4100 in FIG. 2B, the quiz may present questions to the user regarding categories of human priorities that that the user deems are intrinsically important to who they are and how they live their life.

Figure 2B:
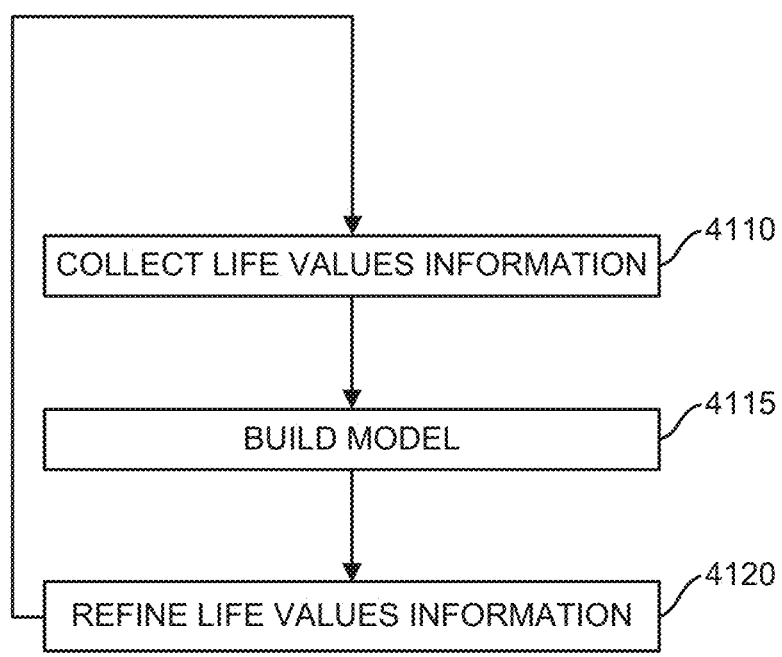
FIG. 2B depicts a Life Values model in accordance with the financial behavior rules database and faith-based rules database of the present teachings.

After the life values information 4012 has been collected in step 4110, a user-specific life values decision model 4115 can be built as shown in FIG. 2B. The life values model can take a variety of forms, including artificial intelligence-based models. The life values model can generate one or more life values profiles based on the user's values information inputs. Thus, the model can be used to identify the personal values that the user ranks most important as important in living out a values-guided life. In practice, the model can be implemented as computer-executable code stored in a computer-readable medium. In step 4120 the user's life values may be subsequently refined to adjust to transitional life changes and shifts in values over time.

Figure 2C:
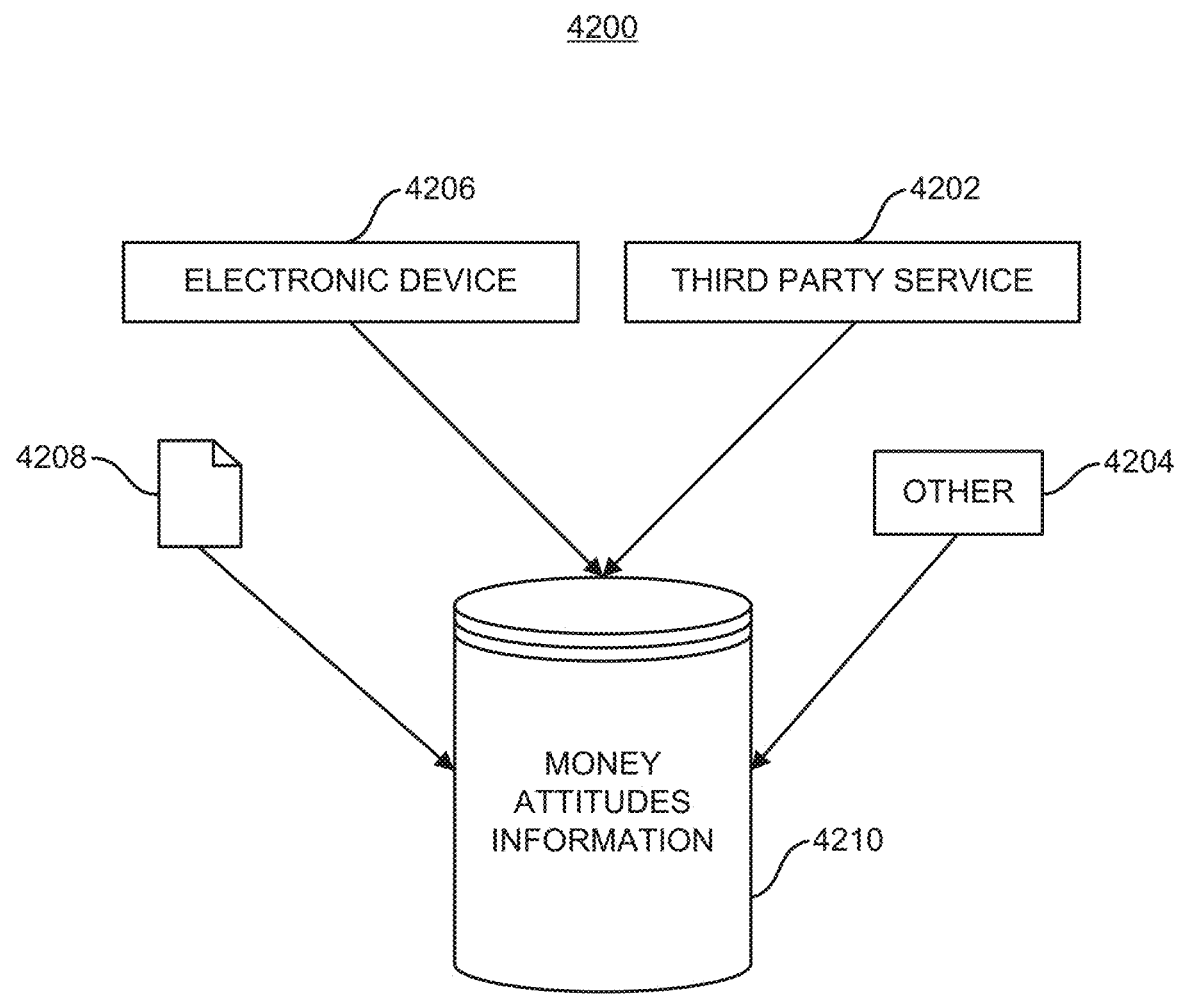
FIG. 2C illustrates a variety of sources for collecting Money Attitudes information in accordance with the financial behavior rules database and faith-based rules database of the present teaching.
Figure 2D:
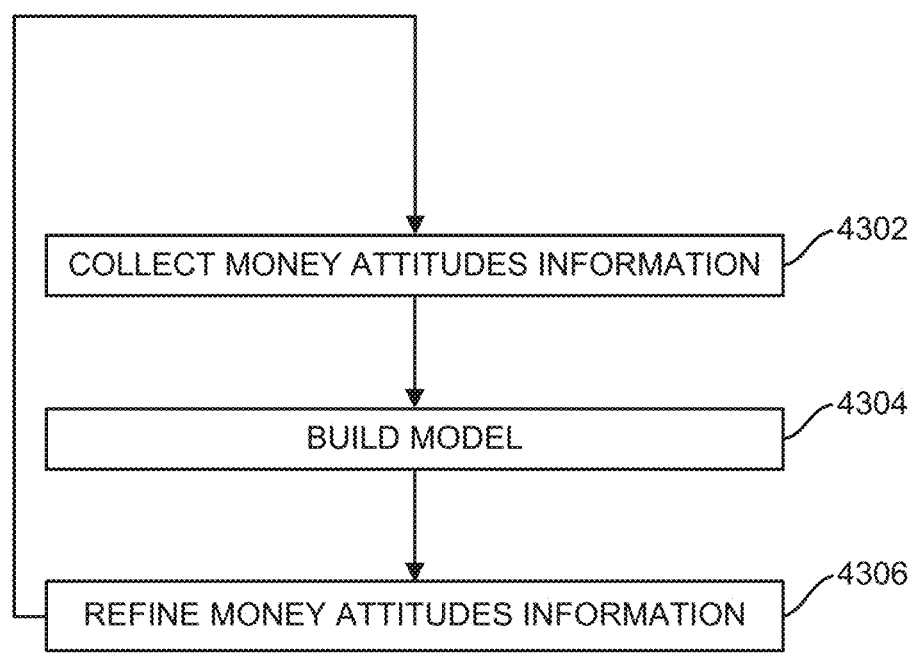
FIG. 2D depicts a Money Attitudes model in accordance with the financial behavior rules database and faith-based rules database of the present teachings.

As shown for example in FIGS. 2C-2D, one example of a mechanism that may be employed in the financial behavior rules database and faith-based rules database to gather and compile preliminary information is a money attitudes assessment. The money attitudes model will be employed in the financial behavior rules database and faith-based rules database to gather and compile preliminary information and can utilize a variety of evaluations, including a money attitudes assessment. The Money Attitudes Assessment can aid the user in identifying and clarifying a user's attitudes about the use and purpose of money. Beyond a medium of exchange, it has a social and psychological value that influences how it is used. For example, charitable giving, socializing, indulging pleasures. On a general level, the present teachings can include collecting information and building a model based on the information. Such a model can then be used to generate a money attitudes profile descriptive of the user's views about money, which forms a pattern of the user's money attitudes. This model will be used to make comparisons between the user's money attitudes and their life values and money behaviors to determine whether there are inconsistencies that pose barriers in reach financial goals or if issues related to attitudes are misaligned with Scriptural text This model will be employed under the money attitudes key insight category.

The money attitudes information depicted in the method 4200 can include any information, such as, for example, personal finance, money management, and budgeting, collected about an individual. FIG. 2C shows a variety of sources for collecting money attitude information 4210. The money attitude information 4210 can be stored in electronic (e.g., digital) form in a computer-readable medium (e.g., RAM, ROM, magnetic disk, CD-ROM, CD-R, DVD-ROM, and the like). Possible sources for collecting the money attitudes information 4210 include a paper-based source 4208, an electronic device 4206, a third-party service 4202, or some other source 4204. The money personality information can include, for example, a user's answers to an on-line money personality quiz. As shown, for example in the method 4300 in FIG. 2D, the quiz may present questions to the user regarding savings, spending, bills, record keeping, vacations, giving, relationships, retirement, and planning for the future.

After the money attitudes information 4210 has been collected in FIG. 2C, a money attitudes model 4304 can be built as shown in FIG. 2D. The behavioral model can take a variety of forms, including artificial intelligence-based models. The behavioral model can generate one or more behavioral profiles based on money attitudes information inputs in step 4302. Thus, the model can be used to identify the tendencies, priorities, values, and attitudes of the user related to the management of their finances. In practice, the model can be implemented as computer-executable code stored in a computer-readable medium. In step 4306, the user's money attitudes can be subsequently refined as the user develops a reprioritized focus in managing his or her finances. This model will be employed under the financial attitudes key insight category.

Figure 3A:
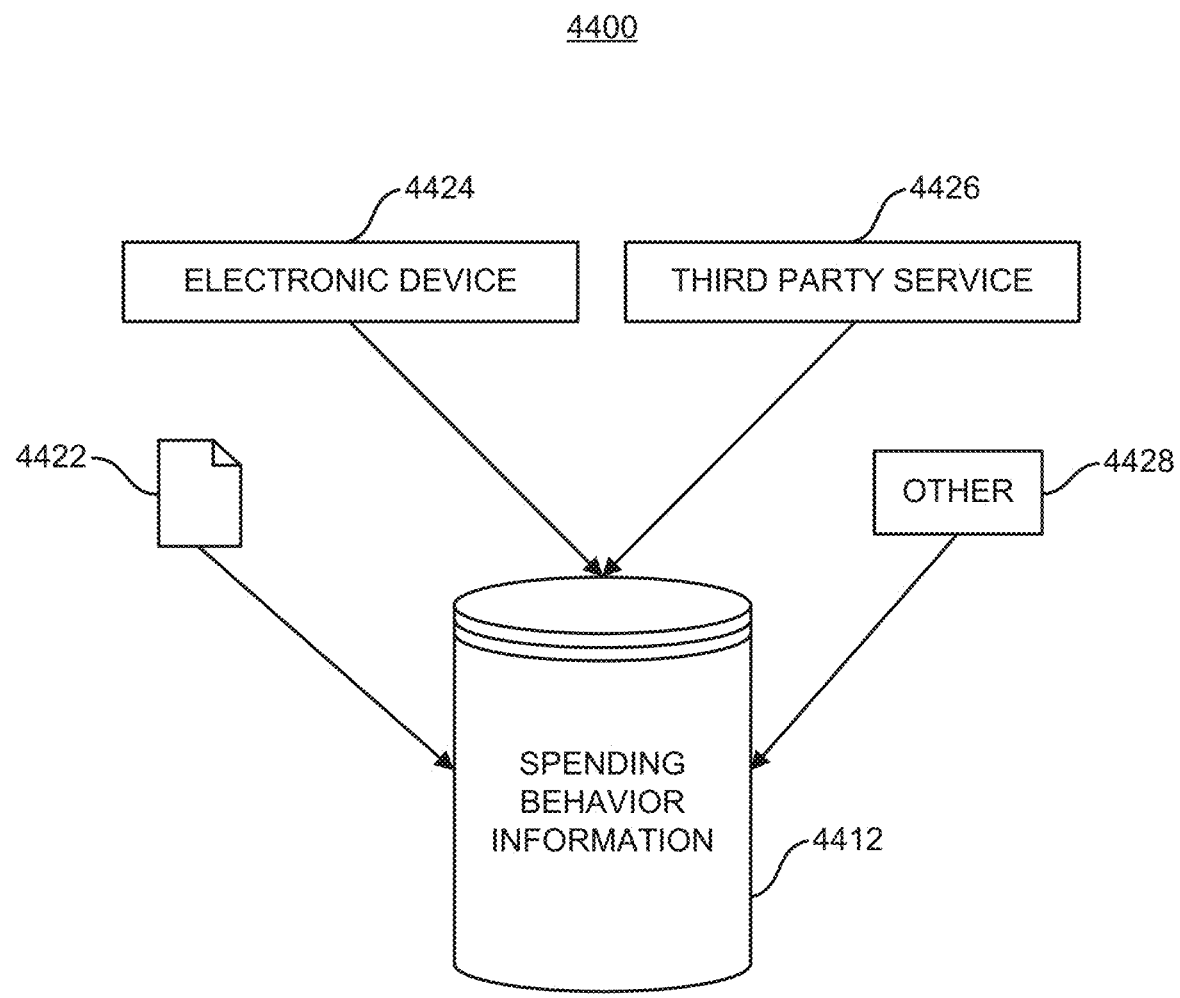
FIG. 3A illustrates a variety of sources for collecting Spending Behavior information in accordance with the financial behavior rules database and faith-based rules database of the present teaching.
Figure 3B:
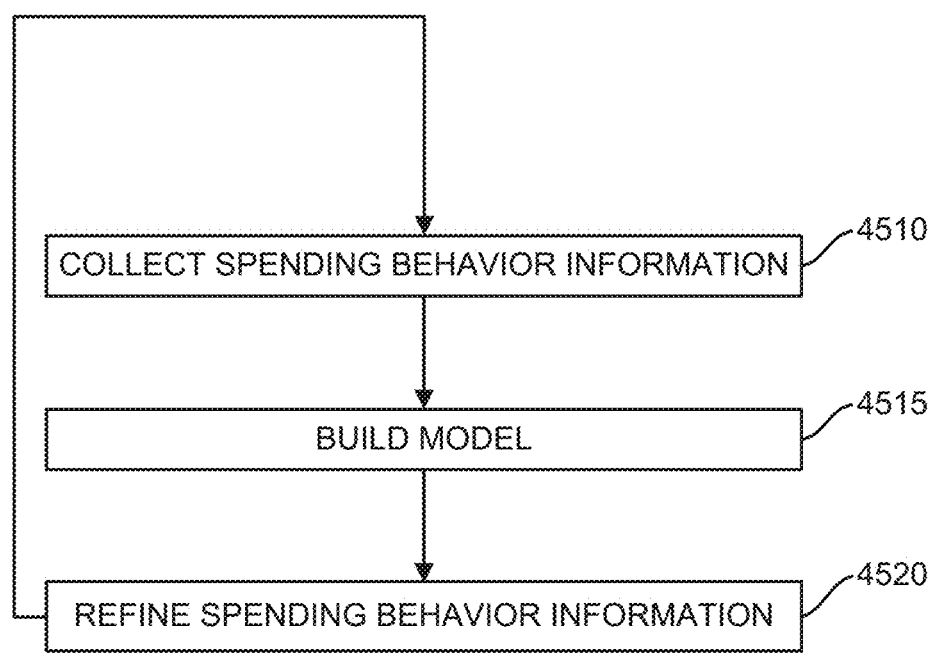
FIG. 3B depicts a Spending Behavior model in accordance with the financial behavior rules database and faith-based rules database of the present teachings.

As shown for example in FIGS. 3A-3B, one example of a mechanism that may be employed in the financial behavior rules database and faith-based rules database is to gather and compile preliminary behavioral information is a spending decision assessment. The spending behavior assessment will parallel focal areas related to life values categories. Information will be collected that evaluate the user's patterns of spending and amount of spending fall into various life values categories. On a general level, the present teachings can include collecting information and building a model base on the information. Such a model can then be used to generate a behavioral profile of the user's spending pattern which shows the value-based spending categories in which the user's spending allocation is dominant. It will also help to assess categorical areas in which the user engages in discretionary spending, as well as evaluating areas to which discretionary resources are not being allocated. A comparison analysis can then be used to evaluate spending behavior-values conflicts. This model will be employed under the money behavior key insight category.

The behavioral information can include any information, such as, for example, personal finance, money management, and budgeting, collected about an individual. In the method 4400, FIG. 3A shows a variety of sources 4402 for collecting behavioral information 4412. The behavioral information 4412 can be stored in electronic (e.g., digital) form in a computer-readable medium (e.g., RAM, ROM, magnetic disk, CD-ROM, CD-R, DVD-ROM, and the like). Possible sources for collecting the behavioral information 4412 include a paper-based source 4422, an electronic device 4424, a third-party service 4426, or some other source 4428. The behavioral information can include, for example, a user's answers to an on-line economic behaviors quiz. As shown in the method 4500, for example in FIG. 3B, the quiz may present questions to the user regarding savings, spending, expenses, record keeping, vacations, giving, relationships, retirement, and planning for the future.

After the spending behavior information 4412 has been collected in step 4510, a behavioral model 4515 can be built as shown in FIG. 3B. The behavioral model can take a variety of forms, including artificial intelligence-based models. The behavioral model can generate one or more behavioral profiles based on money behavior information inputs. Thus, the model can be used to identify or reveal the practices, patterns, habits, behaviors and choices related the user's economic life and financial management. In practice, the model can be implemented as computer-executable code stored in a computer-readable medium. In step 4520, the user's money attitudes can be subsequently refined as the user develops a reprioritized focus in managing his or her finances.

Figure 3C:
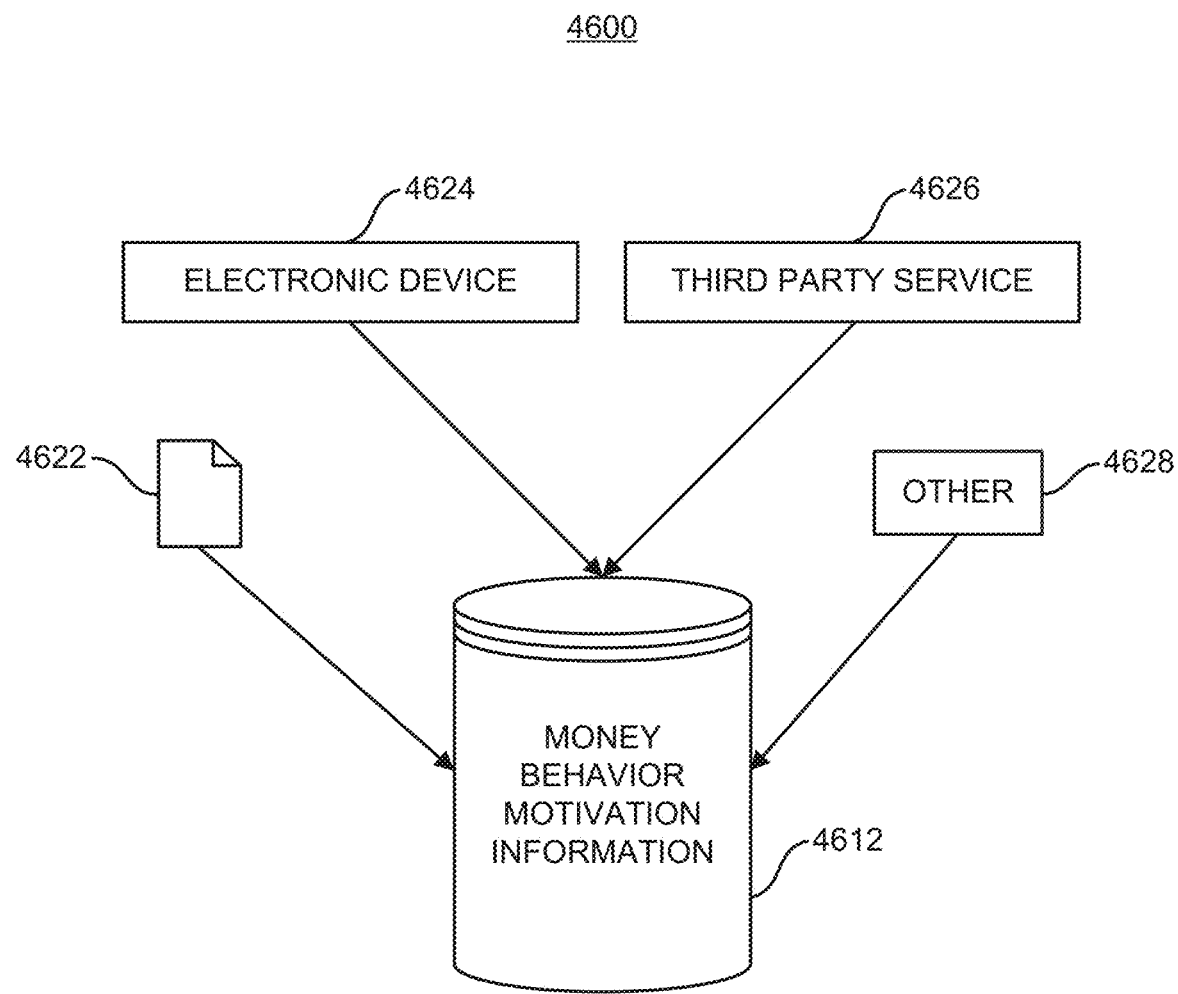
FIG. 3C illustrates a variety of sources for collecting Money Behavior Motivators information in accordance with the financial behavior rules database and faith-based rules database of the present teaching.
Figure 3D:
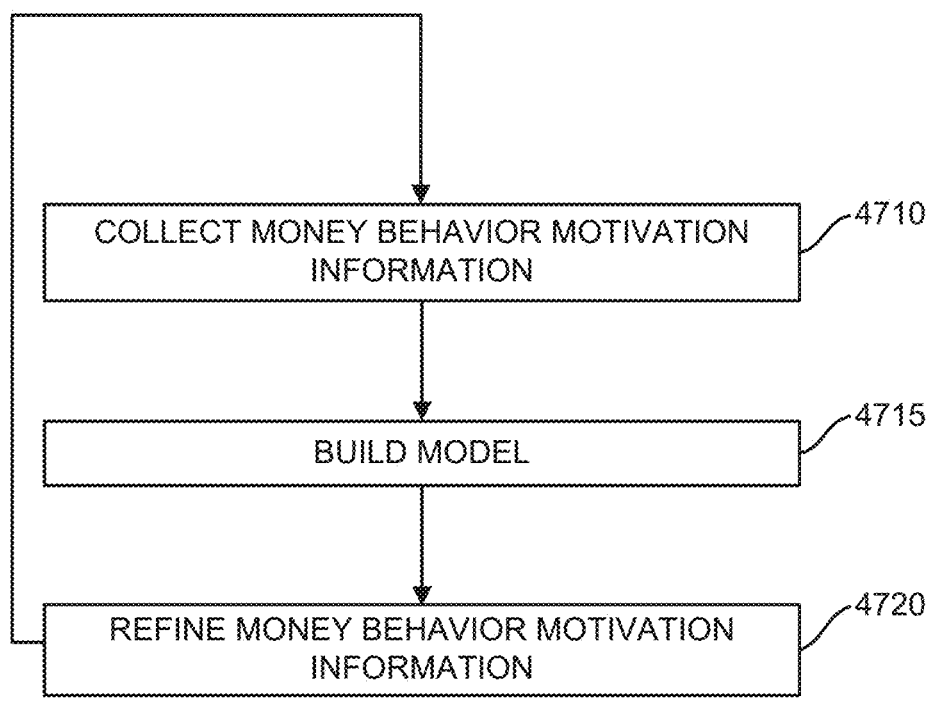
FIG. 3D depicts a Money Behavior Motivators model in accordance with the financial behavior rules database and faith-based rules database of the present teachings.

As shown for example in FIGS. 3C-3D, one example of a mechanism that may be employed in the financial behavior rules database and faith-based rules database is to gather and compile preliminary information behavioral information is a money behavior motivation assessment. Information can be collected that evaluates the underlying motivations that drive economic decisions. On a general level, the present teachings can include collecting information and building a model based on the information. Such a model can then be used to generate a behavioral profile representing the roles money plays in the user's life from a symbolic standpoint. Money symbolically represents different things to different people. Beyond being simply a means of exchange, money represent, such things, as status, power, or security. Economic behaviors are driven often such subconscious motives which can lead to economic choices that can have a negatively impact on finances. The influence of these motives is often deeply rooted in patterns of economic behaviors that we often are not even aware, leaving money unavailable beneficial values-based goals and priorities. Based on the user's dominant profile, a comparative analysis can be made to evaluate whether behaviors related to money motives are in conflict three user's values and/or with verses or passages from a faith-based text, such as the Scriptures of the Bible. This model will be employed under the money behavior key insight category.

The money behavior motivation information can include any information, such as, for example, personal finance, money management, and budgeting, collected about an individual. In the method 4600, FIG. 3C shows a variety of sources for collecting behavioral information 4612. The behavioral information 4612 can be stored in electronic (e.g., digital) form in a computer-readable medium (e.g., RAM, ROM, magnetic disk, CD-ROM, CD-R, DVD-ROM, and the like). Possible sources for collecting the behavioral information 4612 include a paper-based source 4622, an electronic device 4624, a third-party service 4626, or some other source 4628. The behavioral information can include, for example, a user's answers to an on-line economic behaviors quiz. As shown, for example in FIG. 3D, the quiz may present questions to the user regarding savings, spending, expenses, record keeping, vacations, giving, relationships, retirement, and planning for the future.

After the money behavior motivation information 4612 has been collected in step 4710, a behavioral model 4715 can be built as shown in the method 4700 in FIG. 3D. The behavioral model can take a variety of forms, including artificial intelligence-based models. The behavioral model can generate one or more behavioral profiles based on money behavior information inputs. Thus, the model can be used to identify or reveal the practices, patterns, habits, behaviors and choices related the user's economic life and financial management. In practice, the model can be implemented as computer-executable code stored in a computer-readable medium. In step 4720, the user's money attitudes can be subsequently refined as the user develops a reprioritized focus in managing his or her finances.

Figure 3E:
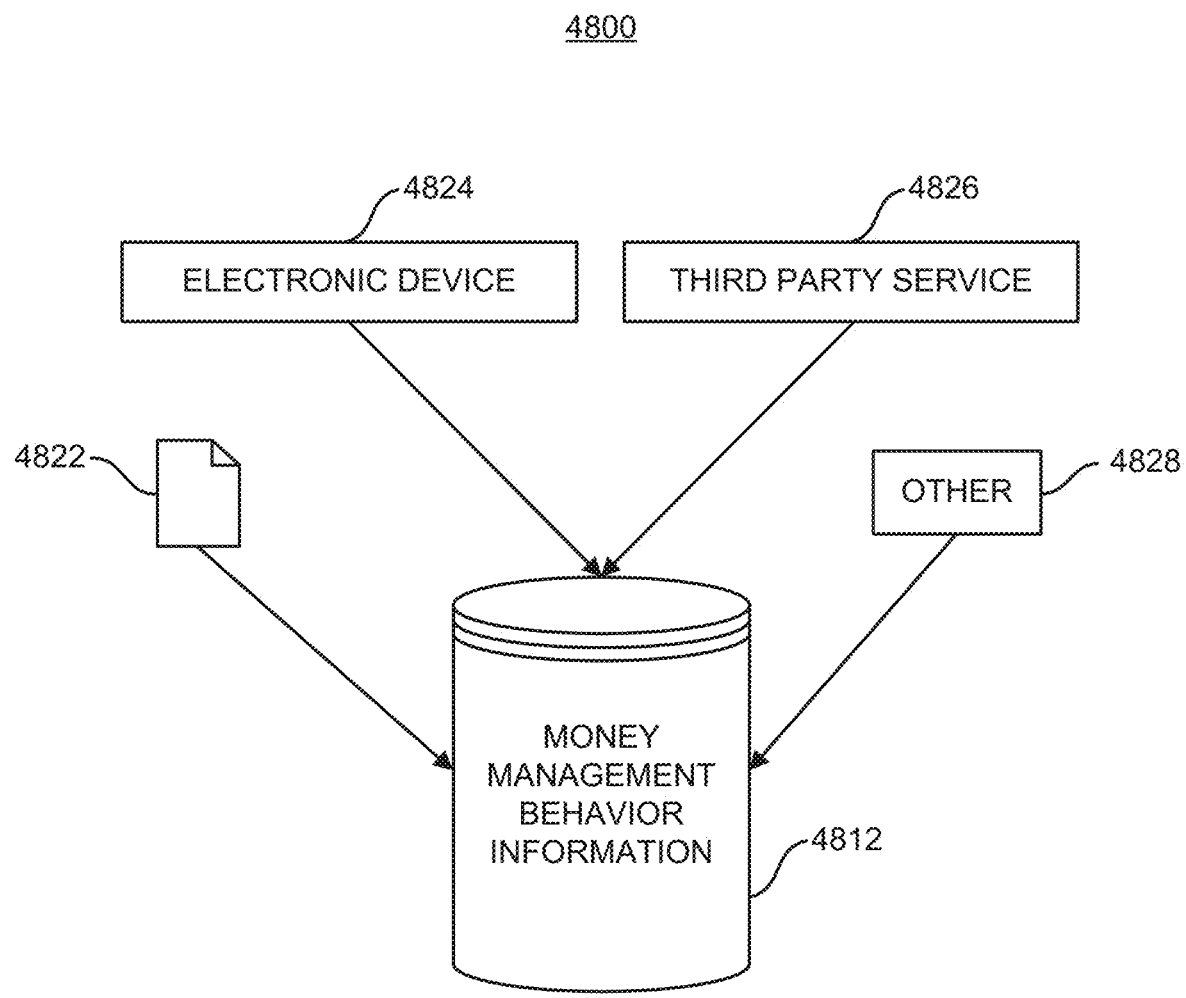
FIG. 3E illustrates a variety of sources for collecting Money Management Behavior information in accordance with the financial behavior rules database and faith-based rules database of the present teaching.
Figure 3F:
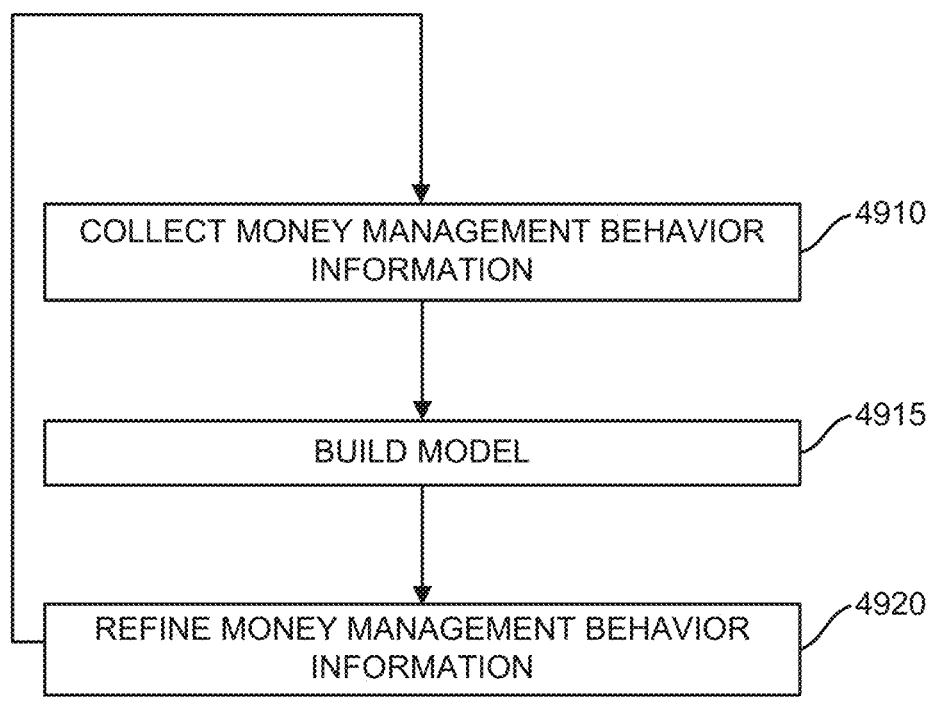
FIG. 3F depicts a Money Management Behavior model in accordance with the financial behavior rules database and faith-based rules database of the present teachings.

As shown for example in FIGS. 3E-3F, one example of a mechanism that may be employed in the financial behavior rules database and faith-based rules database to gather and compile preliminary information is a money management behavior assessment. The money management behavior assessment can aid the user in evaluate actual behaviors in making economic choices and courses of action they most likely would take in a given economic scenario. The present teachings can include collecting information and building a model based on the information. Such a model can then be used to develop a money management behavior profile that represents certain styles of economic oversight. The assessment helps the user to reflect on such things as their actual buying decisions, saving decisions, financial habits, money management practices, and various economic choices. It will also uncover the actions, behaviors, and proclivities that influence economic circumstances and financial outcomes. Information collected in creating the user's money behavior profile will be used to compare how well their behaviors align with their stated values, priorities and goals and to provide insights into issues that corrective attention. The comparative evaluation will serve to highlight misalignment between stated values and their financial choices and financial behaviors and misalignment between priorities and goals and their actual choices and financial behaviors and/or principles related to faith-based text, This model will be employed under the financial behavior key insight category.

The money management behavior information can include any information, such as, for example, personal finance, money management, and budgeting, collected about an individual. In the method 4800, FIG. 3E shows a variety of sources for collecting behavioral information 4812. The behavioral information 4812 can be stored in electronic (e.g., digital) form in a computer-readable medium (e.g., RAM, ROM, magnetic disk, CD-ROM, CD-R, DVD-ROM, and the like). Possible sources for collecting the behavioral information 4812 include a paper-based source 4822, an electronic device 4824, a third-party service 4826, or some other source 4828. The behavioral information can include, for example, a user's answers to an on-line economic behaviors quiz. As shown, for example in FIG. 3F, the quiz may present questions to the user regarding savings, spending, expenses, record keeping, vacations, giving, relationships, retirement, and planning for the future.

After the money management behavior information 4812 has been collected in step 4910, a money management behavior model 4915 can be built as shown in the method 4900 in FIG. 3F. The behavioral model can take a variety of forms, including artificial intelligence-based models. The behavioral model can generate one or more behavioral profiles based on money behavior information inputs. Thus, the model can be used to identify or reveal the practices, patterns, habits, behaviors and choices related the user's economic life and financial management. In practice, the model can be implemented as computer-executable code stored in a computer-readable medium. In step 4920, the user's money attitudes can be subsequently refined as the user develops a reprioritized focus in managing his or her finances.

As an exemplary description of a final output, a composite report that consolidates all individual results will be generated. Results of assessments from each of the 4 key areas of resource alignment that evaluated similar financial principles will be compared to one another to determine degree of alignment or misalignment among the 4 key areas. In addition, potentially harmful aspects of assessment results will be highlighted and feedback will be provided.

The user's dominant life values assessment profile (FIG. 2D) will be displayed along with brief summaries of the other assessment profiles. If there is not a dominant profile, medium-scoring profiles will be displayed to indicate areas of balance.

The user's dominant money attitude assessment profile (FIG. 43) will be displayed along with brief summaries of the other assessment profiles. Positive aspects, as well as possible threatening characteristics of the assessment results, are determined and displayed. Comments from the financial behavior rules database and insights form the faith-based rules database to any threatening characteristics of assessment results will be displayed.

The user's dominants spending decision behavioral driver assessment profile (FIG. 3B) will be displayed along with brief summaries of the other assessment profiles. If there is not a dominant profile, medium-scoring profiles will be displayed to indicate areas of balance. Inconsistencies between user-reported values and dominant spending decision driven profile, as well as the ideal corresponding profiles, will be displayed. Comments from the financial behavior rules database and insights form the faith-based rules database to any threatening characteristics of assessment results will be displayed.

The user's dominant money behavior motivator assessment profile (FIG. 3D) will be displayed along with brief summaries of the other assessment profiles. Positive aspects, as well as possible threatening characteristics of the assessment results, are determined and displayed. Comments from the financial behavior rules database and insights form the faith-based rules database to any threatening characteristics of assessment results will be displayed.

The user's dominant money management behavior assessment profile (FIG. 3F) will be displayed along with brief summaries of the other assessment profiles. Inconsistencies between characteristics of the dominant profile and wise financial management principles are displayed. Comments from the financial behavior rules database and insights form the faith-based rules database to any threatening characteristics of assessment results will be displayed.

Results of the user's Budget Ratio Analysis (FIG. 16) and Financial Ratio formulas that fall outside of the acceptable guidelines are displayed, indicating financial weaknesses and threats. Comments from the financial behavior rules database and insights form the faith-based rules database to any threatening characteristics of assessment results will be displayed based on inputs related to such things, as how the user's qualitative responses and perceptions about their finances actually aligns with the quantitative data collected and evaluated.

Figure 4A:
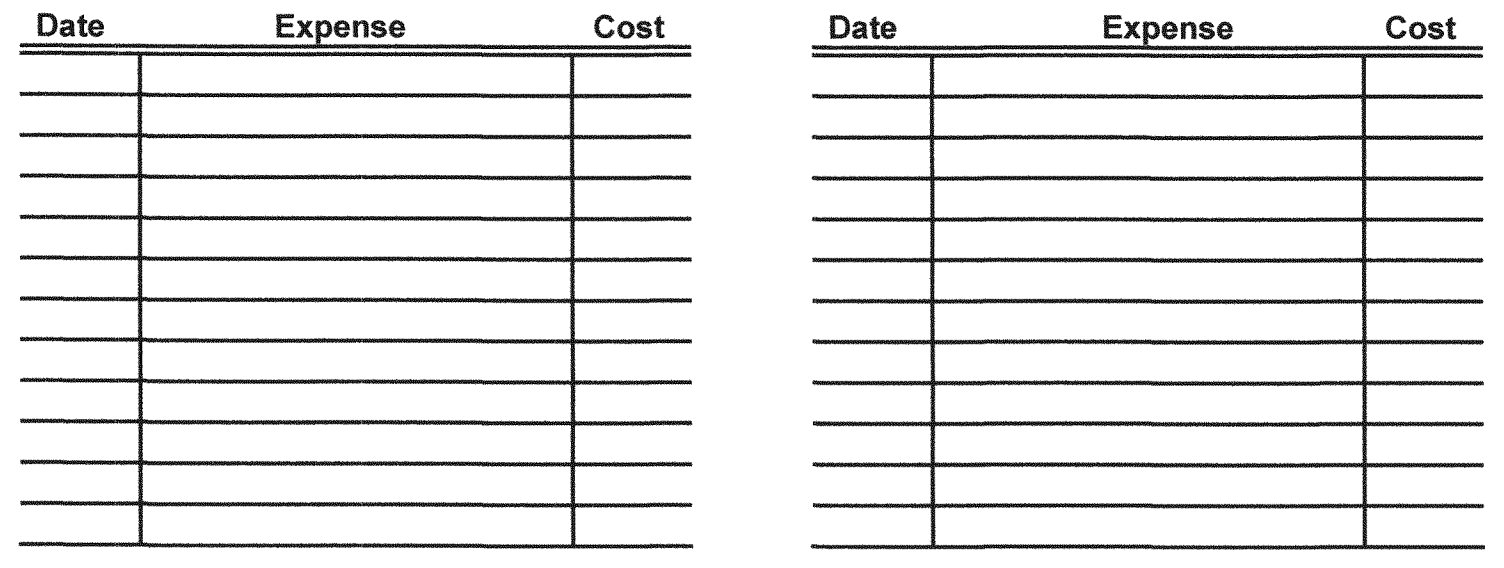

Another mechanism that the financial behavior rules database and faith-based rules database may employ to assist the user to collect preliminary financial information is an Expense Record Log 400 (FIG. 4A), which can be used in a similar manner to the money personality assessment to gather information. Using a computer device connected to a printer, the user may print out and carry the Expense Record Log to accurately track the user's spending activity for a specified time, for example, a minimum of six weeks. Alternatively, the user may employ a software program of the Expense Record Log 400 downloaded or installed within an electronic mobile device, such as a mobile phone, to record and track the user's spending activity. As shown in the example in FIG. 4, the Expense Record Log 400 may permit the user to record impulse and unplanned spending and hard to track cash expenditures. Expenses should be recorded as they are incurred, if possible. The user may compile the data from the Expense Record Log 400 into the Weekly Spending Report 410 (FIG. 4B) to update periodically such as weekly or monthly.

Using the information recorded in the Expense Record Log 400, the user may use the rules database and faith-based rules database to more accurately prepare a report of all monthly expenses that realistically reflects the user's routine pattern of activities.

As the user uses the financial behavior rules database and faith-based rules database in preparation to improve the management of user's resources, it is important to determine what the user's money is doing and how it is contributing to living out the life based upon the user's personal values and goals. In various embodiments, the financial behavior rules database and faith-based rules database enables the user to prioritize the user's finances based upon the user's economic guidelines and values-based priorities. The process of the rules enables the user to set a course that focuses the user's plans and finances toward values-centered goals and priorities. Before charting the course toward the user's values-based goals and priorities, the process assists the user in determining a realistic current assessment of the financial means with which the user is working with based on the user's monthly income and available assets.

To accurately determine the user's monthly income, the user can use the rules database to complete a Monthly Income and Expense Analysis 500, as shown, for example, in FIG. 5A. Each category for a given expense, in FIG. 5A, tracks expenses for a predetermined time. Using the financial behavior rules database and faith-based rules database, the Income and Expense Analysis 500 can be automatically adjusted to track expenses for another time period, such as, every three months. As shown in FIG. 5A, the Monthly Income and Expenditure Analysis 500 can include categories, such as, for example, incoming provisions, home and household maintenance, food, clothing, transportation, medical/dental, insurance, personal grooming/maintenance, debt obligations, and savings. As the user records the amount spent on an expense, if the expense recurs at intervals other than monthly, the user must average the expense to reflect a monthly allocation amount. If the user has not maintained well-documented income and spending records, the user may enter estimates of the expenses into the financial behavior rules database and faith-based rules database based on the user's typical activities and spending patterns. The user should compile and provide accurate figures into the monthly income and expense, because the information provided herein may be used in other stages of the process.

To assist with accuracy in compiling monthly expenditure totals, the user can use the Weekly Expenditure Worksheet 510 (FIG. 5B) which will enable the user to more easily organize, manage, and track all expenditures on a systematic and ongoing basis. The weekly figures can then be used to complete the Monthly Income and Expenditure Analysis 500 that may be used to prepare the user's spending plan.

Various embodiments of the financial behavior rules databases and faith-based rules databases serve as a guide for use by the users in evaluating their individual attributes that shape their personal values . . . . Our values should be used as a compass for decision making in life. Economic decisions and life choices that influence finances should be sifted through our values constitution to determine if decisions support or deflect us from what is important and meaningful in our lives. Often, getting a clear on what's really important to us requires reflecting and tapping into the user's core values, personality traits, and sense of purpose. The financial behavior rules database and faith-based rules database may provide users with a Values and Vision Statement Evaluation Tool 600, which may be displayed to the users on a computer screen in various formats, such as, for example, as shown in FIG. 6 to enable each user to define his or her core values, character and passions. The evaluation tool 600 may be used in hard copy or print medium. It is also contemplated that the evaluation tool can be presented in any suitable medium, including electronic media via a computer.

In situations where users are having trouble clearly developing their vision and are unable to complete the exemplary tool in FIG. 6 at this stage of the process, the financial behavior rules database and faith-based rules database enables each user to perform a personal inventory assessment to determine the user's innate attributes and aid the user to develop a clearer vision. The personal inventory assessment, according to various embodiments of the present teachings, may provide at least one evaluation tool and/or evaluation technique to profile the user's core values, character, and passions. The personal inventory assessment evaluation tool may also be used in hard copy or print medium. Preferably, the evaluation is administered and scored by computer. A suitable computer program can automate the steps of the evaluation. Thus, for example, a suitable computer program records all answers provided by the user, calculates totals of the values of the answers chosen by the user to questions, and establishes and displays a preliminary personal inventory profile indication to the user after the user has answered all the questions.

Using the profile of the Values and Vision Statement Evaluation Tool 600 provided in FIG. 6 or derived according to the personal inventory assessment, the financial behavior rules database and faith-based rules database can use the profile to indicate a path for the user to achieve his or her major life goals.

In performing the personal inventory assessment, the financial behavior rules database and faith-based rules database may assess several user traits and characteristics, such as, for example, core values, spiritual gifts, skills, abilities, talents, interests, experiences and personality. The financial behavior or faith-based rules may contain a database containing definitions that define indicators of each examined characteristic and/or trait. For example, the personal inventory assessment may examine the characteristic of the user's leadership skills. The indicators defined within the database for the characteristic of "leadership" may include submissive, low assertive, high assertive and aggressive. Based upon the answers that the user provides, the personal inventory assessment test compares the answers provided by the user to the indicators to calculate the user's profile for a specific characteristic and/or trait. Then, the personal inventory assessment produces and displays a profile of the user's innate characteristic and/or traits as a measure in comparison to the previously defined characteristics and/or traits. The profile may be presented to the user as a written report, a computer-generated graph, a numerical point system, alphabetically grading scale and/or a combination thereof.

The personal inventory assessment may include individual assessment tests, such as a values assessment test, a personality assessment test and/or a spiritual gifts assessment test. Various assessment tests are well known. Such commercially available assessment tests, in electronic and/or paper form, may be used in conjunction with the financial behavior rules database and faith-based rules database of the present teachings. For example, the values assessment test may use the "Identifying Your Core Values" Assessment Test provided by Intuitive Life Coaching, "Identifying Your Values" Assessment Test provided by Touchpoint Coaching, and "Do You Know Where You're Going" provided by Revolution Health Group. The personality assessment test can be accomplished using, for example, standard industry personality typing tests such as the Myers, Briggs Personality Assessment Test or the Keirsey, Bates Temperament Sorter, published in 1978 by David Keirsey and Marilyn Bates. The spiritual gifts assessment test may be carried out using, for example, "An On-Line Spiritual Gifts Test" available via the Internet at www.kodachrome.org/spiritgift/.

Using the financial behavior rules database and faith-based rules database, the user can develop a vision statement based on the responses provided by the user in the Values and Vision Statement Evaluation Tool assessment 600, for example, in FIG. 6 and/or the personal inventory assessments, described above. The vision statement will incorporate the major life goals the user desires to reach. The vision statement may serve as a personal constitution that defines the users most closely held values and aspirations. The financial behavior rules database and faith-based rules database enables the user to consider core values, character and passions and to envisage and to state a desired personal vision of the future that the user hopes to achieve. The Personal Vision Statement 700, as shown for example in FIG. 7, may address several issues, such as, for example, "Who are you?" "How do you see yourself?" and "Envision the person who you are striving to become?" The results of the Personal Vision Statement 700 may be used by the financial behavior rules database and faith-based rules database in additional tasks, lessons or assignments to guide the user in evaluating whether his or her plans and current activities are in alignment with the user's personal vision statement.

The financial behavior rules database and faith-based rules database also serves as tool to assist the user in performing financial planning as life planning. According to the present teachings, the user cannot carry out his or her desired plans effectively without planning. Planning for personal attainment cannot be done in isolation of planning the user's finances. Determining how much the user will need and when the user will need it is essential in assuring successful progress along the path towards manifesting one's desired intentions. The impact of unintended behavioral outcomes and imprudent financial decisions can derail well intended plans. A life values focus requires reflective thought that increases awareness of obstacles adverse tendencies that planned strategies can help address.

The financial behavior rules database and faith-based rules database also parallels economic guidelines based with scripturally-based guidelines that may be beneficial for those whose values are compatibly aligned with the scripturally-based principles. For example there are over 2,000 Biblical Scriptures dealing with the issues of money and material possessions. For example, there are over 2,000 Biblical Scriptures dealing with issues of money and material possessions. The financial behavior rules database and faith-based rules database incorporates a scripturally focused guidance that provides the user with a better understanding of how to harmoniously operate within faith-based laws and principles of finance and financial management while striking a balance in order to reap the rewards of personal stewardship and effective money management and planning.

Figure 9:
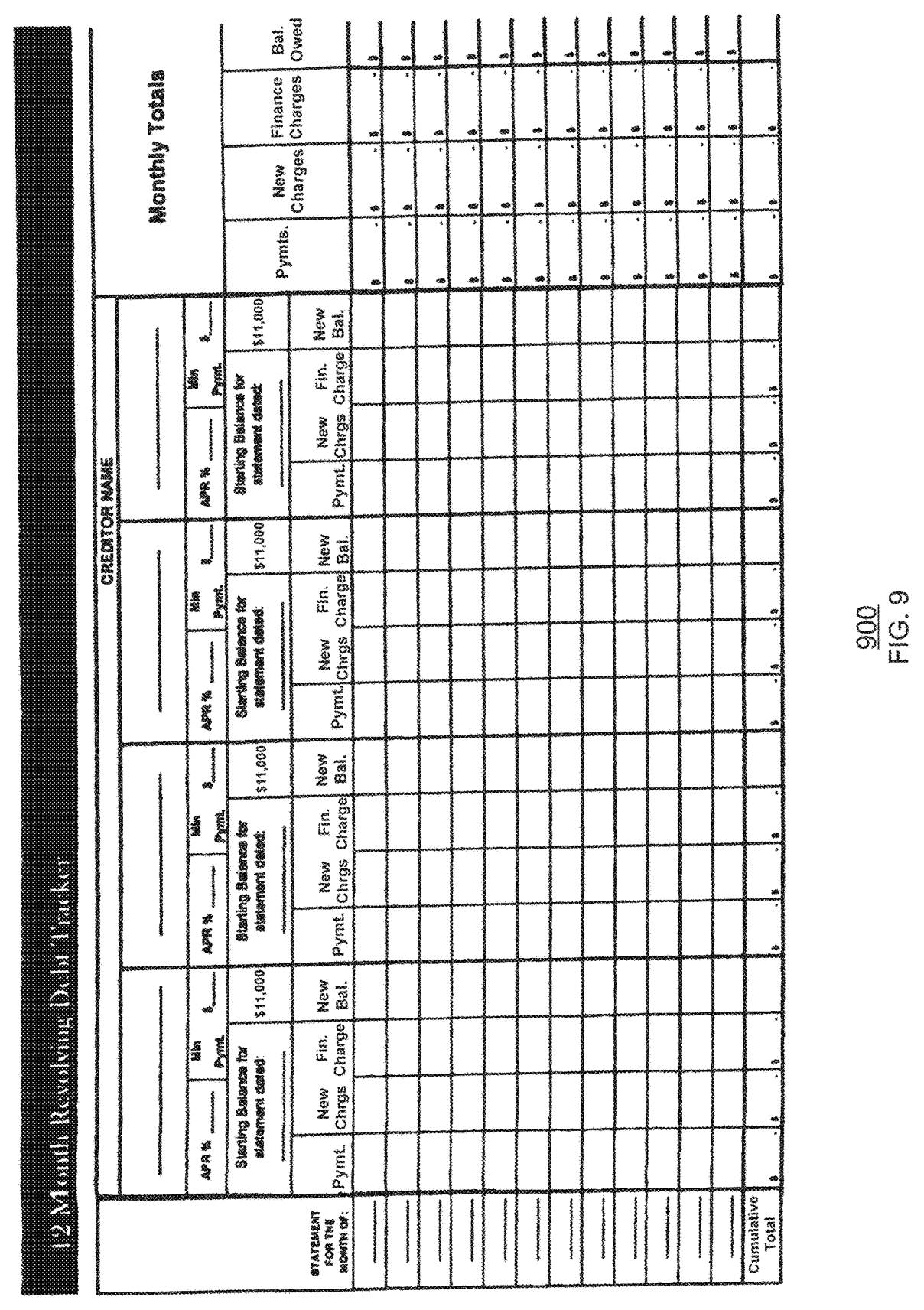

To assist the user in achieving his or her life goals, the financial behavior rules database and faith-based rules database provide an automated personal financial tracking system. The financial tracking system may include one or more ledgers for posting monetary transactions in the forms of debits and credits. The ledgers may be used to receive data inputs in the form of electronically recorded financial transactions. For example, the financial tracking system may include a debt ledger 800 (FIG. 8), a debt tracker 900 (FIG. 9), a loan transaction ledger 1000 (FIG. 10), and a savings record (not shown). The above list is not an exclusive one. Those having skill in the art would understand that other financial tracking and reporting systems and schemes may be employed. Oftentimes, it is difficult for the user to gain control over his or her financial affairs and achieve any measurable financial and personal goals without having an accurate assessment of the user's current expenditures. As a user typically evaluates his or her expenses based on a monthly income analysis, often there are overlooked areas of spending such as spending financed with credit and debt and spending from savings account withdrawals. Using the financial tracking system to report and record the information requested, for example, in FIGS. 8-10, the financial behavior rules database and faith-based rules database enable the user to examine his or her recent history of credit spending, savings withdrawals, and account transfers in order to obtain a better understanding of how the user is using his or her money.

The information regarding the user's savings and debt transaction can assist the financial behavior rules database and faith-based rules database to more accurately identify the user spending patterns. Therefore, using the information recorded in the ledgers such as for example in FIGS. 8-10, the financial behavior rules database and faith-based rules database may automatically update the user's monthly income and expenditure analysis in FIG. 5. The ledgers in FIGS. 8-10 can also be manually updated by the user or by a financial adviser.

The financial behavior rules database and faith-based rules database further enables the user to clarify goals and priorities so that the user can more efficiently and effectively develop his or her financial plans. The financial behavior rules database and faith-based rules database use a values-based financial planning process which emphasizes that individuals have a responsibility to manage their finances based on their values and in accordance with their deeply held priorities and life plans. One principle of the values-based financial planning process is that financial resources, along with other resources, should be properly allocated and effectively managed to accomplish the user's life goals. To develop the user's financial plans, the user should have a target destination. These are the user's goals. The rules enable users to insure that their priorities are consistent with their goals and aids to plot a path detailing targeted tasks to help each user achieve intended plans.

The financial behavior rules database and faith-based rules database permit the user to associate a financial value to tangibles, such as material possessions that the user wishes to acquire, and non-tangibles that the user wishes to achieve or that relate to how users manage their lifestyles, such as poor time management skills and procrastination. Repeated occurrences of such events can form a habit, which can have deleterious effect on a user's financial well-being. For example, repeated tardiness by the user at his or her job may be cause for permanent dismissal.

The financial behavior rules database and faith-based rules database may enable users to list their goals in a Balanced Goals Worksheet 1100 as shown for example in FIG. 11 and list their priorities in the Balanced Priorities Worksheet 1200 shown for example in FIG. 12. According to the exemplary embodiment in FIG. 11, the financial behavior rules database and faith-based rules database may prompt users to enter their short-term goals (0-1 year), mid-term goals (1-5 years) and long-term goals (greater than 5 years) in categories such as spiritual, home environment, work/career, relationships, and finance.

Various embodiments of the rules may enable users to address their personal priorities such that their financial choices are balanced with daily living expenses and the allocation of funds to reach their short- and long-term goals. The financial behavior rules database and faith-based rules database assist the user to maintain a visual record as a reminder of what issues takes precedent in managing the areas that users are to improve resource allocation. Should a user stray and gravitate towards trivial pursuits, the priority worksheet 1200 in the financial behavior rules database and faith-based rules database, for example, in FIG. 12 may serve as a tool to identify the areas that the user should establish as focused priorities. Similar to the goal's worksheets in FIGS. 11A and 11B, the balanced priorities 1200 may address categories such as spiritual, home environment, work/career, relationships, and finance.

After users enter their goals and priorities, the financial behavior rules database and faith-based rules database can assist the user to rank the goals and priorities of the users. In some embodiments, the user may elect to input and rank their goals and priorities using a Financial Planning Personal Goals and Priorities Worksheet provided in the software of the financial behavior rules database and faith-based rules database, as shown for example in FIG. 13. In some embodiments, using the information provided in FIGS. 11 and 12, the user may elect that the financial behavior rules database and faith-based rules database generates an automated rank of their intermediate goals and priorities to obtain their major life goals. A comparison between the user-generated ranking and the automated-generated ranking can also be performed.

The financial behavior rules database and faith-based rules database may demonstrate key financial concepts through written and video discussions and illustrations to provide users with an understanding of how money works according to specific fixed principles. According to the values-based financial planning process, lack of financial knowledge can be one of several obstacles which hinders an individual's financial planning success. The financial behavior rules database and faith-based rules database may include one or more financial calculators that provide practical examples illustrating the hidden financial impact of routine choices that an individual makes on a daily basis. The financial calculators may illustrate, for example, the following concepts:

1. The impact of compounding
2. The time value of money
3. The geometric accumulation principle
4. The impact of inflation
5. The impact of debt
6. The impact of mismanaged credit
7. The importance of investing Using the financial calculators of the financial behavior rules database, u and faith-based rules database users can perform numerous scenarios, changing the variables to generate and understand the different outcomes. By modifying different variables to change the outcomes, users will be able to realize how important it is to be aware of the financial implications of spending, saving, borrowing and investing decisions.

Personal financial statements may be prepared in various embodiments of the financial behavior rules database and faith-based rules database by the user electronically or manually completing a financial report, for example, as shown in FIGS. 14 and 15A-15C. The financial behavior rules database and faith-based rules database may include two primary personal financial statements such as, for example, a Statement of Financial Position 1400 and a Cash Flow Statement 1500. The Statement of Financial Position 1400 may detail an individual's financial status at a set date noted on the statement. The statement may show a snapshot of an individual's net worth at that set date. The statement may show categories of assets that an individual owns and categories of liabilities for what the individual owes. Namely, the statement may show valuation information in two main categories for each term period covered. To analyze a user's financial status, the financial behavior rules database and faith-based rules database may examine the financial numbers related to two categories: assets and liabilities.

In the exemplary embodiment of FIG. 14, the assets may relate to users' cash/cash equivalents, invested assets and use assets, and the liabilities address users' credit card balances, auto loans, personal loans, mortgage balances, etc. As noted on statement 1400, a user's assets minus his or her liabilities determines the user's net worth. Information recorded.

The Statement of Cash Flow 1500 reports the flow of cash into and out of an individual's financial portfolio. The Cash Flow Statement 1500 may be used to determine an individual's sources and uses of cash for a stated time period. The Cash Flow Statement 1500 may be determined on a monthly, quarterly and/or an annual basis or a combination thereof. The cash flow in the example of FIGS. 15A-15C is shown on an annual basis. Both the Statement of Financial Position 1400 and the Cash Flow Statement 1500 may be used by the financial behavior rules database and faith-based rules database to guide users to relevant financial planning and financial management principles and/or relevant scriptural teachings that will help the user to address identified shortcomings and challenges involved in the user's management of resources or financial stewardship. Evaluation of these personal financial statements reveal more accurate data for the user to assess and establish more realistic and measurable goals and to realign the user's priorities to further plot the user's path for accomplishing the users' intended goals and plans. The reassessment facilitated by the information recorded in the personal financial statements enables the user to make plans related to the user's income, spending, and savings that allows the user to manage their resources according to values-based planning guidelines and the user's life plans and/or also faith based-based principles.

As previously noted an individual's overall financial health is comprised of many elements, such as, for example, whether an individual has three months of living expenses saved to cover emergencies; whether an individual is participating in his or her company's 401(k) or pension program; whether an individual saves or invests beyond his or her retirement plan and emergency fund; whether an individual has life insurance and disability insurance; whether an individual has a will, whether an individual spends less than 25 percent of his or her income on rent or mortgage, whether an individual pays his or her credit cards in full each month, and whether an individual pays all of his or her bills in full each month. Typically, such questions are present as a quiz or test to user to determine a user's financial health. Various types of financial health quizzes exist to assist a user to target areas that need further work. For example, financial health quizzes that focus on a user's overall financial health can be found via the Internet at www.finishrich.com/free_resources/fr_financialtest.php and www.msmoney.com/mm/financial_health/msm_finhealth_test.htm. Financial health quizzes that are directed to a specific financial area, such as credit and debit manage, can be found via the Internet at www.smartcredittips.com/main.html and www.usnews.com/blogs/alpha—consumer/2008/1/31/a-financial health-quiz.html. The present teachings of the financial behavior rules database and faith-based rules database may employ various financial health quizzes, including one or more of the above quizzes, to determine a user's financial health.

The financial behavior rules database and faith-based rules database enables users to examine their finances from a quantitative perspective to determine the economic soundness of their financial situation. This feature allows users to identify strengths and to uncover weaknesses and vulnerabilities in their financial situations. To aid in performing the quantitative assessment, users may complete a Budget Ratio Analysis 1600 (FIG. 16) using the financial behavior rules database and faith-based rules database. As shown in FIG. 16, this analysis tool 1600 provides insight into whether a user's spending is in relation to his or her income for various budget categories and whether such spending is considered to be within reasonable normal ranges.

If the user expends money over- or under acceptable guidelines for a particular category, this should alert the user that further evaluation is needed to determine whether the user's expenditure ratio is warranted or reasonable for the user's particular circumstances. If the user's expenditures are in the extreme high or low ranges, using the financial behavior rules database and faith-based rules database, the user may wish to make adjustments in those areas to improve his or her overall finances.

By using one or more of the analysis, calculations or worksheets described above, the financial behavior and faith-based rules permit users to determine how well they are managing their finances in terms of their financial wellbeing and progress towards goals. For instance, users may review the information collected and recorded in one or more of the followings:

1) Monthly Cash Flow Statement
2) Annual Cash Flow Statement
3) Statement of Financial Position
4) Debt Ledger
5) Savings Record
6) Financial Ratio Analysis
7) Personal Vision Statement
8) Balanced Priority Worksheet
9) Financial Planning Personal Goals Worksheet While reviewing the information, each user may focus on asking questions such as "What story would be written about the user if someone only had his or her financial reports and assessments as a basis for the story?"; "What does the data say about the user—his or her use of money, the things that the user values most, and the user's financial priorities?"

Based upon the user's review, the user may draft a Summary of Financial Findings 1700 using the exemplary tool in FIG. 17. The Summary of Financial Findings 1700 may be a very short paragraph that summarizes your review of your financial status. By using character recognition, intelligence-based modeling and historical databases within the financial behavior rules database and faith-based rules database to recognize input characters and assign corresponding quantitative values, the Summary of Financial Finding 1700 can be used to perform a comparison between the user's own financial summary and any other automated computations performed by the financial behavior rules database and faith-based rules database.

Furthermore, users can employ the financial behavior rules database and faith-based rules database to complete the Finance and Financial Values Questionnaire 1800, as shown for example, in FIG. 18. The Finance and Financial Value Evaluation Questionnaire 1800 may consist of a series of questions pertaining to the user's personal finances and covering several of the previously discussed topics. Thus, the financial behavior rules database and faith-based rules database may automatically incorporate some of the users previously provided input as responses into the Finance and Financial Values Evaluation Questionnaire 1800. The Finance and Financial Values Evaluation Questionnaire 1800 exercise will help the user to assess whether the values, behaviors and actions that shape his or her current financial life conform to the relevant financial planning principles and or verses or passages from a faith-based text, such as the Scriptures of the Bible.

Provided within the FBR database may be a Scriptural Database 1900 including topics that correspond to the categories of the Finance and Financial ValuesQuestionnaire 1800. The user's response to the Finance and Financial Values—Questionnaire 1800 enables the financial behavior rules database and faith-based rules database to determine the values-based categories where the user needs improvement. The financial behavior rules database and faith-based rules database may access, retrieve and display to the user on an electronic display, such as a computer screen, relevant principles of verses of values-based teachings based upon the responses provided by the user in the Financial Values Questionnaire 1800. Further, the values-based financial planning rules database 1900 may provide the user with principles and examples of values-based financial planning that will enable the user to gain a proper perspective in various areas of interest, including financial and personal matters.

After the user has reviewed the principles and examples provided by the financial planning rules database 1900, the financial behavior rules database and faith-based rules database may prompt the user to review his or her Values and Vision Reflections described above to determine whether it should be updated or modified in view of the new information learned based upon the results generated by the financial behavior rules database and faith-based rules database. If such modifications are appropriate, the financial behavior rules database and faith-based rules database may further assist the user to evaluate which areas should be changed and how such changes may affect how the user's financial matters in the future.

Based on the findings in the evaluation exercises in FIGS. 18 and 19, the financial behavior rules database and faith-based rules database permit the user to document his or her commitment to address the issues needed to improve the allocation of their resources by completing, for example, a Commitment Strategy Worksheet 2000 shown in FIG. 20. The Commitment Strategy Worksheet allows users to document those things that they recognize about their financial life that needs to be addressed to improve the allocation of their economic resources. This worksheet may also help users understand their true commitment to the work, requirements, sacrifices and adjustments that need to be made to facilitate the needed changes.

Based upon the review of their financial status, the financial behavior rules database and faith-based rules database permit the users to formulate specific goals and financial plans. The financial behavior rules database and faith-based rules database enable users to reprioritize how they allocate their income. After the user gains some insight into how they wish to refocus the use of their money, the financial behavior rules database and faith-based rules database can assist the users to determine if they can produce any additional discretionary income by reducing expenses. Using the information recorded in the Income and Expenditure Analysis Worksheet 500 (FIG. 5), the financial behavior and faith-based rules may automatically complete the Income Allocation Adjustment Worksheet 2100 (FIG. 21). The Income Allocation Adjustment Worksheet 2100 reassess the users' priorities and determines how users can reallocate their income provision based on values, goals, priorities and planned intentions to a plan more effectively.

This feature of the financial behavior rules database and faith-based rules database may accomplish the following:
  1. Help users to assess their priorities in their current spending and determine the adjustments they are willing to make within their current budget to free-up and/or earn additional income.
  2. Establish new allocation amounts within a user's current expenditure categories.
  3. Calculate the total additional income to be made available for new priorities and goals.
  4. Calculate the amount of any income shortfall that must be planned for and corrected.

To assist with the completion of the above exercises, the financial behavior rules database and faith-based rules database may automatically incorporate the information recorded in the following completed reports:
  1. Summary of Financial Findings
  2. Commitment Strategy Worksheet The financial behavior rules database and faith-based rules database also enable users to revisit their priorities and goals. Based upon the previous calculations and assessments, users know the worth of their financial assets and have a better insight into the amount of their uncommitted discretionary income. Additionally, based on what users have learned about resource allocation, about themselves, and their finances, it is likely that each user has developed some new ideas and strategies that may require revision of their Financial Planning Personal Goals and Priorities Worksheet 1300 (FIG. 13).

In order to revise the Financial Planning Personal Goals and Priorities Worksheet 1300 (FIG. 13), users may first review the Balanced Goal Worksheet 1100 (FIGS. 11A and 11B) and the Balanced Priorities Worksheet 1200 (FIG. 12). Deletions from and additions to these worksheets can be made based upon the user's new insight into and understanding of their true financial circumstances. If evaluation of a user's Personal Financial Statements 1400 and 1500 (FIGS. 14 and 15) reveal any weakness and vulnerabilities which places his or her financial health and financial future in jeopardy, the user should include those concerns under "Finance" on the applicable worksheet. Users may also refer to the Commitment Strategy Worksheet 2000 (FIG. 20) and Summary of Financial Findings 1700 (FIG. 17) previously completed to determine whether any issue listed therein should also be included within the Balanced Goal Worksheet 1100 and the Balanced Priorities Worksheet 1200.

The financial behavior rules database and faith-based rules database provide a Financial Priorities and Goal Setting Planner 2200, because, in order to successfully obtain goals, the users need to be specific in formulating a plan to fund their goals. Users may select from worksheet 1100 their top 5 highest priority goals for each time frame; short-, intermediate-, and long term. These goals may be entered in the Financial Priorities and Goal Setting Planner 2200 (FIG. 22). This planning tool is similar in format to the Financial Planning Personal Goals and Priorities Worksheet 1300 but requires additional information.

In order to plan financially for goals, goals must be measurable. Thus, the financial behavior rules database and faith-based rules database provide a mechanism to assign a dollar cost figure to each goal. This requires each goal be quantified as a monetary amount. Using information stored within its database or through research conducted via connecting to the Internet, the financial behavior and faith-based rules may automatically quantify the value of each goal. Alternatively or in conjunction with the automated values, users may modify and/or manually research and enter their own values. Without a defined target, users may not be able to effectively establish a financial course of action. The quantified monetary values for each value may be entered in the Financial Priorities and Goals Setting Planner Worksheet 2200 in FIG. 22.

An additional feature of the financial behavior rules database and faith-based rules database enable users to determine their monthly income commitments. This feature assists users in determining a realistic time frame in which they can achieve their goals. The Goal Planning Calculator 2300 (FIG. 23) enables users to determine if their goals are realistic and attainable. Transforming a goal into a reality requires that the users have the needed cash or assets when the time arrives to achieve the specific goal. The Goal Funding Planner 2300 allows users to determine within a set time frame, the savings commitment that must be made to pay for the goal. Multiple goals generally must be planned for simultaneously so that users can coordinate their financial commitments to fit within their budget. The Goal Funding Planner 2300 allows multiple goals to be examined simultaneously so that users get an idea of the total income commitment required if trying to achieve each goal by its target date. In the example shown in FIG. 23, the Goal Funding Planner 2300 illustrates simultaneous tracking and monitoring of three goals. This feature may help users prioritize which goals are most important.

The financial behavior rules database and faith-based rules database may also include a Target Accumulator Planner Worksheet 2400 (FIG. 24) that, on the other hand, allows users to key in different time frames to determine the monthly savings required to reach a given accumulation target. Both worksheets 2300 and 2400 may allow adjustments for the rate of return assumptions since variances in rates of return can significantly impact planning of long-term accumulation goals.

Using the automated worksheets 2300 and 2400, users may test several different scenarios to determine what goals are attainable within their financial circumstances and time specifications so that the users can establish the priority of their short-, intermediate-, and long-term planning goals.

The financial behavior rules database and faith-based rules database, in various embodiments, may provide a Retirement Savings Goal Calculator 2500 such an example is shown in FIG. 25. There are some goals where neglect will potentially result in such unfavorable consequences, that they must be made a priority. For most people, planning for retirement is such a goal that it must be given priority in their financial focus. The financial behavior rules database and faith-based rules database enable the users to assess the cost of this goal by completing the Retirement Savings Goal Calculator 2500.

At this step in the process, the financial behavior rules database and faith-based rules database may prompt users to assign a "Priority Ranking" on the Financial Priorities and Goals Setting Worksheet 2200 for each time frame category.

After addressing your priorities, prioritizing which priorities are most important and determining the monthly cost commitment, the user may include these amounts on the Income Allocation Adjustment Worksheet 2600 (FIG. 26) under "Necessary Changes". This will reduce the amount of discretionary surplus for a user and determine how much the user has remaining to finish planning for his or her goals.

After the deduction in a user's discretionary income, the user may wish to determine how to allocate the balance of his or her discretionary income to the user's goals. This information may be entered in the "Necessary Changes" column for the appropriate expenditure category on the Income Allocation Adjustment Worksheet 2600. This information may also be automatically entered as the "Amount to Save per Month" on Financial Priorities and Goals Setting Worksheet. 2200. With these amounts determined, the user may enter estimated target dates about his or her goals into the "Full Funding Target date" and "Target Start Date" sections of the Financial Priorities and Goal Setting Worksheet 2200.

Returning to the Income Allocation Adjustment Worksheet 2600, users may now compute the last column to determine their Preliminary Planned Spending. This information will be incorporated into the Spending and Savings Plan 2700 (FIG. 27), which may be used to assist the users in plotting a course for directing their plan of improved resource allocation.

At this stage in the process, the financial behavior rules database and faith-based rules database have enabled the users to complete the process of determining how their money will be used to achieve their major life goals. Next the financial behavior rules database and faith-based rules database may guide users with the preparation of a Spending and Savings Plan 2700 that will help keep their finances directed on a path to accomplish their major life goals. Some of the goals of the Spending and Savings Plan 2700 are to help users live within their means, spend less than they earn, eliminate and manage debt, establish a surplus of discretionary income, accumulate sufficient savings for unforeseen emergencies, future needs and opportunities, while still achieving the users' goals. With, these goals considered as input factors, the financial behavior rules database and faith-based rules database provide a cash flow statement format for users to create their Spending and Savings Plan 2700. As previously discussed, cash flow reporting examines the inflows and outflow of the users' income funds to determine how their money is used and what are the revenue sources. In some embodiments of the financial behavior rules database and faith-based rules database when formulating the Spending and Savings Plan 2700, the method may eliminate sources other than cash flow so that credit spending is not relevant. As users plan the proper allocation of the resources according to the values-based financial planning principles practiced in the financial behavior rules database and faith-based rules database, users employ a cash flow planning method that avoids the use of credit spending, establishes parameters to live within their means, and avoids the traps of debt. The majority of information needed for the Spending and Savings Plan 2700 may be obtained from the Income Allocation Adjustment Worksheet 2600. However, in comparison, the example of the cash flow format of the Spending and Savings Plan 2700 shown in FIG. 27 requires that users use their gross income. Therefore, in this example, any deductions that were netted out of gross payments must be included in the amounts for their applicable spending categories.

The Spending and Savings Plan 2700 is not a stagnant document. The initial calculation of the Spending and Savings Plan 2700 is based on a user's situation, priorities and goals regarding the user's current life plan and finances. As the user's plans progress, his or her spending focus will need to evolve to accommodate such progression. Thus, constant monitoring and adjusting, if necessary, of some or all aspects of a user's financial portfolio and goals should be performed periodically. Some aspects may be monitored, reviewed, revised, and updated on a more frequent basis, for example, on a monthly basis. While a more comprehensive review of other aspects may be performed on an annual basis.

Figure 28:
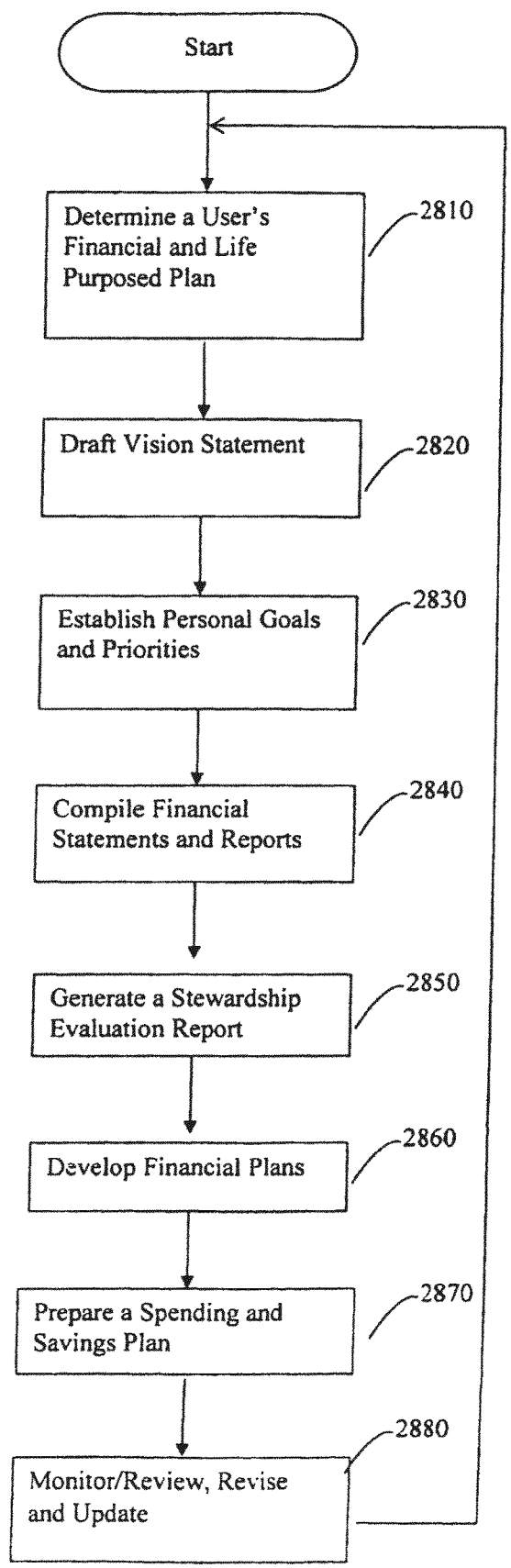
FIG. 28 is a flowchart illustrating an example of a general overview of a process used in a financial planning and management tool to implement the financial behavior rules database and faith-based rules database.

FIG. 28 is a flowchart illustrating an example of a general overview of the process 2800 used in a financial planning and management tool to implement the financial behavior rules database and faith-based rules database described above. In step 2810, a user initiates the financial behavior rules database and faith-based rules database application to assist the user in determining his or her financial and life goals. The process assists the user to draft a vision statement (step 2820); establish personal goals and priorities (step 2830); compile financial statements and reports (step 2840); generate a resource allocation evaluation report (2850); develop financial plans (step 2860); prepare a spending and savings plan (step 2870); and monitor/review, revise and update any previously prepared assignments, worksheets, or tasks (2880).

In one example of implementation of the system and method, the device 3000 may be a wrist band that will capture biological data during the monthly review of the individual's financial documents as part of the Figuring and Facing Financial Facts portion of the evaluation. Our methodology requires the users to engage in monthly analysis to monitor their finances and financial actions. Because the financial analysis will be compared to the user's established priorities and goals, the review of the responses relating to Pinpointing Priorities and Personal Values will precede the monthly review of the Figuring and Facing Financial Facts evaluation.

Step 1: The individual will strap the wrist band on their wrist, and their base heart rate and perspiration levels will be measured.

Step 2: The individual will then review the results of the prior assessments that were completed during the Life Values evaluative process. This includes results from their Life Values assessment model information in FIG. 2B, their Goals, Priorities, and Vision Statements, and other summary data used for defining their values and priorities.

Step 3: Directly afterwards, the user will review and analyze the month's financial activities and use of their money as part of their Personal Economic Assessment area. Reviewing their monthly Cash Flow Statement, Statement of Financial Position, Planned vs. Actual budget categories, Financial Ratios, and other summary documents. This review will provide clarity about their financial actions, personal choices, decisions, habits, discipline, progress toward or deviation from their goals, and the consistency with which the appropriation of their resources aligns with their stated values, priorities, and goals.

Step 4: Favorable consistency between the Life Values and Personal Economic Assessment areas will cause little to no stress response. However, if the user has inconsistencies between their established intentions and what actually transpired during the month, then a biological stress response will be activated. This will register on the device and provide clear evidence of the deviation from their financial intentions.

Similar to conducting a financial planning session, the device 3000 can be configured to instantaneously and dynamically detect the emotional response based on the user's biological data collected by sensor 3020 and, in comparison to the user's financial priorities during a financial transaction, for example, at a retail store. If a determination is made by the system 100 or device 3000 that the financial decision or financial transaction is adverse to the user's financial plans, the device is configured to instruct stimuli unit 3015 to provide a stimulatory effect to the user to mitigate the adverse financial decision based on the user's specific financial priorities.

In various embodiments, the device 3000 can be configured to detect the emotional distress experienced by a user to the financial decision and financial transaction by monitoring various body conditions of the user. The device may include a biometric sensor 3020 that is capable of measuring one or more body conditions, such as heart rate, perspiration level, and body temperature. In one embodiment, the device 3000 can be a wristband worn around the wrist of the user while shopping. In another embodiment, the device is a piece of smart clothing having one or more biometric sensors embedded therein and worn by the user while shopping. The biometric sensor 3020 can measure, for example, breathing, heart rate, and muscle tension to determine a number of health metrics, like stress level, anxiety, etc. When the user is stressed out, his breathing becomes shallow, his heart rate increases, and his body tenses up. The device 3000 can recognize one or more of these physical changes in the user's body and alert the user of these conditions. The emotional distress of the user can be estimated from the perspiration level, body temperature, heart rate, and a combination thereof using sensor 3020. If device 3000 determines based on the biometric data collected by sensor 3020 that the level of emotional distress exceeds a predetermined level, the system 100 or device 3000 instructs the stimulus unit 3015 of the device to generate and apply a stimulus to the user. The stimulus unit 3015 is configured to generate a stimulus under the control of the controller.

In various embodiments, the device 3000 (FIG. 29) may include a locating device 3025 that is capable of providing a signal that indicates the device's location. The locating device 3025 may include a Global Positioning System (GPS) device configured to generate a location signal indicative of a location of the device or any other known locating device that receives or determines positional information associated with the device. In addition to the GPS device, the device may include a motion sensor that is configured to detect one or more changes in position, velocity, acceleration, or orientation of the device. A controller may be provided in communication with the GPS device and the motion sensor. For example, the GPS device, the motion sensor, or a combination thereof can be used to track the location of the device. Based on the location signal received from the GPS device and/or the motion sensor, the controller can determine the device's location when the user enters a determined type of facility to conduct a financial transaction, such as a retail store, grocery store, or a bank while wearing the device. When the controller using the locating device 3025 determines that the user while wearing the device enters such a facility, the controller activates a biometric sensor 3020 to begin obtaining biometric data from the user. When the biometric data exceeds a predetermined level, the controller instructs the stimuli unit 3015 to apply a stimulus to the user for a predetermined amount of time or until the biometric data falls below the predetermined level.

The biometric sensor device 3000 includes a transceiver configured to relay sensor and location data received via wireless signals to server 104 via a network, such as the Internet 102 or a local area network. Through the connection to the Internet 102, the server 104 may also exchange data with external devices capable of interacting with the Internet 102, such as smart phones, a laptop, other servers, and a cloud data storage device 106. The biometric sensor device 3000 may transmit data, such as biometric and location data, at pre-defined intervals.

Geo-fencing techniques can also be implemented in various embodiments according to the present teachings. Geofencing creates a virtual perimeter of a geographic area when a mobile device enters or exits the area. Geo-fences techniques may be used, for example, to send a notification if the user of the mobile device travels outside of the defined geographical area. Computer-implemented systems or applications in conjunction with GPS devices may detect such crossing and provide notifications, for instance, via mobile or another device.

In general, geofencing combines awareness of the user's current location with awareness of the user's proximity to a locations of interest. To identify a location of interest, the latitude and longitude of the location is specified. To adjust the proximity for the location, a radius surrounding the location of interest is added. The latitude, longitude, and radius define the geofence, creating a circular area, or fence, around the location of interest.

Multiple active geo-fences can be defined. For each geo-fence, location service applications of the system can be programmed to detect entrance and exit events. The system can determine the geo-fencing event and determine the type of geo-fence transitions) and determine which of the pre-defined geofences has been triggered. The location service application then sends a notification and logs the transition details. After the geo-fence expires, the location service application can automatically delete the geo-fence and stop monitoring the geo-fence. Removing a geofence can stop the monitoring immediately.

Figure 30:
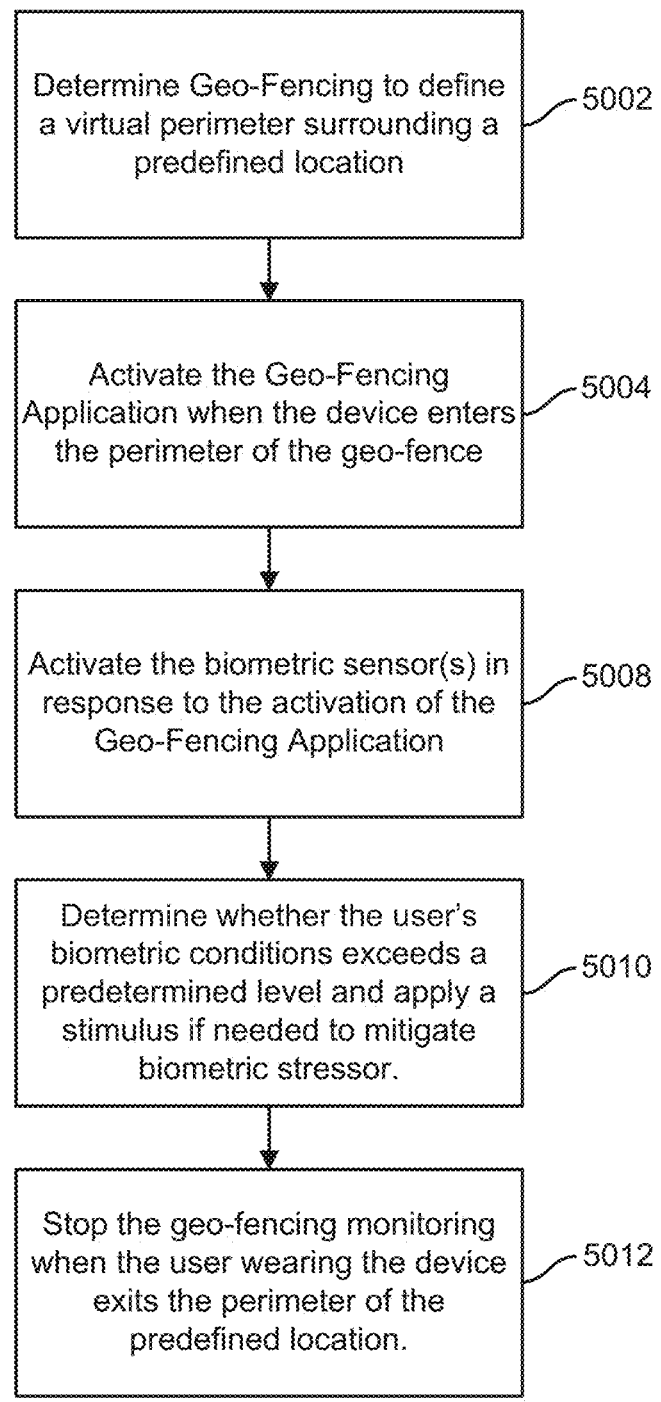
FIG. 30 is a flow diagram illustrating biometric geofencing area according to the present teachings.

FIG. 30 is a flow diagram illustrating a biometric geo-fencing area method 5000 according to an embodiment of the present teachings. At Step 5002, a user's geo-fencing areas are identified. For example, a plurality of geo-fencing areas of one or more users may be determined based on detecting locations of one or more users, the locations detected via one or more user selected devices. The location of the one or more users may be monitored based on information received from the selected devices.

Historical data, such as history of locations, rate of movement, and timing information, can be stored and analyzed to determine the geo-fencing area for one or more of the users. For example, the stored information may provide the user's pattern of movement and duration of time spent in different places. In another aspect, using GPS and geographical mapping information, the system can calculate location information of local businesses and community information, such as shopping areas, retail stores, malls, schools, grocery store, and banks.

Yet in another aspect, the system can automatically calculate the geo-fencing perimeter around the identified locations. In other embodiments, the user may be provided with a user interface to allow the user with an option to enter or confirm the user's geo-fencing perimeter around the identified locations. For example, the user's geo-fencing boundary can be automatically defined or entered as, e.g., 2 kilometer radius around a first shopping area (e.g., a mall) and 3 kilometer radius around a second shopping area (e.g. a banking institution), and so forth.

At Step S004, when the mobile device enters the perimeter of the geo-fence for a predefined location, the system automatically activates the geo-fencing application. In some embodiments, when the system detects an entrance events, the system can determine the geo-fencing event and the type of geo-fence transition(s) and which of the predefined geofences has been triggered. For example, when the user crosses the geo-fence perimeter of a shopping mall, the system can determine that geo-fence transition relates to a shopping transaction.

As another example, the geo-fence perimeter may be defined to surround a financial facility where the user may conduct business transactions, such as a banking institution, or make personal financial decisions, such as a financial planner or financial counselor's office. In the example of a financial planner or financial counselor's office, when the user crosses the geo-fence boundary, such as the entrance of a financial planner or financial counselor's office, the device is activated. During the financial planning session, the user may begin to experience stress as the financial planner presents a review of the user's financial analysis. Areas of review may entail an analysis of the outcomes resulting from the user's economic choice such as use of debt, spending and savings decisions, status of follow-through on recommended actions. For example, the user's stress level may be triggered as the planner or financial counselor presents an analysis of financial statements, budget variances or cashflow issues that relate to the user's choices that conflict with planned goals and intended actions.

In various embodiments, when the device detects a biometric stressor experienced by the user, the device may send a notification to the user and/or a third-party, such as the financial planner, a medical professional, or a parent. In the financial planning session example, the practitioner can receive alerts of the stress levels generated as part of the review session of the user's finances and goal progress over a specified period. The system can send a notification to the financial advisor, counselor or coach regarding the user's financial inconsistencies so that they are aware of a stress alert. The practitioner can then be aware of the emotional triggers contributing to the user's adverse financial behavior and help the user focus on issues that mitigate the adverse choices and negative consequences impacting their goals and finances.

At Step 5008, in response to the activation of the geo-fencing, the system activates the biometric sensor to detect one or more conditions of the user and begins to transmit financial data to the user via the user's device. The biometric device 3000 may collect one or more types of biometric, physiological, and/or environmental data from embedded sensors and/or external devices and communicate or relay such information to other devices, client(s) and/or server over the Internet.

In one example of a financial transaction, the device can be configured to detect the emotional distress experienced by a user to the financial decision and financial transaction by monitoring various body conditions of the user. The device may include a biometric sensor that is capable of measuring one or more body conditions, such as heart rate, perspiration level, and body temperature. In one embodiment, the device is a wrist band worn around the wrist of the user. In another embodiment, the device is a piece of smart clothing having one or more biometric sensors embedded therein. The biometric sensor can measure breathing, heart rate, and muscle tension to determine a number of health metrics, like stress level, anxiety, etc.

When the user is stressed out, his breathing becomes shallow, his heart rate increases, and his body tenses up. The device can recognize all these physical changes in the user's body and alert the user of these conditions. The emotional distress of the user can be estimated from the perspiration level, body temperature, heart rate, and a combination thereof. At Step 5010, if the device determines that the level of emotional distress exceeds a predetermined level, a stimulus generator unit of the device, for example, generates and applies a stimulus to the user to mitigate the biometric stressor. The stimulus generator is configured to generate a stimulus under the control of a controller. Namely, when a predetermined stress or body condition threshold is exceeded, the device applies a biometric countermeasure until the biometric stressor is mitigated. The stimulus generator is merely an example of a biometric stress mitigator that may be employed to reduce the user's stress. However, those skilled in the art would recognize that biometric stress mitigators may encompass a wide variety of stress reducers, such as instructing the user to take medication or call a support person.

At Step 5012, when the user leaves the perimeter of the pre-defined location, the system automatically detects that the device has exited the geofence. The system then deletes the geo-fence and stops the geo-fence monitoring for the predefined location.

Figure 31:
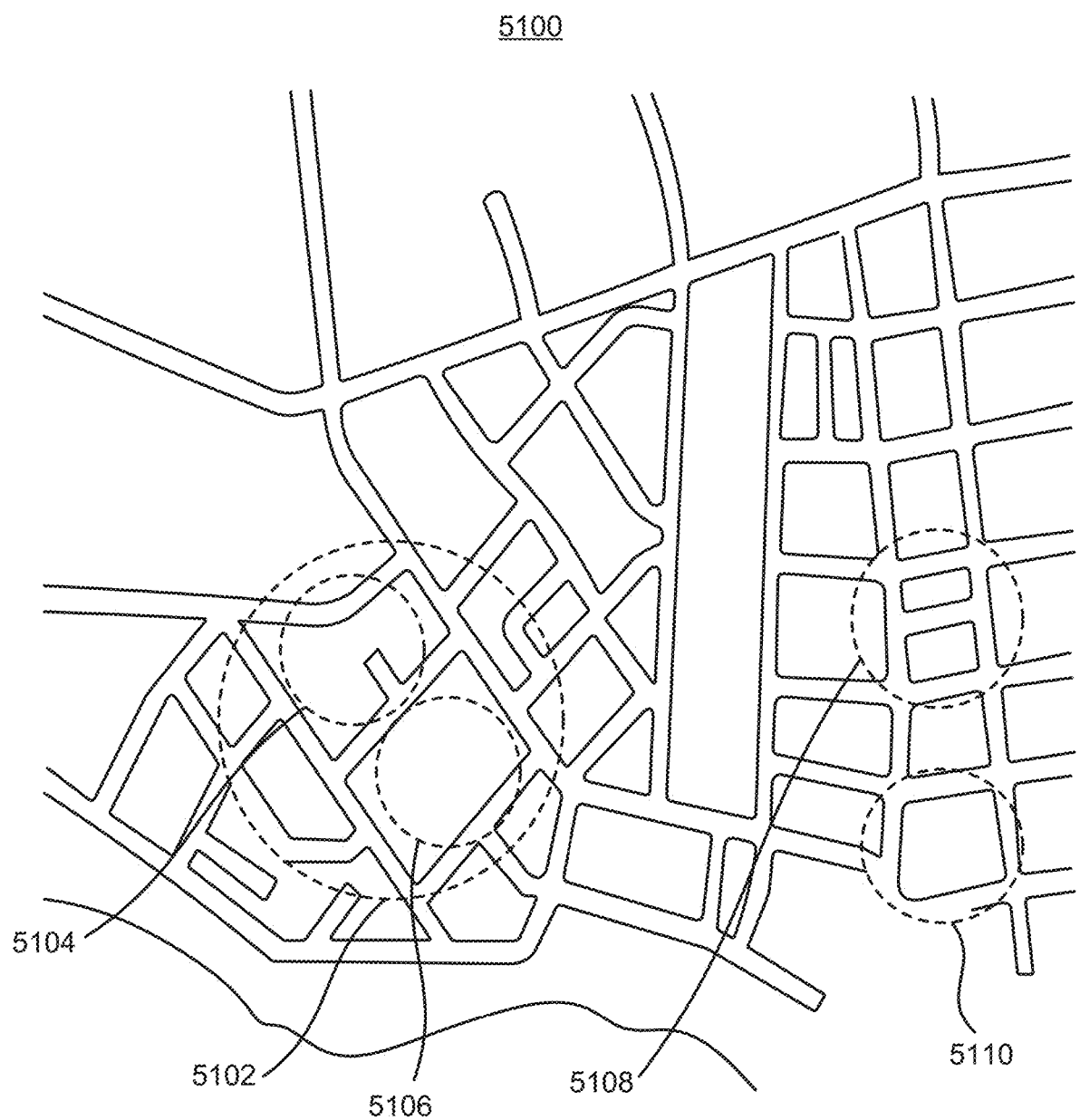
FIG. 31 illustrates an example of a geographical map with multiple geo-fences.

FIG. 31 illustrates an example of a geographical map 5100 with multiple geo-fences of multiple users (User A and User B) according to the present teachings. The system can define multiple active geo-fences. For example in FIG. 31, the biometric geo-fencing area for User A has been divided to define three areas: a primary area 5102 and two sub-areas, area 5104 and area 5106 defined within the primary area 5102. The primary area 5102 can be defined to surround a shopping mall and the sub-areas 5104 and 5106 can be defined as specific stores located within the shopping mall. The biometric geo-fencing area for User B can be defined to have one or more geo-fencing areas 5108 and 5110.

Figure 32:
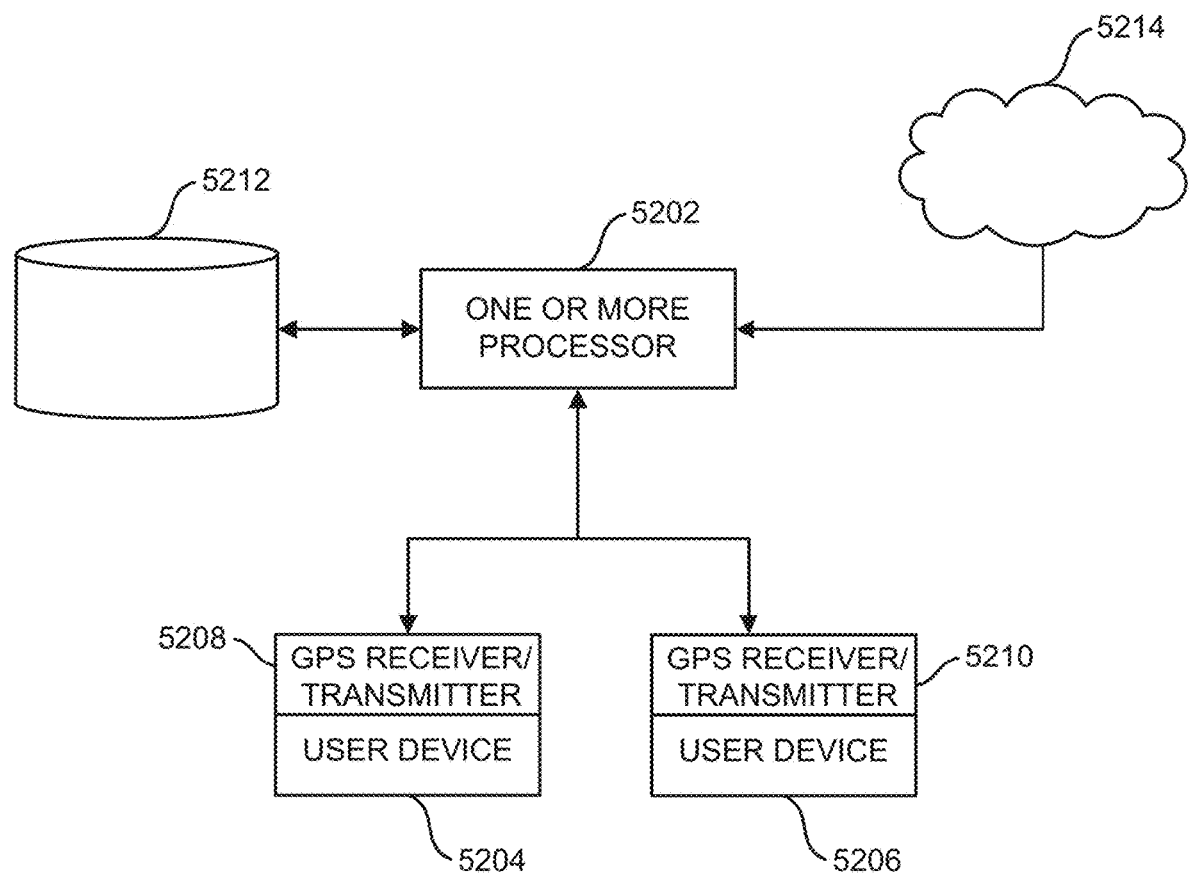
FIG. 32 is a block diagram that illustrates components of a system that is capable of implementing geo-fencing according to the present teachings.

FIG. 32 is a block diagram 5200 that illustrates components that may implement a methodology according to the present teachings. One or more processors 5102 may determine a plurality of geo-fencing areas for one or more users based on monitoring locations of the users, for example, from information associated with the locations detected via one or more user devices (e.g., 5204, 5206) and received from those one or more user devices (e.g., 5204, 5206). For example, one or more user devices may be equipped with or include one or more global position system (GPS) receiver/transmitter (transceiver) devices (e.g., 5208, 5210). The processor may store information associated with one or more geo-fencing areas in a storage device (e.g., 5212).

The processor 5202 may gather content or information associated with the geo-fencing area. Content that is presented may include such information, e.g., biometric, health and financial information. The information may be gathered from information entered by the user into the system, biometric sensors, financial data calculations, and searching an online network 5214, for example, the Internet.

In one embodiment, the content may be presented to one or more user to allow the user(s) to define and modify the content, e.g., via a user interface provided on the one or more processors 5202 or via the user's device.

Other embodiments of the invention will be apparent to those skilled in the art from consideration of the specification and practice of the invention disclosed herein. For instance, the financial behavior rules database and faith-based rules database may be packaged and sold for use by users as software programmed on a computer disc, via the Internet or as course instructional software to support an online course or a printed textbook. According to another example, the biometric device may include a built-in scanner for performing a preauthorization, for example, during a financial transaction at a retail store, before the user is permitted to finalize a financial transaction at a point-of-sale. The built-in scanner is capable of remotely linking to the system to preauthorize a transaction with one more credit cards. The user cannot use the credit card to make a purchase or conduct a transaction for a particular product if the product is not initially scanned for preauthorization by the scanner prior to the purchase. When the transaction exceeds a predetermined amount or is unauthorized, the system sends an alert to another person, such as a parent or guardian, who has the authority to authorize the purchase. This enables the parent or guardian to dynamically control, for example, a child's purchase. This will also circumvent the parent's need to dispute an unauthorized charge by a child after the transaction has been made.

It is intended that the specification and examples be considered as exemplary only, with a true scope and spirit of the invention being indicated by the following claims.

What is claimed is:

1. A wearable biometric device, comprising:
   an interactive user interface with a display that receives information from a user;
   a location unit configured to determine a location information of the wearable biometric device;
   one or more biometric sensors positioned in contact with a user's body and configured to detect one or more biometric signals indicative of one or more biometric conditions sensed from the user's body;
   a stimuli generating unit configured to provide one or more stimuli to the user based on the one or more biometric signals detected by the one or more biometric sensors;
   an embedded transceiver configured to receive and transmit signals including data, information and command and control signals received via wireless signals to and from a remote server communicatively coupled to the wearable biometric device;
   a processor in communication with the embedded transceiver and configured for processing the signals including the data, the information, and the command and the control signals, wherein the processor is operatively coupled to the interactive user interface, the location unit, the one or more biometric sensors, and the stimuli generating unit;
   the interactive user interface, the location unit, the one or more biometric sensors, and the stimuli generating unit, all of which are embedded in the wearable biometric device;
   a memory configured to store instructions executable by the processor, wherein:
     the location unit, through the use of GPS and geographical mapping information, determines a current location of the wearable biometric device;
     a geo-fence application, running on the wearable biometric device, defines, based on the current location information, one or more geo-fences having a virtual boundary relative to one or more respective physical locations;
     the location unit detects a geo-fence crossing when the wearable biometric device crosses any of the one or more geo-fences;
     the geo-fence application defines, based on the current location information, at least one of a type of geo-fence event, a type of geo-fence transition, and a type of predefined geofence trigger event;
     the embedded transceiver receives, from the remote server, user data of the user based on the at least one of the type of geo-fence event, the type of geo-fence transition, and the type of predefined geofence trigger event;
     the embedded transceiver receives, from the remote server, user transaction data, wherein the remote server monitors user transactions conducted by the user and transmits to the embedded transceiver the user transaction data representing the user transactions while the wearable biometric device is located within the geo-fence;
     when the geo-fence application is active, the one or more biometric sensors, based on the contact with the user's body, dynamically detect and analyze the one or more biometric conditions of the user to determine if one or more biometric condition signal levels representing the one or more biometric conditions of the user exceed a predetermined threshold while the wearable biometric device is located within the geo-fence;
     when the one or more biometric condition signal levels exceed the predetermined threshold, the one or more biometric sensors in contact with the user's body dynamically detect and analyze one or more biometric stressor signal levels representing one or more physical characteristics in the user's body to determine if the user experiences a biometric stressor while the wearable biometric device is located within the geo-fence;

the stimuli generating unit, in response to the detection of the biometric stressor, applies one or more stimuli directly to the user's body such that the one or more stimuli is physically sensed by the user to cause the one or more physical characteristics to undergo one or more physical changes in the user's body in response to the applied one or more stimuli, until the one or more detected biometric stressor signal levels is below the predetermined threshold;

the interactive user interface dynamically displays interactive content on the wearable biometric device, wherein the interactive content includes at least one of:
(a) biometric information including at least one of the one or more detected biometric conditions, the one or more detected biometric stressors, and the one or more stimuli being applied to the user,
(b) the detected location information;
(c) a graphical representation of geo-fencing information, including at least a geo-fencing defined area on a map; and
(d) the user data;

an embedded button on the wearable biometric device, which is operatively coupled to the processor, or the interactive user interface enables the user to selectively modify one or more of the interactive content; and the location unit in conjunction with the geo-fence application deactivate the one or more geo-fences relative to the one or more physical locations when the wearable biometric device exits the one or more geo-fences.

2. The device of claim 1, wherein the stimuli generating unit is located on an inner side of a band of the wearable biometric device to apply the one or more stimuli directly to a user's skin.

3. The device of claim 1, wherein the stimuli generating unit is not in contact with a user's skin.

4. The device of claim 1, wherein the biometric sensor includes at least one of a perspiration sensor, a body temperature sensor, a pH sensor, a blood pressure sensor, a blood sugar level, a pulse rate sensor, a blood oxygen sensor, an infrared sensor, a thermal probe, a mechanical pressure probe, and a smart clothing.

5. The device of claim 1, wherein the biometric sensor is configured to monitor, detect and collect the biometric information regarding at least one of biometric data, physiological data and environmental data.

6. The device of claim 1, wherein the one or more biometric conditions of the user comprises at least one of a perspiration level, a perspiration content, a skin temperature, a body temperature, a blood pressure, a blood glucose, a heart rate, a pH level, a hydration level, and a brain activity measured by electroencephalography.

7. The device of claim 1, wherein the processor, using the embedded transceiver, sends an alert signal transmitted to the wearable biometric device to provide to notify the user of the biometric stressor.

8. The device of claim 1, wherein the processor, using the embedded transceiver, sends a notification alert of the biometric stressor to at least one of the user and a third-party.

9. The device of claim 1, wherein the one or more stimuli applied to the user includes at least one of an auditory stimuli, a tactile stimuli, a vibratory stimuli, a pressure stimuli, a temperature stimuli, a visual stimuli, and a speech stimuli.

10. The device of claim 1, wherein the user data comprises financial data and the user transaction data comprises financial transaction data, and
wherein the processor is further configured to perform a comparative analysis to determine whether the financial transactions conducted by the user while located within the geo-fence is consistent with financial planning information of the user.

11. The device of claim 1, wherein the current location comprises at least one of a business location, a retail location, an educational facility, and a medical facility.

12. The device of claim 10, wherein the financial planning information of the user comprises at least one of values, vision, life goals, priorities and planned intentions defined by the user during financial planning.

13. A method performed by a wearable biometric device that is a mobile device comprising a processor and a non-transitory computer-readable storage medium storing instructions that, when executed, cause the mobile device to perform the method, the method comprising:

receiving, at an interactive user interface with a display, information from a user;

determining, using a location unit, a location information of the wearable biometric device;

detecting, using one or more biometric sensors positioned in contact with a user's body, one or more biometric signals indicative of one or more biometric conditions sensed from the user's body;

providing, using a stimuli generating unit, one or more stimuli to the user based on the one or more biometric signals detected by the one or more biometric sensors;

receiving and transmitting, via an embedded transceiver, signals including data, information and command and control signals received via wireless signals to and from a remote server communicatively coupled to the wearable biometric device;

processing, using the processor in communication with the embedded transceiver, the signals including the data, the information, and the command and the control signals, wherein the processor is operatively coupled to the interactive user interface, the location unit, the one or more biometric sensors, and the stimuli generating unit;

providing the interactive user interface, the location unit, the one or more biometric sensors, and the stimuli generating unit so that all are embedded in the wearable biometric device;

determining, by the location unit through the use of GPS and geographical mapping information, a current location of the wearable biometric device;

defining, using a geo-fence application running on the wearable biometric device and based on the current location information, one or more geo-fences having a virtual boundary relative to one or more respective physical locations;

detecting, using the location unit, a geo-fence crossing when the wearable biometric device crosses any of the one or more geo-fences;

defining, using the geo-fence application, based on the current location, at least one of a type of geo-fence event, a type of geo-fence transition, and a type of predefined geofence trigger event;

receiving, at the embedded transceiver from the remote server, user data based on the at least one of the type of geo-fence event, the type of geo-fence transition, and the type of predefined geofence trigger event;

receiving, at the embedded transceiver from the remote server, user transaction data representing user transactions of conducted by the user while the wearable biometric device is located within the geo-fence;

dynamically detecting and analyzing, upon activation of the geo-fence application, using the one or more biometric sensors, based on the contact with the user's body, the one or more biometric conditions of the user to determine if one or more biometric condition signal levels representing the one or more biometric conditions of the user exceed a predetermined threshold while the wearable biometric device is located within the geo-fence;

when the one or more biometric condition signal levels exceed the predetermined threshold, dynamically detecting and analyzing, using the one or more biometric sensors in contact with the user's body, one or more biometric stressor signal levels representing one or more physical characteristics in the user's body to determine if the user experiences a biometric stressor while the wearable biometric device is located within the geo-fence; and responsive to the detection of the biometric stressor, applying, using the stimuli generating unit, one or more stimuli directly to the user's body such that the one or more stimuli is physically sensed by the user to cause the one or more physical characteristics to undergo one or more physical changes in the user's body in response to the applied one or more stimuli, until the one or more detected biometric stressor signal levels is below the predetermined threshold;

dynamically displaying, using the interactive user interface, interactive content on the wearable biometric device, wherein the interactive content includes at least one of:
  (a) biometric information including at least one of the one or more detected biometric conditions, the one or more detected biometric stressors, and the one or more stimuli being applied to the user,
  (b) the location information;
  (c) a graphical representation of geo-fencing information, including at least a geo-fencing defined area on a map; and
  (d) the user data;

providing an embedded button on the wearable biometric device, which is operatively coupled to the processor, or the interactive user interface to enable the user to selectively modify one or more of the interactive content; and deactivating, using the location unit in conjunction with the geo-fence application, the one or more geo-fences relative to the one or more physical locations when the wearable biometric device exits the one or more geo-fences.

14. The method of claim 13, wherein the stimuli generating unit is located on an inner side of a band of the wearable biometric device to apply the one or more stimuli directly to a user's skin.

15. The method of claim 13, wherein the stimuli generating unit is not in contact with a user's skin.

16. The method of claim 13, wherein the biometric sensor includes at least one of a perspiration sensor, a body temperature sensor, a pH sensor, a blood pressure sensor, a blood sugar level, a pulse rate sensor, a blood oxygen sensor, an infrared sensor, a thermal probe, a mechanical pressure probe, and a smart clothing.

17. The method of claim 13, wherein the biometric sensor is configured to monitor, detect and collect the biometric information regarding at least one of biometric data, physiological data and environmental data.

18. The method of claim 13, wherein the processor, using the embedded transceiver, sends a notification alert of the biometric stressor to at least one of the user and a third-party.

19. The method of claim 13, wherein the one or more biometric conditions of the user comprises at least one of a perspiration level, a perspiration content, a skin temperature, a body temperature, a blood pressure, a blood glucose, a heart rate, a pH level, a hydration level, and a brain activity measured by electroencephalography.

20. The method of claim 13, wherein the one or more stimuli applied to the user includes at least one of an auditory stimuli, a tactile stimuli, a vibratory stimuli, a pressure stimuli, a temperature stimuli, a visual stimuli, and a speech stimuli.

21. The method of claim 13, wherein the user data comprises financial data and the user transaction data comprises financial transaction data, and
  wherein the processor is further configured to perform a comparative analysis to determine whether the financial transactions conducted by the user while located within the geo-fence is consistent with financial planning information of the user, and wherein the financial planning information of the user comprises at least one of values, vision, life goals, priorities and planned intentions defined by the user during financial planning.

22. The method of claim 13, wherein the current location comprises at least one of a business location, a retail location, an educational facility, and a medical facility.

* * * * *